US010681311B1

(12) United States Patent
Gottman et al.

(10) Patent No.: US 10,681,311 B1
(45) Date of Patent: Jun. 9, 2020

(54) SEMI-AUTOMATED, DISTRIBUTED, INTERACTIVE RELATIONSHIP COUNSELING SYSTEM

(71) Applicant: Affective Software, Inc., Seattle, WA (US)

(72) Inventors: John Gottman, Deer Harbor, WA (US); Rafael Lisitsa, Seattle, WA (US)

(73) Assignee: Affective Software, Inc., Seattle, WA (US)

( * ) Notice: Subject to any disclaimer, the term of this patent is extended or adjusted under 35 U.S.C. 154(b) by 0 days.

(21) Appl. No.: 16/175,547

(22) Filed: Oct. 30, 2018

Related U.S. Application Data

(60) Provisional application No. 62/578,645, filed on Oct. 30, 2017.

(51) Int. Cl.
 *H04N 7/15* (2006.01)
 *G06Q 50/22* (2018.01)
 *G06F 3/01* (2006.01)

(52) U.S. Cl.
 CPC ............ *H04N 7/155* (2013.01); *G06F 3/015* (2013.01); *G06Q 50/22* (2013.01)

(58) Field of Classification Search
 USPC ........................................................ 348/14.1
 See application file for complete search history.

(56) References Cited

U.S. PATENT DOCUMENTS

| 6,205,716 | B1 * | 3/2001 | Peltz ....................... E04H 1/125 345/905 |
| 8,273,018 | B1 * | 9/2012 | Fackler ............... G06F 19/3418 600/300 |
| 2002/0198473 | A1 * | 12/2002 | Kumar ..................... A61N 1/08 600/595 |
| 2014/0073880 | A1 * | 3/2014 | Boucher ................ A61B 1/227 600/301 |
| 2015/0035959 | A1 * | 2/2015 | Amble ................... A61B 8/565 348/74 |

* cited by examiner

*Primary Examiner* — Amal S Zenati
(74) *Attorney, Agent, or Firm* — Olympic Patent Works PLLC

(57) ABSTRACT

The current document is directed to a semi-automated, distributed, interactive relationship-counseling system. The currently disclosed interactive relationship-counseling system employs, in one configuration, two smart phones, tablets, or other personal, processor-controlled, video-enabled electronic devices and one or more server computer systems. A relationship-counseling session, in a disclosed implementation, includes a discussion, by two participants, during which the participants are isolated from one another physically, but during which each participant hears and views a real-time video of his or her partner participant on his or her video-enabled electronic device. During the discussion, each participant may be monitored by one or more physiological sensors. This stored data, along with additional input data provided by each participant when viewing a playback of the discussion, is used by analysis and processing subsystems within the server computer system to identify, evaluate, and diagnose aspects of the relationship between the two participants, following which the participants may receive reports, counseling, advice, and other information to assist the participants in understanding and improving the relationship.

13 Claims, 57 Drawing Sheets

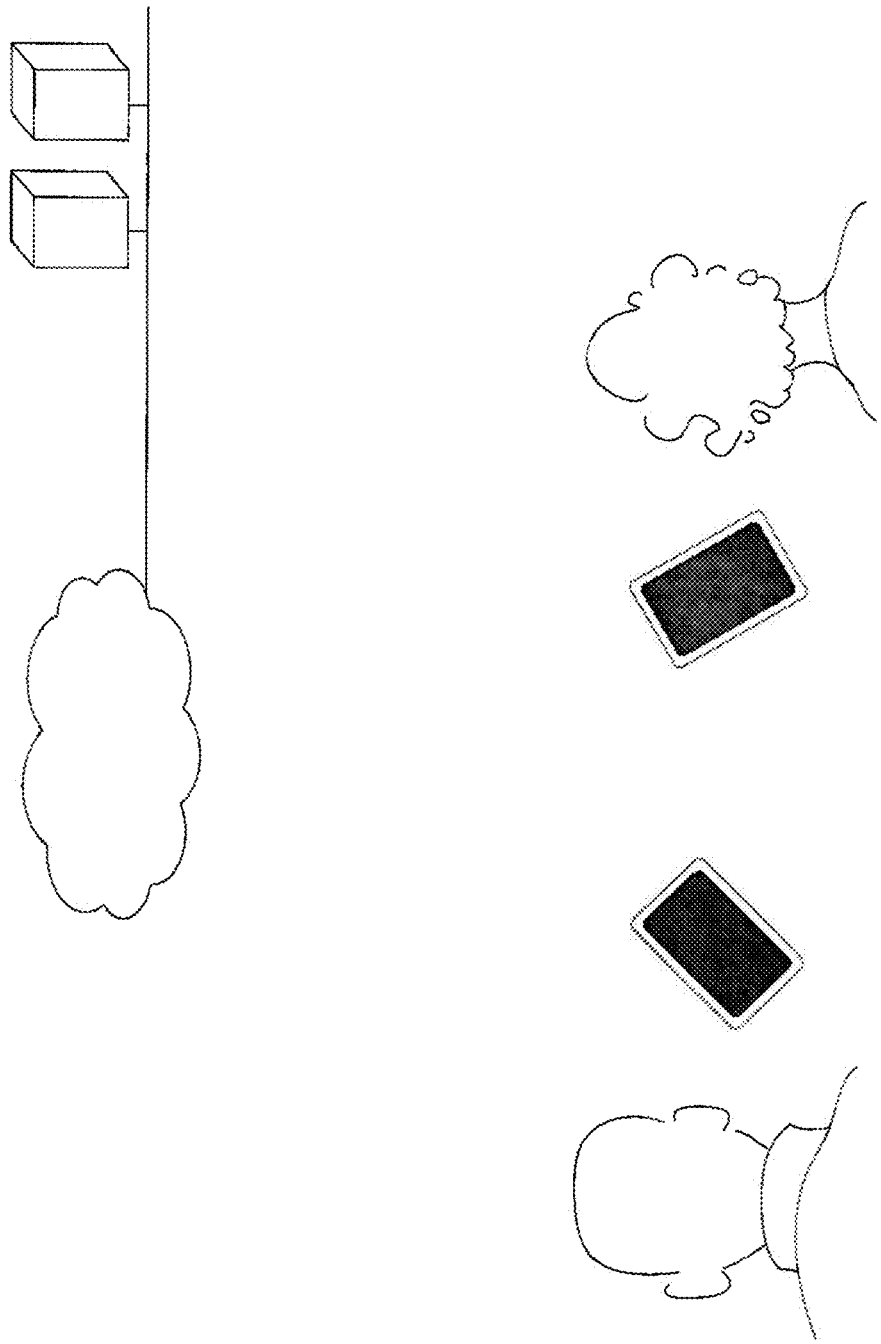

SEMI-AUTOMATED, DISTRIBUTED, INTERACTIVE RELATIONSHIP COUNSELING SYSTEM

CROSS-REFERENCE TO RELATED APPLICATION

This application claims the benefit of Provisional Application No. 62/578,645, filed Oct. 30, 2017.

TECHNICAL FIELD

The current document is directed to distributed computer systems and automated counseling-support systems, and, in particular, to a semi-automated, distributed, interactive, relationship counseling system.

BACKGROUND

Computer systems and computational technologies have steadily evolved, during the past 70 years, from initial vacuum-tube-based systems that lacked operating systems, compilers, network connectivity, and most other common features of modern computing systems to vast distributed computing systems that include large numbers of multi-processor servers, data-storage appliances, and multiple layers of internal communications networks interconnected by various types of wide-area networks and that provide computational resources to hundreds, thousands, tens of thousands, or more remote users. As operating systems, and virtualization layers have been developed and refined, over the years, in parallel with the advancements in computer hardware and networking, the robust execution environments provided by distributed operating systems and virtualization layers now provide a foundation for development and evolution of many different types of distributed application programs, including distributed database-management systems, distributed client-server applications, and distributed web-based service-provision applications.

In a different evolutionary trend in computing and electronics, small portable computing devices, including laptops, tablets, and smart phones, have gained widespread acceptance and are increasingly replacing PCs and other desk top computers. Just as desktop computers overtook minicomputers in computational bandwidth and cost effectiveness, smart phones are now overtaking traditional PCs and desktop computer systems, not only with respect to computational bandwidth, but perhaps more importantly with respect to usability and to matching provided functionalities with user needs. Interestingly, the average current smart phone has far greater memory capacity and instruction-execution bandwidth than supercomputers of up to the early 1990s.

Various types of relationship counseling have been in practice probably for hundreds of years. With the development of psychology and interest in psychology and emotional health over the past 100 years, more systematic approaches to relationship counseling have arisen. During the past 30 years, along with the development of processor-controlled electronic systems, electronic communications, and audio and visual functionalities that can be relatively easily incorporated into processor-controlled systems, various types of specialized and generally human-supervised relationship-counseling support systems have been developed, along with interactive relationship-counseling environments, to evaluate and diagnose problems in relationships and assist relationship-counseling patients to take steps to improve their relationships and personal emotional health. However, the specialized and human-supervised relationship-counseling-support systems have limited availability, are cumbersome and expensive to manage and maintain, and fail to take advantage of enormous developments in distributed-computer systems, electronic communications, evolution of personal computing devices, and powerful pattern-recognition computational technologies, including machine-learning systems and classifiers, neural networks, and other new computational technologies.

SUMMARY

The current document is directed to a semi-automated, distributed, interactive relationship-counseling system. The currently disclosed interactive relationship-counseling system employs, in one configuration, two smart phones, tablets, or other personal, processor-controlled, video-enabled electronic devices and one or more server computer systems. A relationship-counseling session, in a disclosed implementation, includes a discussion, by two participants, during which the participants are isolated from one another physically, but during which each participant hears and views a real-time video of his or her partner participant on his or her video-enabled electronic device. During the discussion, each participant may be monitored by one or more physiological sensors. The sensor signals, audio input, and video input to each video-enabled electronic device are recorded, and the various signals input to each video-enabled electronic device are common scaled to a master timescale, or master clock so that, at any given point in time during the discussion, various different inputs and signals occurring at that time point can be identified and accessed for analysis and subsequent processing. The scaled inputs and signals recorded on each of the two video-enabled electronic devices are scaled relative to a common global timescale, or common global clock, so that all of the signals and inputs from both devices are stored and accessible according to a common timescale. This stored data, along with additional input data provided by each participant when viewing a playback of the discussion, is used by analysis and processing subsystems within the server computer system to identify, evaluate, and diagnose aspects of the relationship between the two participants, following which the participants may receive reports, counseling, advice, and other information to assist the participants in understanding and improving the relationship.

BRIEF DESCRIPTION OF THE DRAWINGS

FIGS. 1A-F illustrate an initial phase of a relationship-counseling session.

Figure 12A:
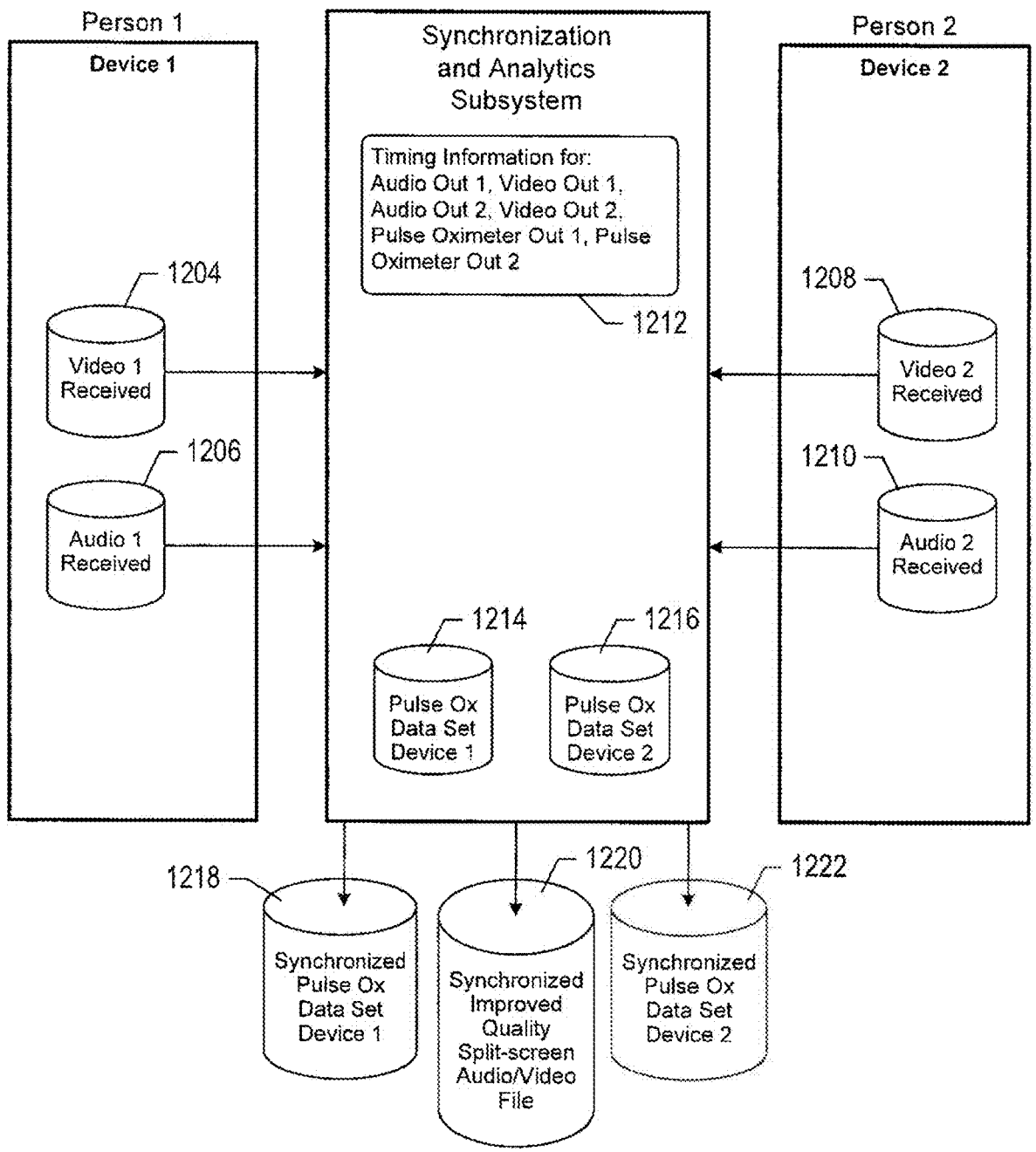
FIG. 12A illustrates one implementation of a postprocessing procedure after the first phase discussion session.
Figure 12B:
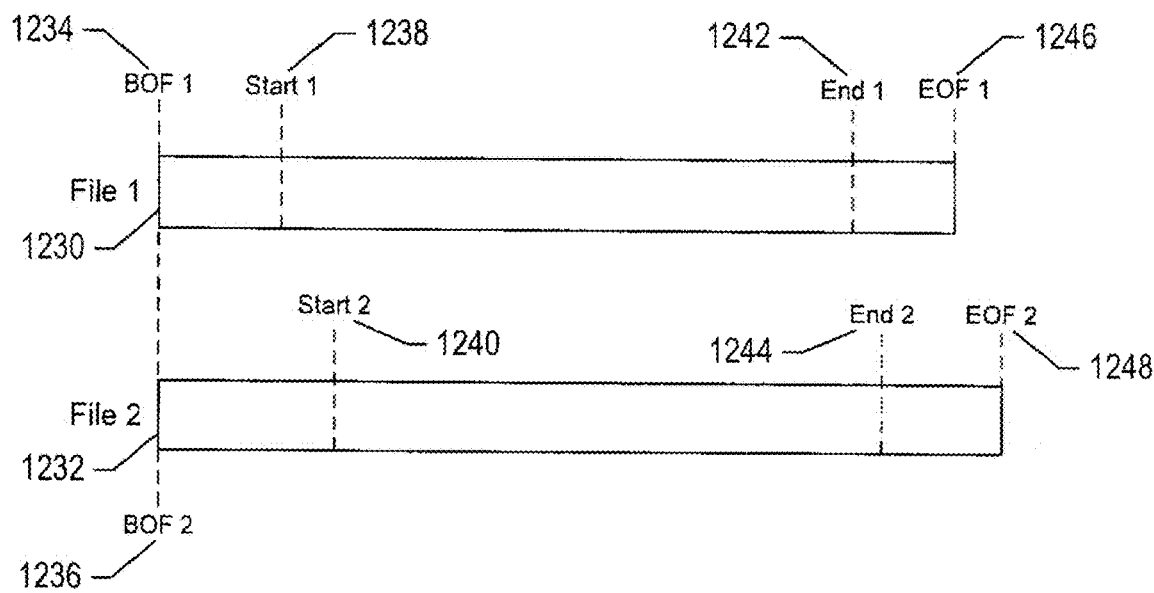
FIG. 12B shows how two files can be time-aligned relative to a common reference clock.
Figure 12B:
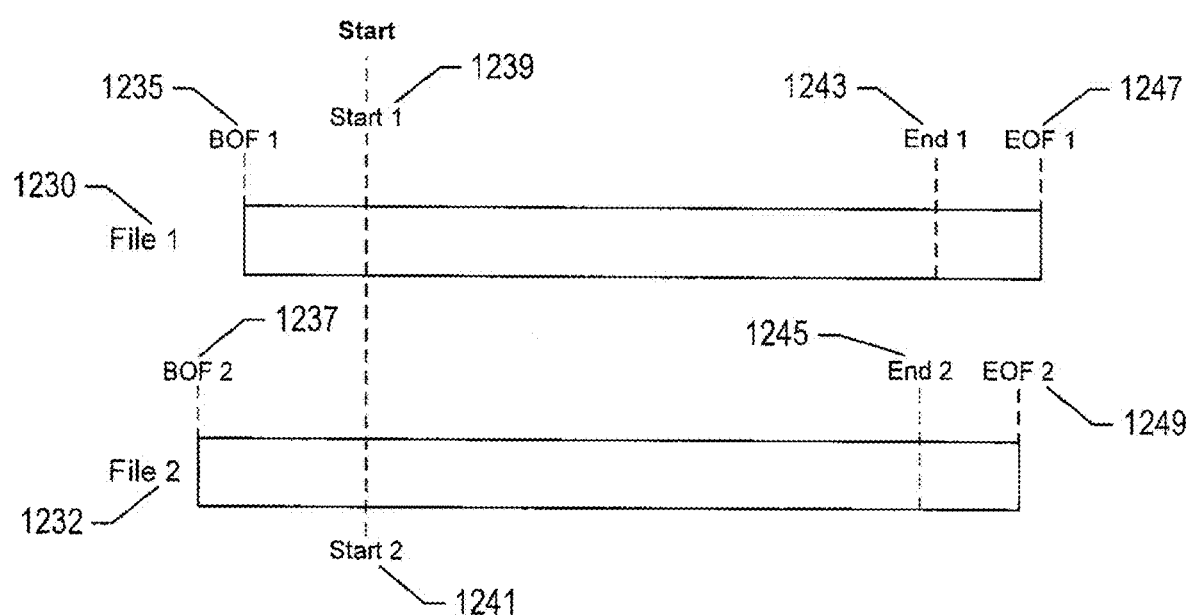
Figure 12C:
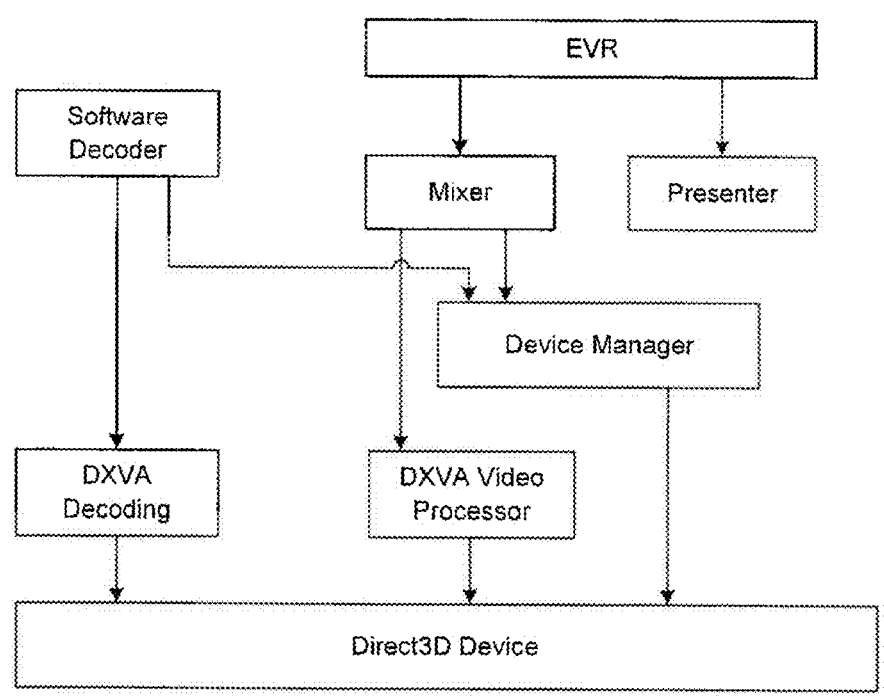
FIG. 12C shows the internal components of the Microsoft Enhanced Video Renderer EVR that can be utilized by Relationship Counseling Application.
Figure 12D:
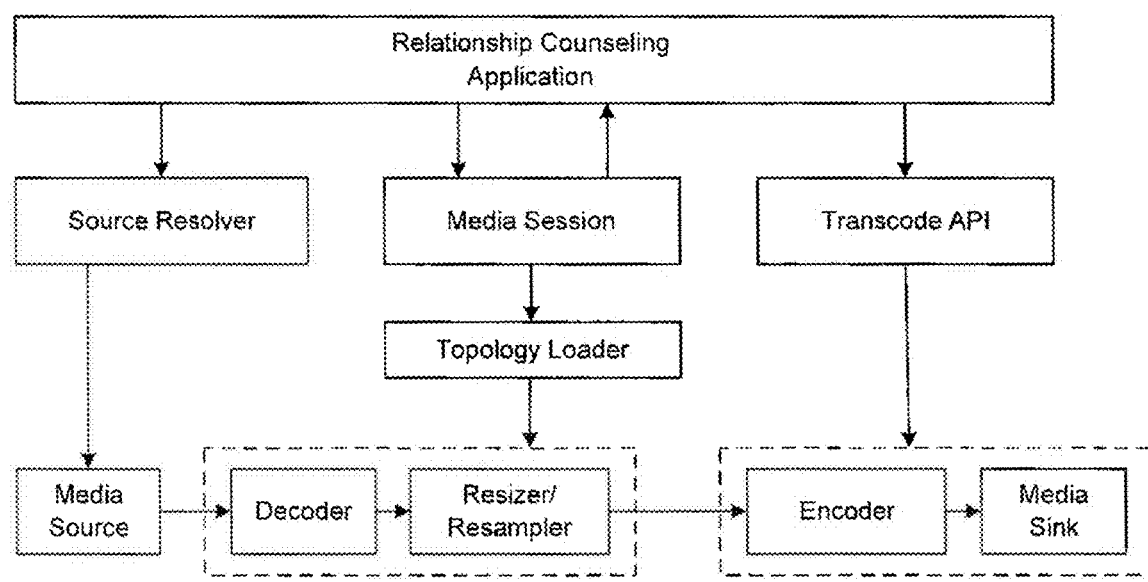

The FIG. 12D shows how the Relationship Counseling Application can utilize the Transcode API.

FIGS. 13A-D illustrate the input and output signals generated by a video-enabled electronic device during a second-phase annotation sub-session.

Figure 13A:
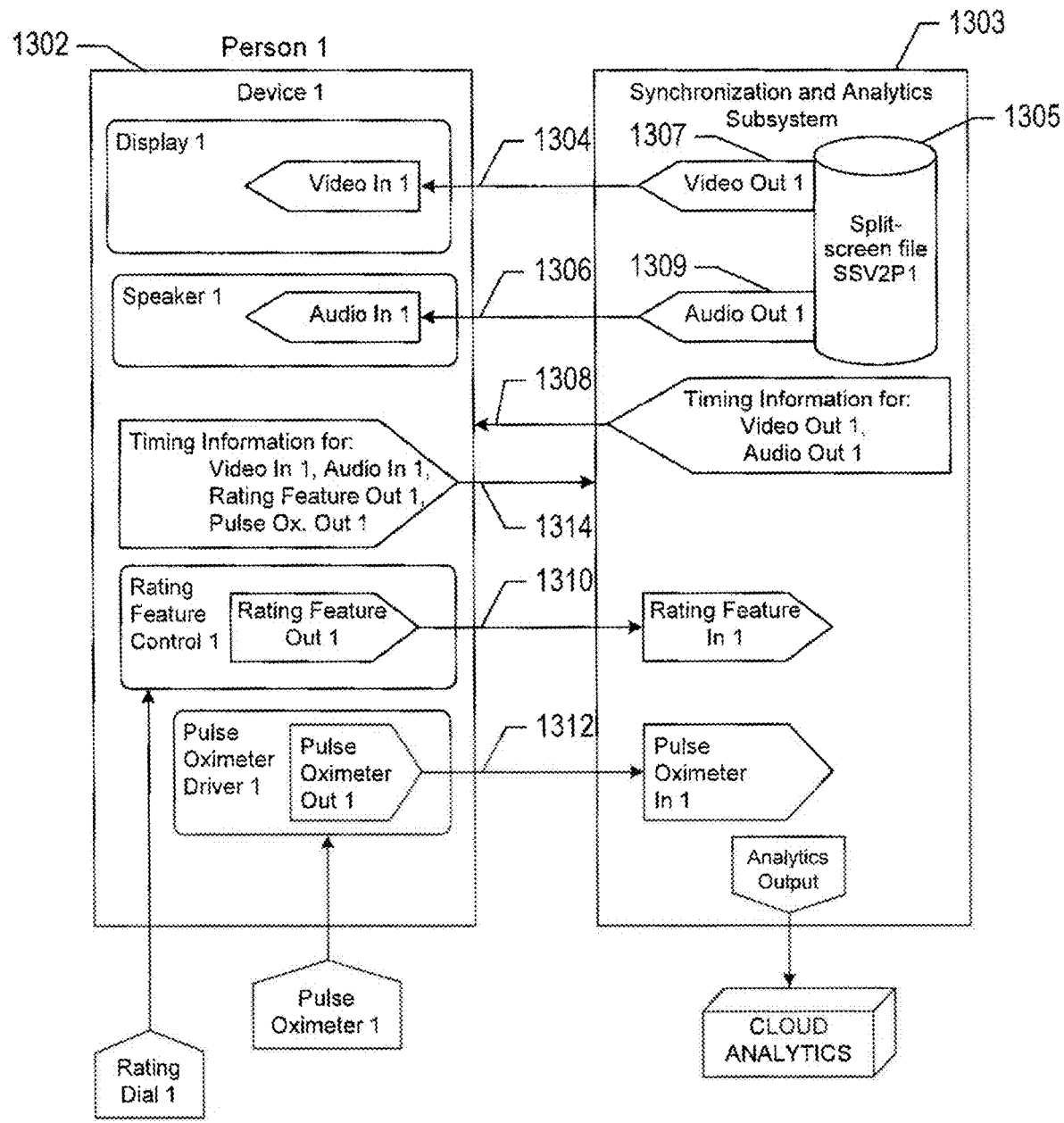
Figure 13B:
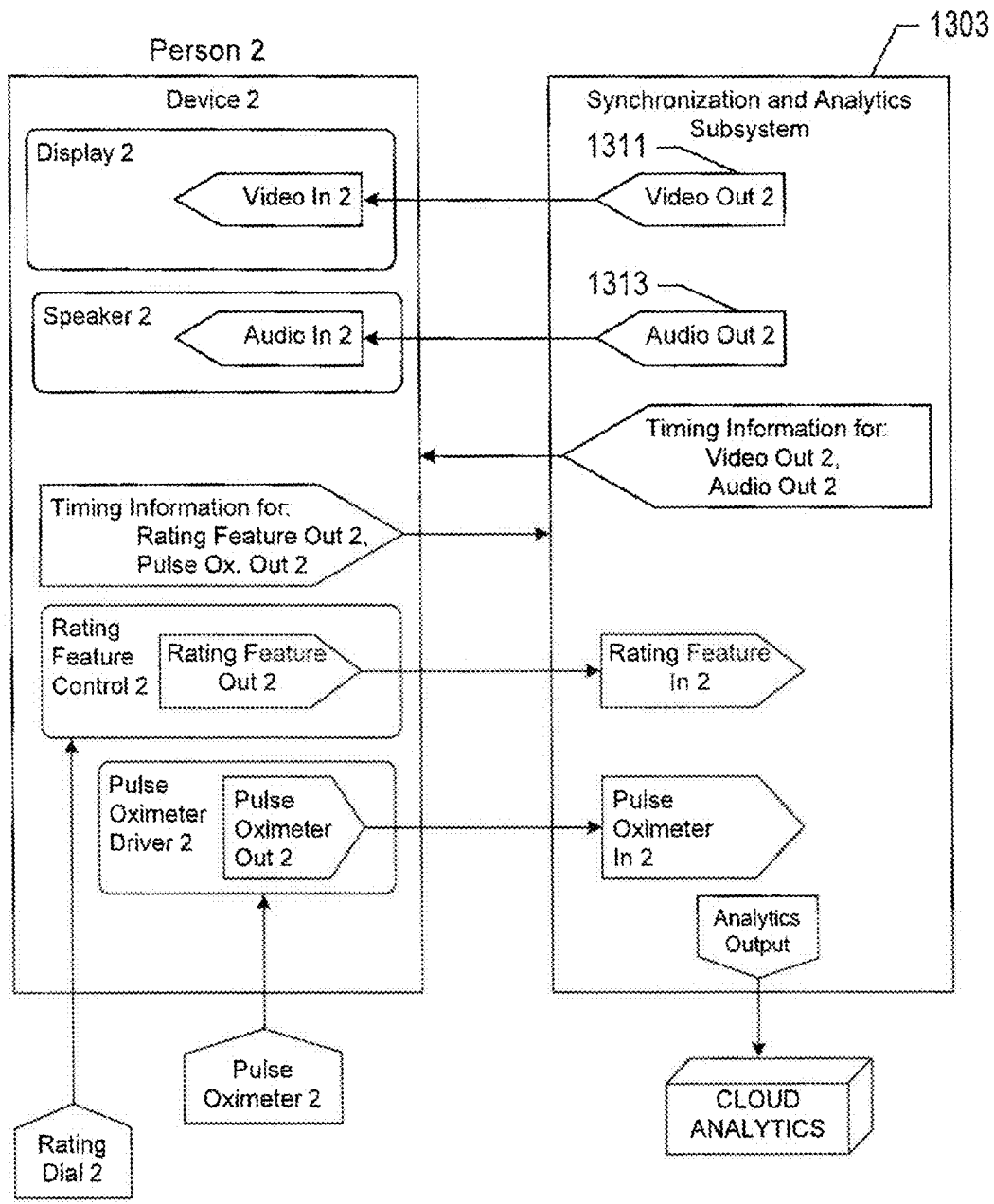
Figure 13C:
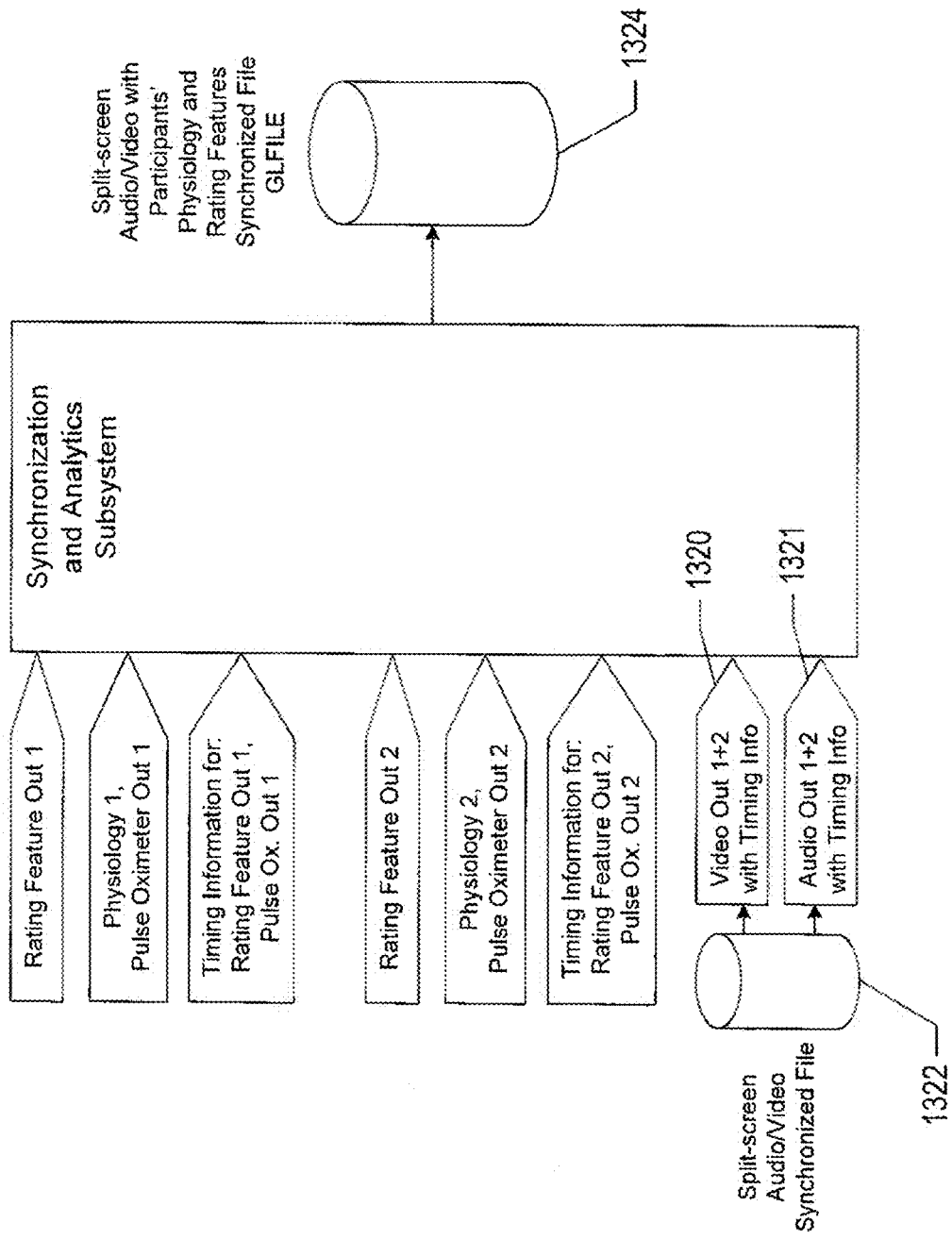
Figure 13D:
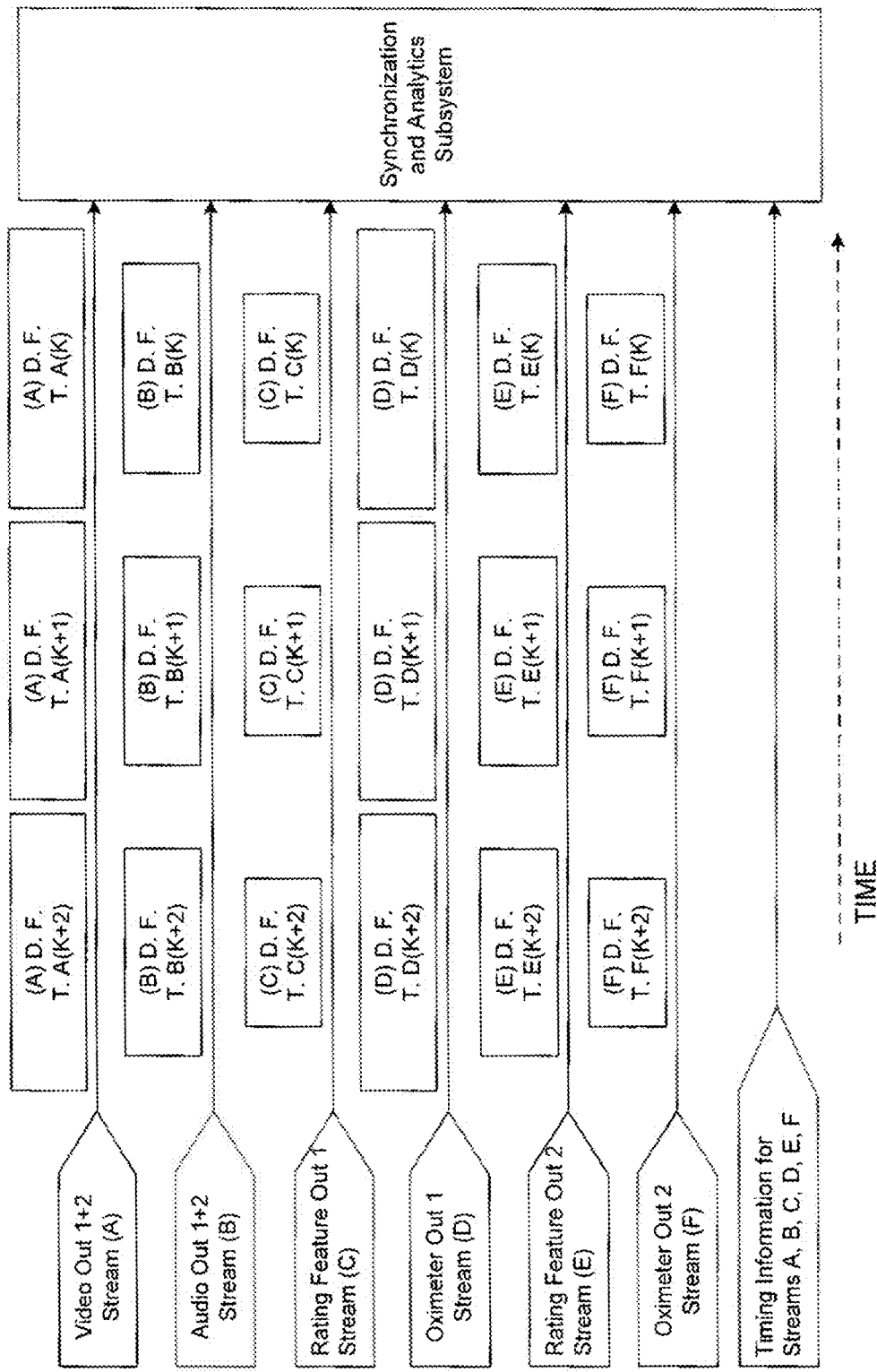
Figure 13E:
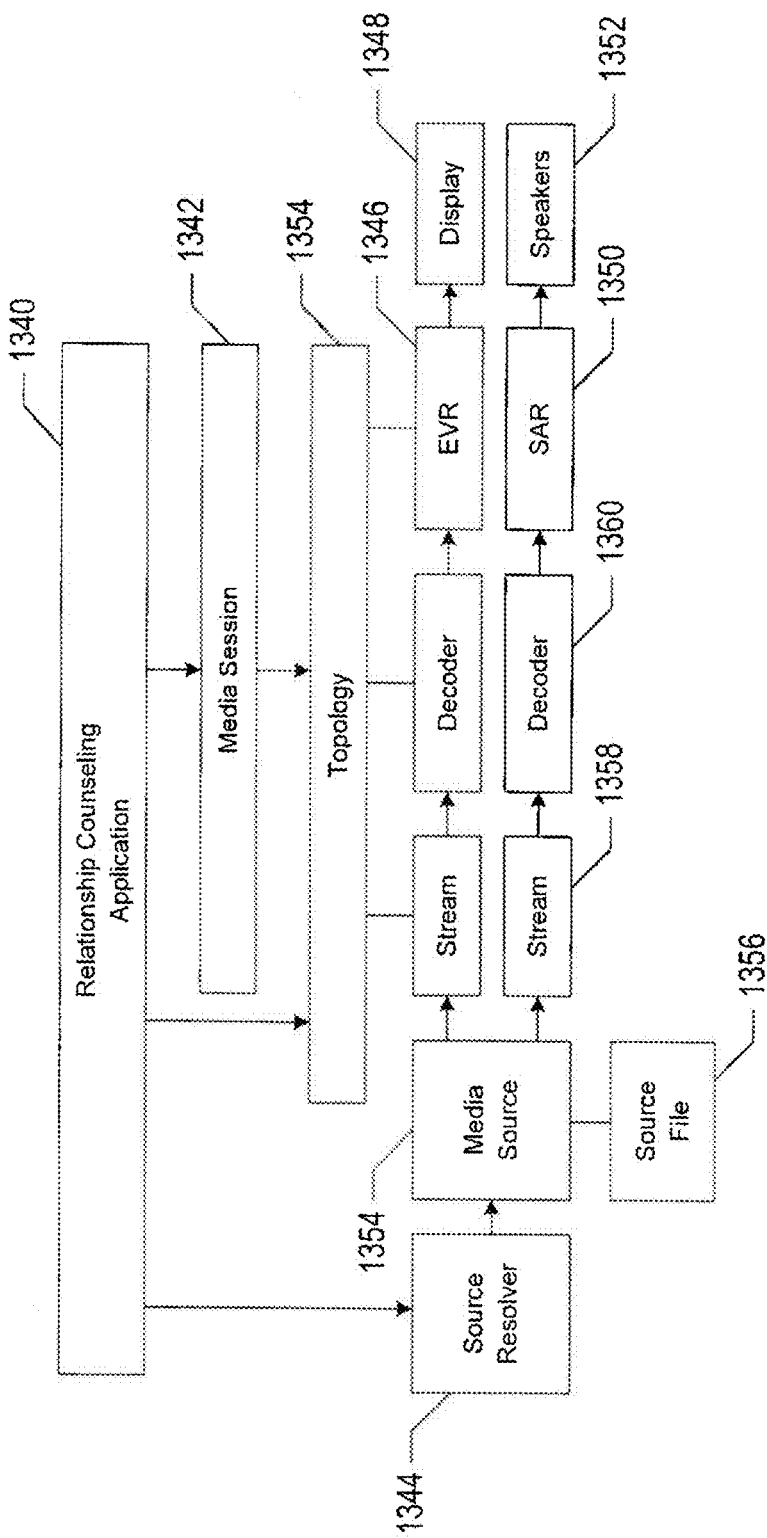

FIG. 13E illustrates one implementation of Relationship Counseling Application that utilizes Microsoft Media Foundation components to play a media file using the Media Session interfaces.

Figure 14A:
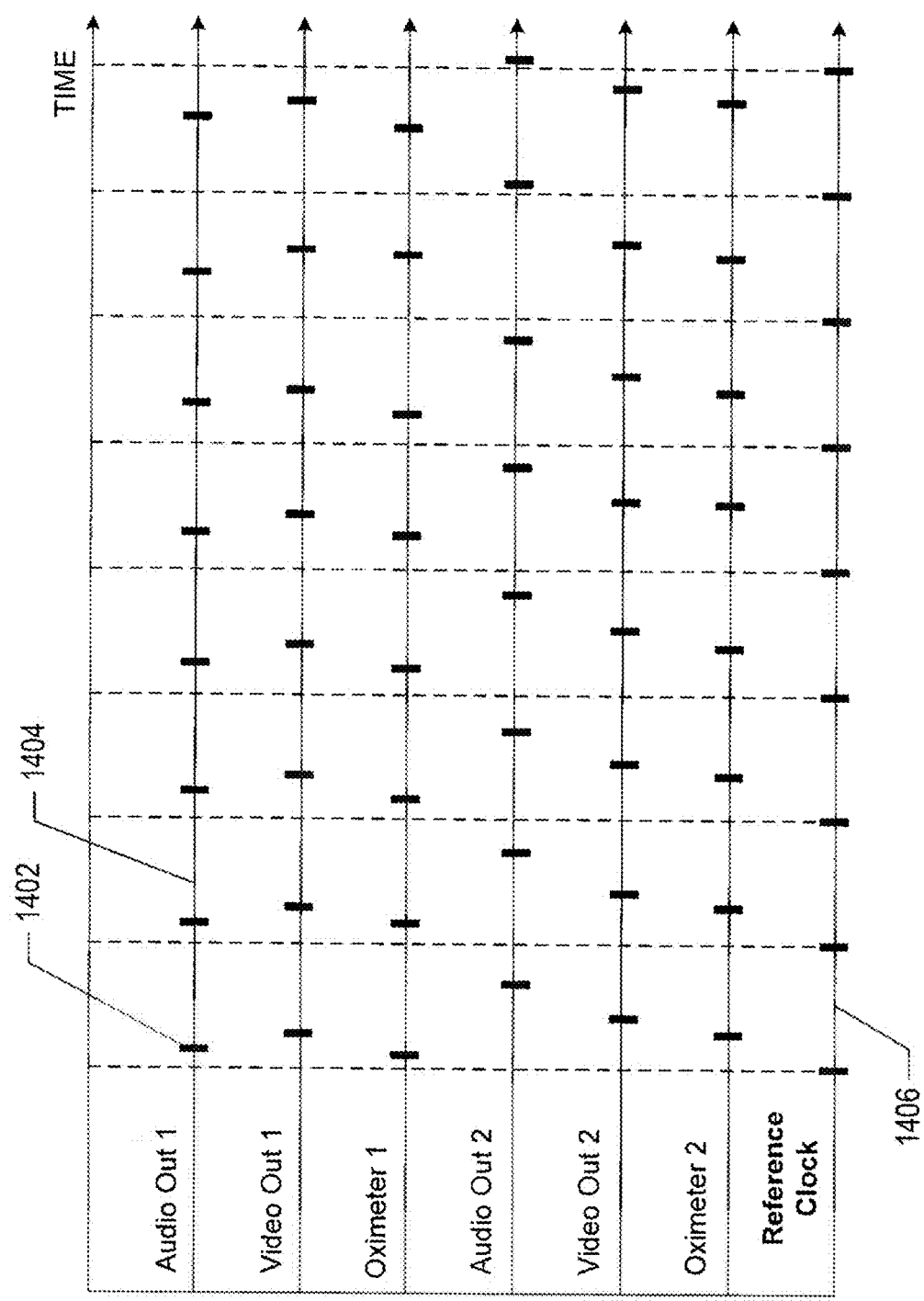
Figure 14B:
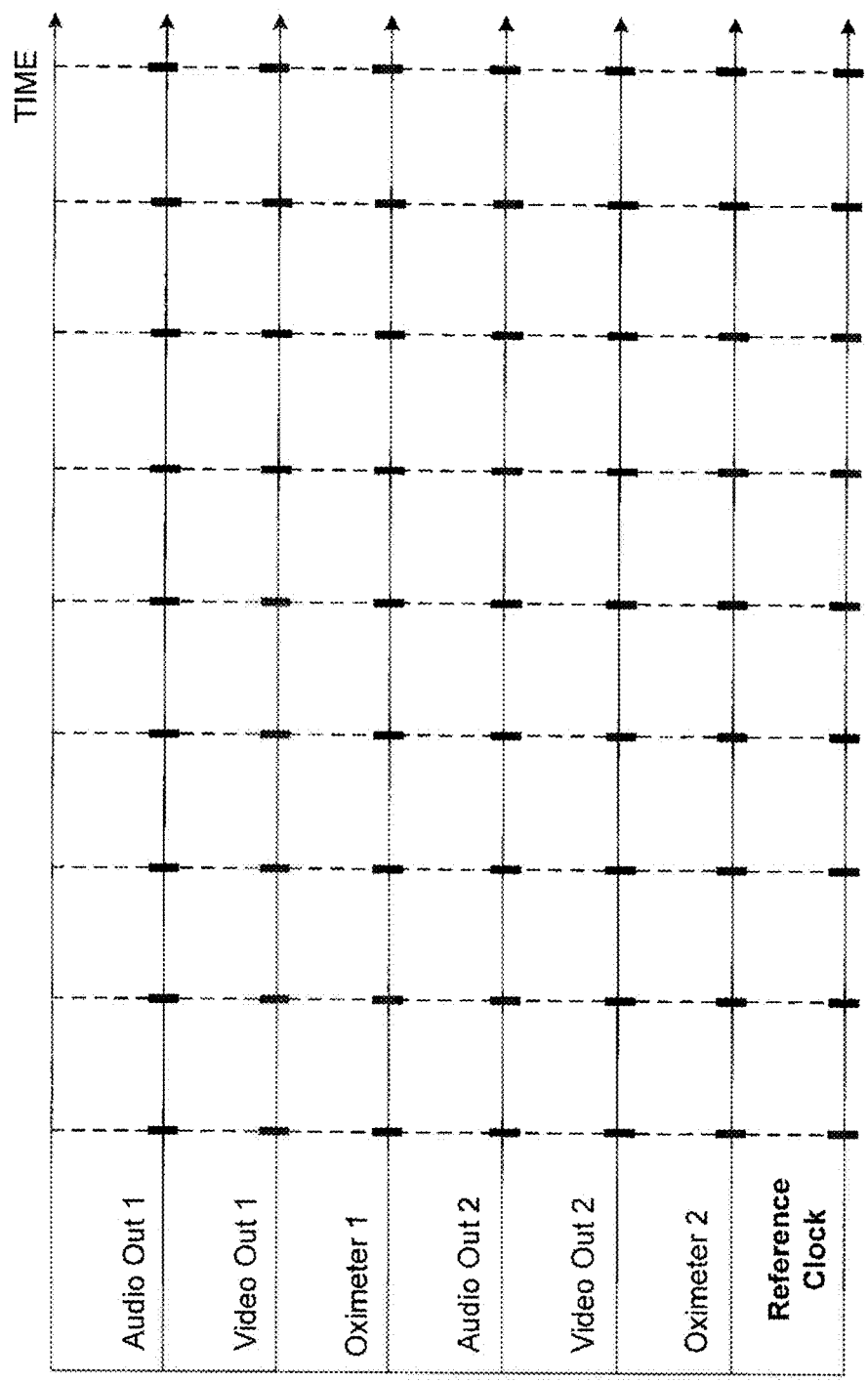
Figure 14C:
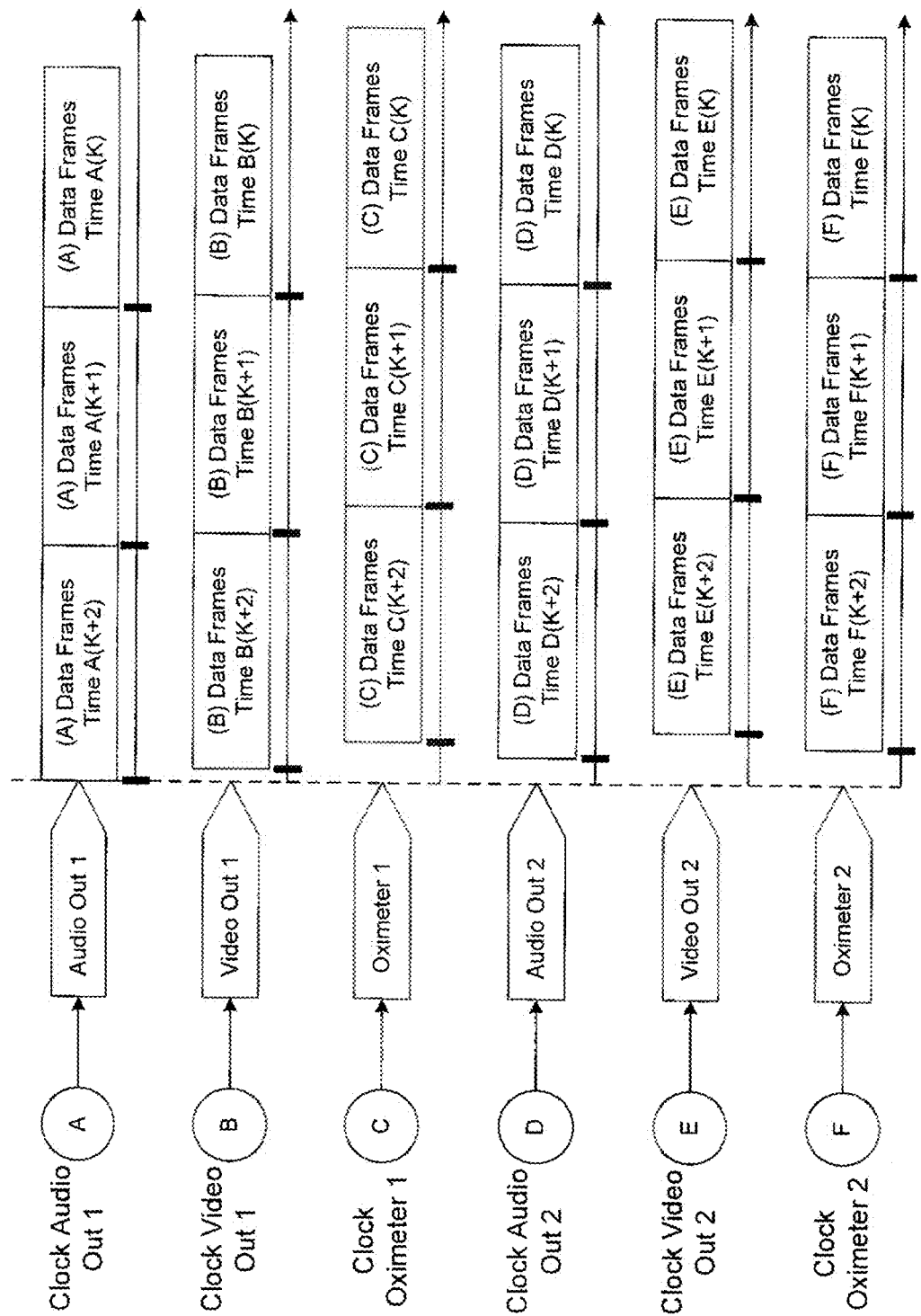

FIGS. 14A-C illustrate the timescale problem.

FIGS. 15A-D illustrate analysis of the data collected during a relationship-counseling session by the relationship-counseling-processing system.

Figure 16A:
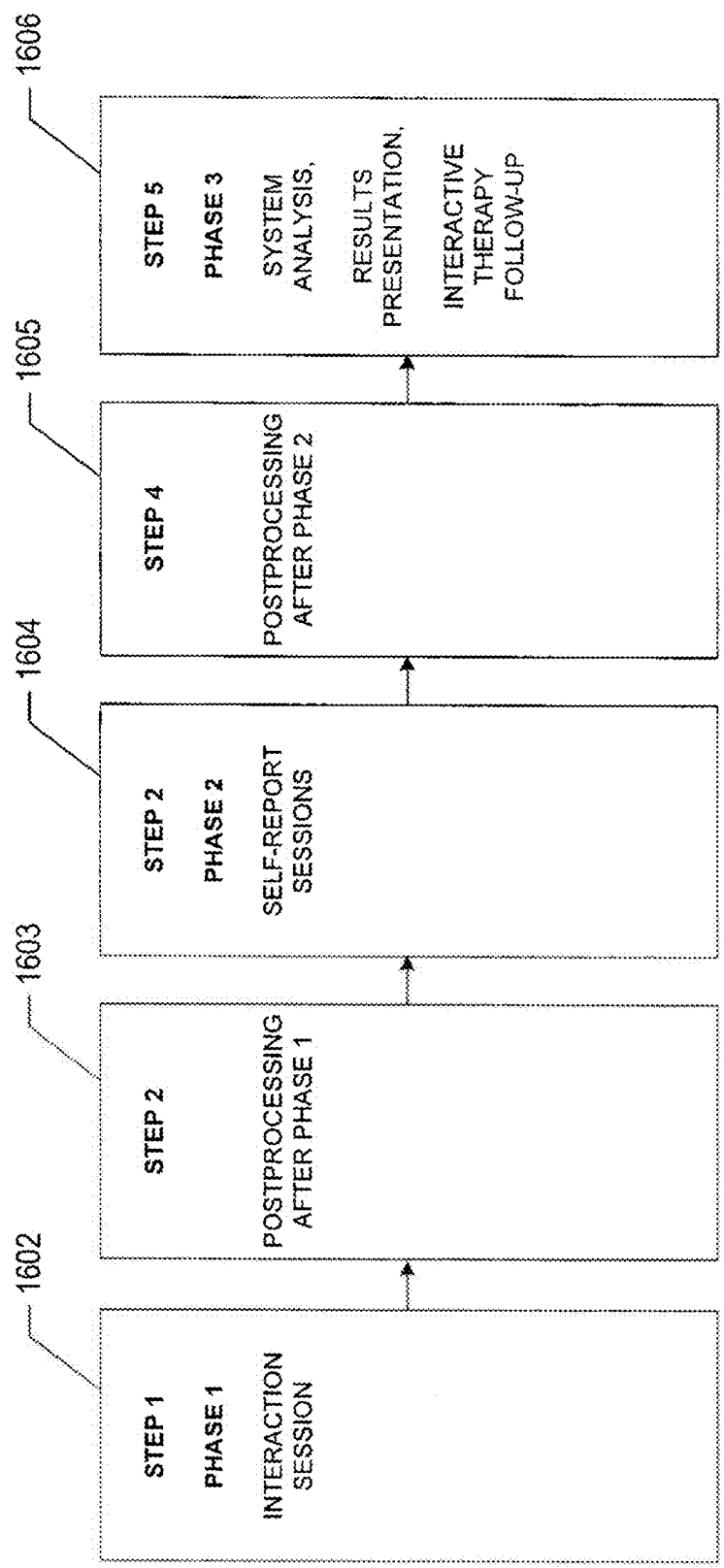
Figure 16B:
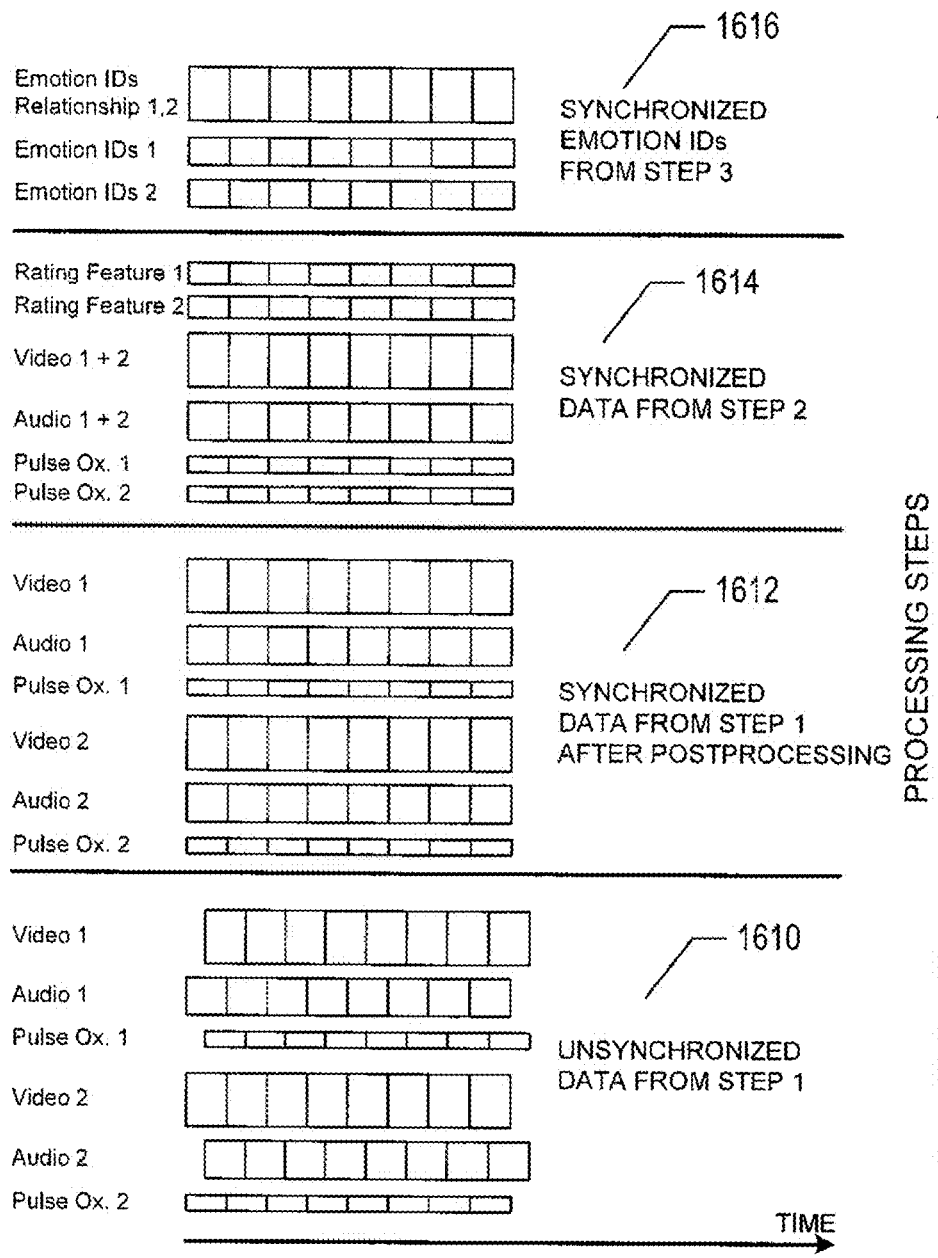
Figure 16C:
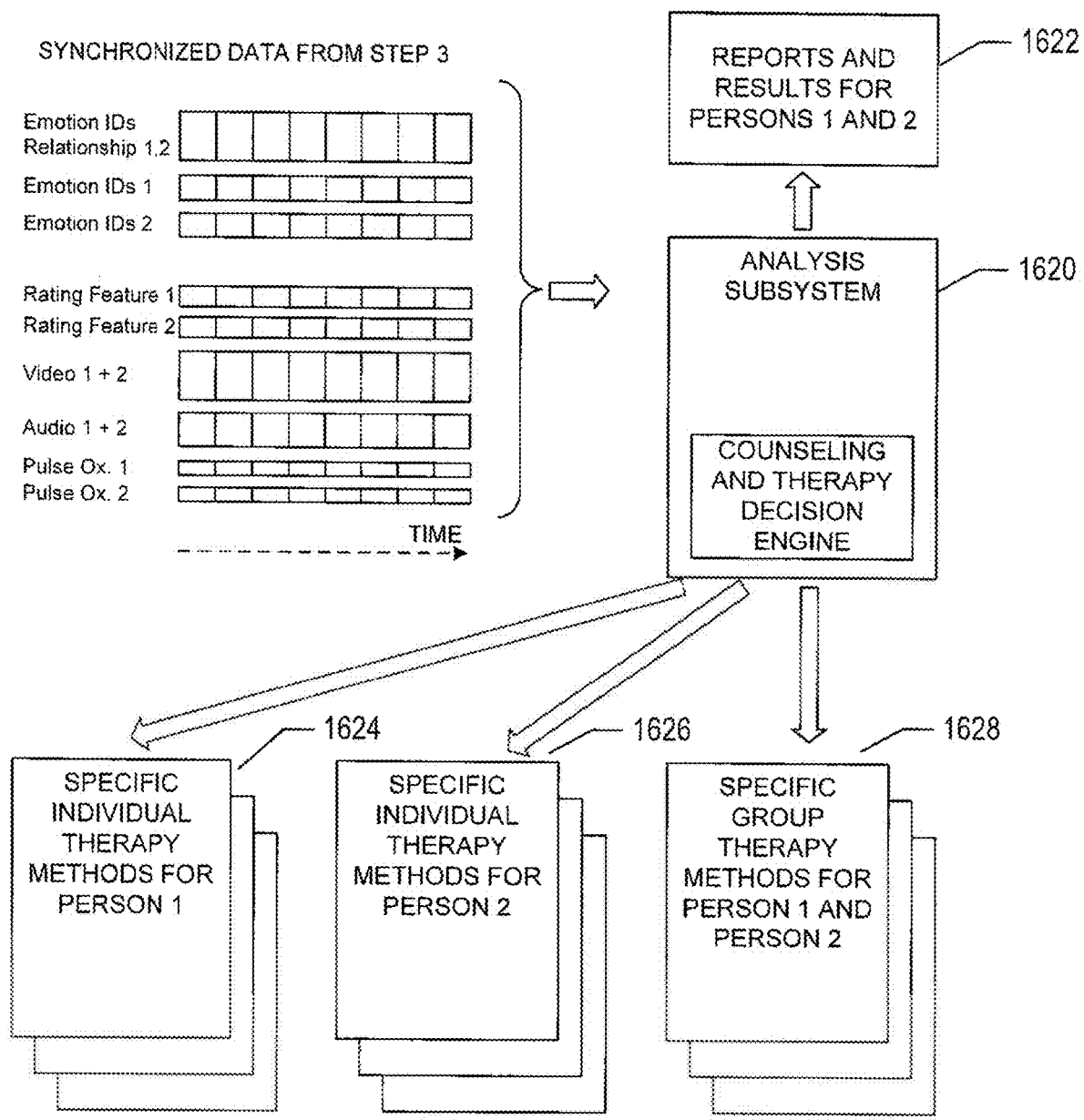

FIGS. 16A-C illustrate the analysis steps taken following generation of the emotion-ID time series.

Figure 17:
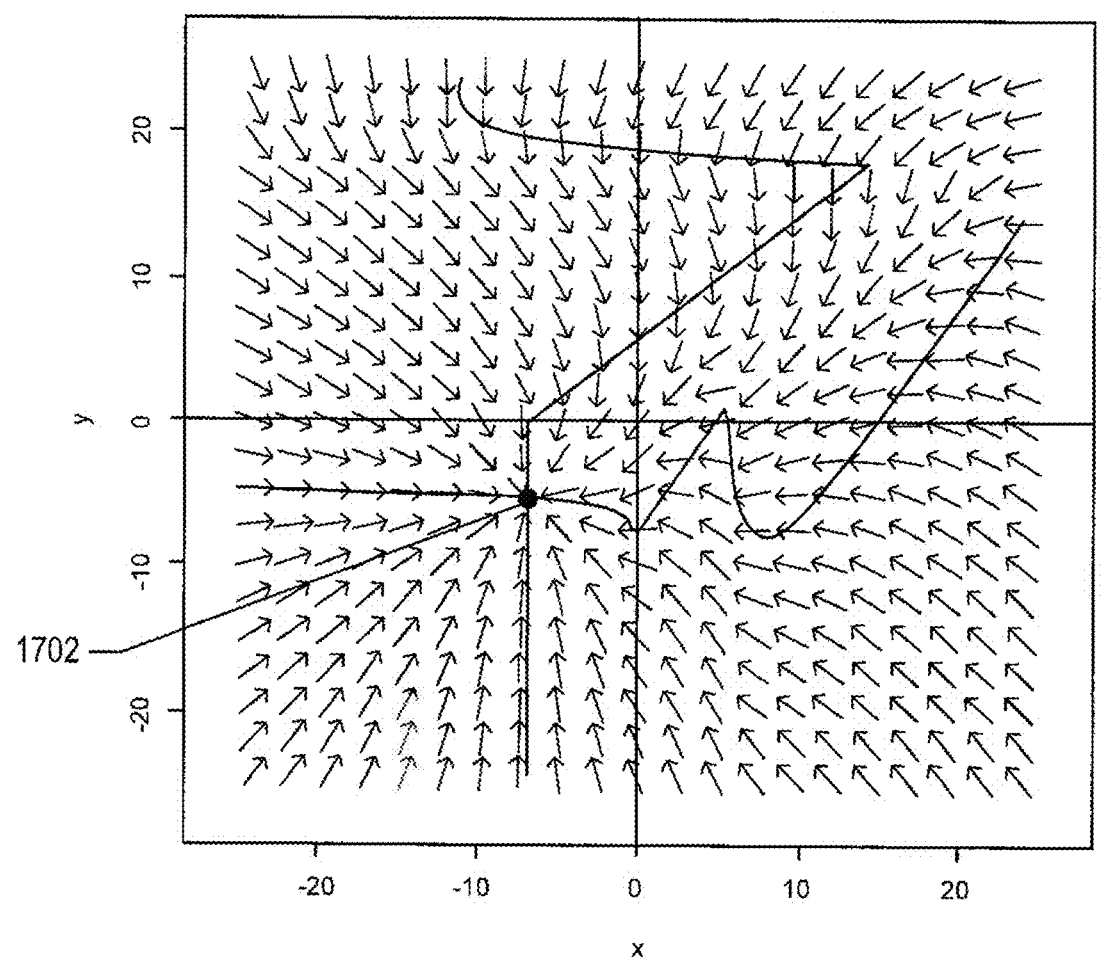

FIG. 17 shows a phase-space diagram that correlates dynamic emotion trends for the two participants.

DETAILED DESCRIPTION

The current document is directed to a semi-automated, distributed, interactive relationship-counseling system. The system is relatively complex and features various different operational modes and stages. In a first subsection, below, an overview of the phases of a relationship-counseling session is provided. In a second subsection, an overview of the semi-automated, distributed, interactive relationship-counseling system architecture is provided. A third subsection discusses the various signals and inputs as well as scaling of these various signals and inputs to a common timescale. A fourth subsection discusses the nature of the analysis and processing subsystems that lead to counseling feedback provided by the semi-automated, distributed, interactive relationship-counseling system to the relationship-counseling participants.

An Overview of the Phases of a Relationship-Counseling Session

Figure 1A:
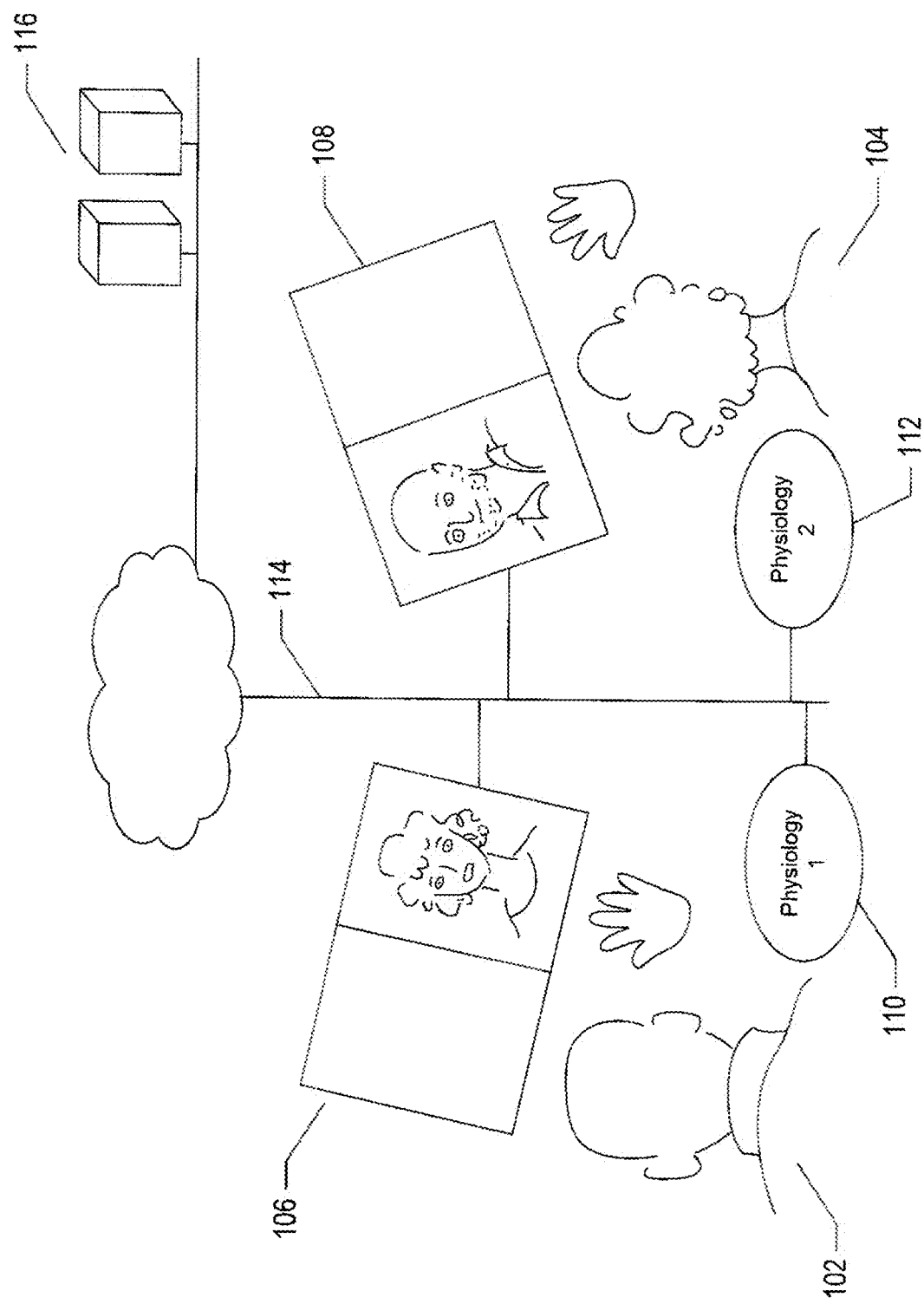

FIGS. 1A-F illustrate an initial phase of a relationship-counseling session carried out in a counseling environment provided by the currently disclosed semi-automated, distributed, interactive relationship-counseling system. FIG. 1A illustrates a relationship-counseling environment. As shown in FIG. 1A, the relationship-counseling environment includes a first participant 102 and a second participant 104. Each participant interacts with the participant's video-enabled electronic device 106 and 108 and may also be monitored by one or more physiological sensors 110 and 112. In certain cases, the physiological sensors may be in electronic communication with the video-enabled electronic devices while, in other cases, the physiological sensors may be directly or indirectly connected through electronic communications 114 to a remote relational-counseling-processing system 116. The two video-enabled electronic devices are also interconnected with the remote relational-counseling-processing system. During an initial phase of a relationship-counseling session, each participant can view the participant's partner on the video-enabled electronic device during a first-phase discussion. In many implementations, the device provides a split video screen allowing the participant to also view himself or herself during the first-phase discussion.

Figure 1B:
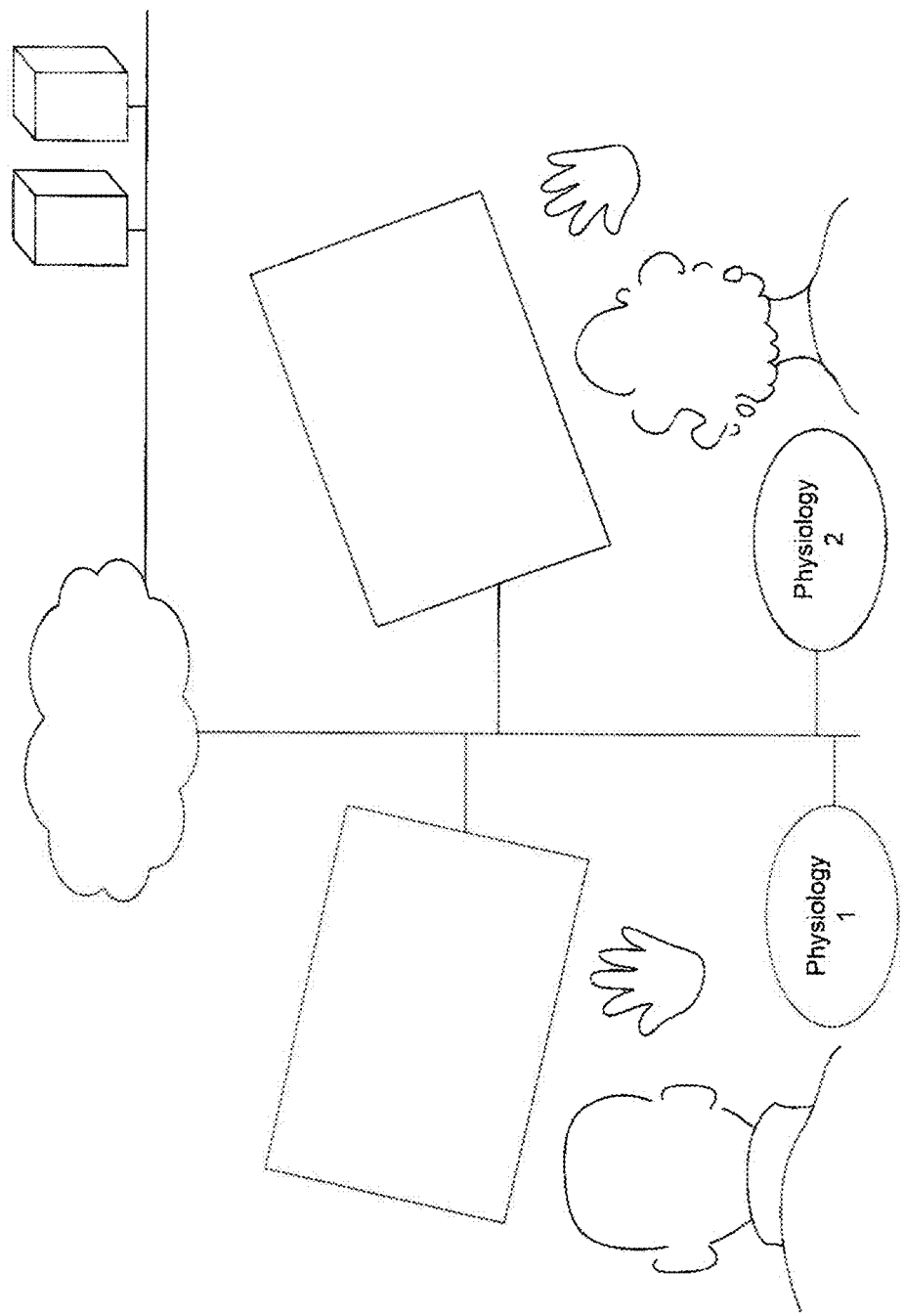
Figure 1C:
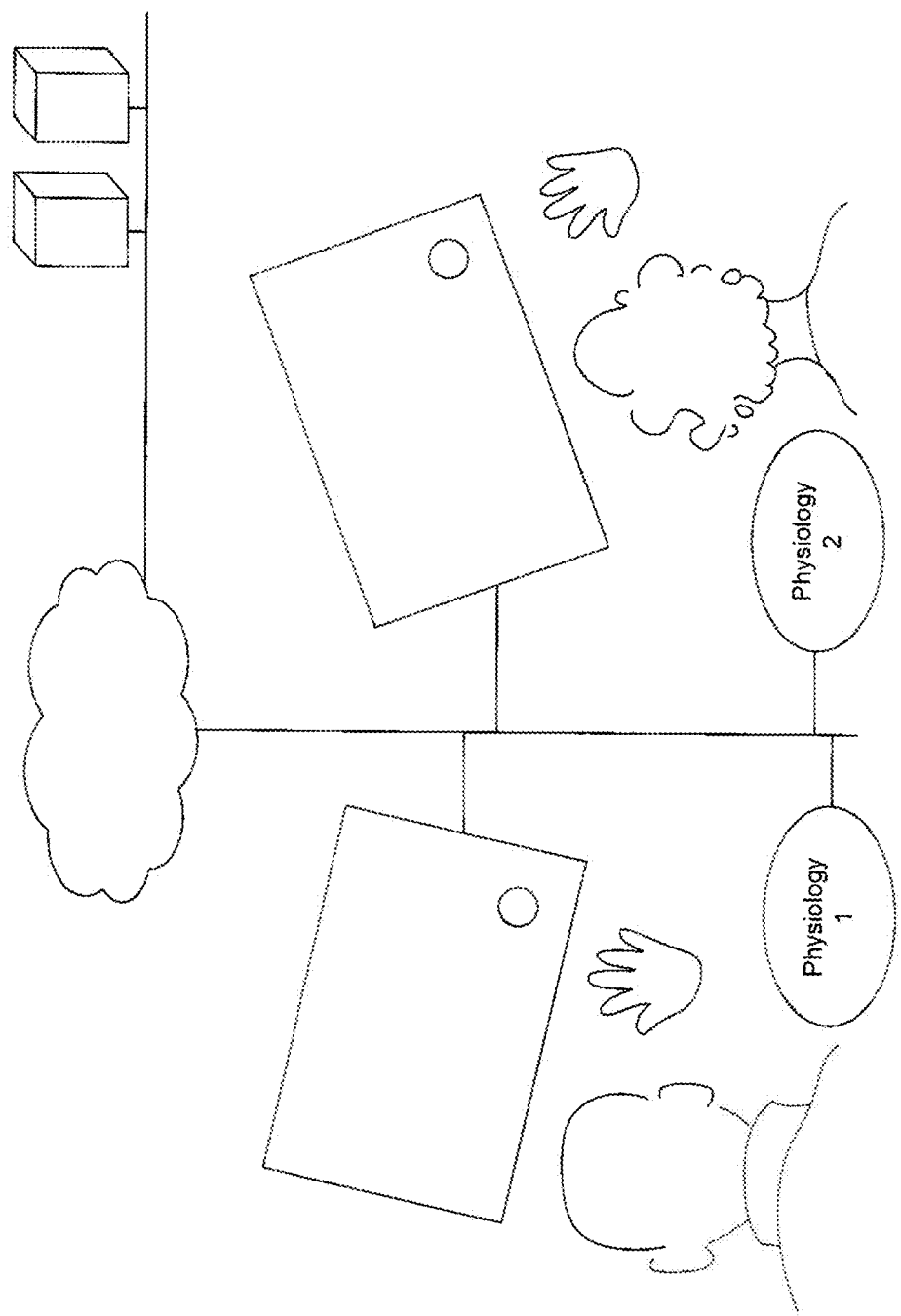
Figure 1D:
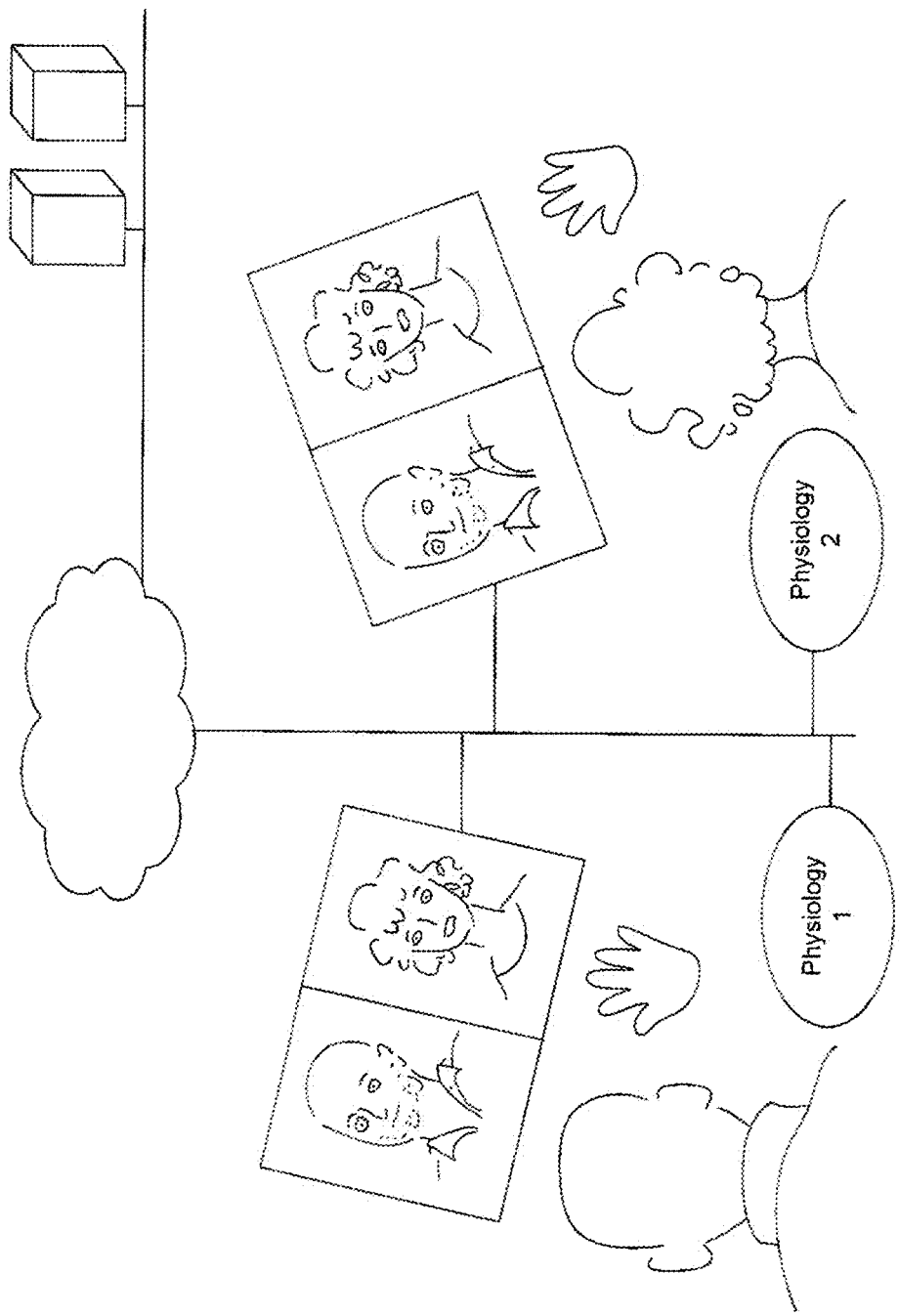

FIG. 1B shows the counseling environment prior to start of the initial phase of the relationship-counseling session. As shown in FIG. 1C, the participants power up their video-enabled electronic devices and launch a counseling application, in certain implementations, or, in other implementations, access relationship-counseling services through a web browser from a relationship-counseling-services web server within the relational-counseling-processing system. The relationship-counseling-services web server may be the same server that runs an analysis subsystem and other subsystems that together comprise the relational-counseling-processing system, may be another server in the same cloud-computing facility as the analysis-subsystem server, or may be geographically separate from the relational-counseling-processing system. Following user input to the counseling application or counseling services, a first-phase discussion is configured on behalf of the participants, their video-enabled electronic devices and physiological sensors may be prepared and for the first-phase discussion and tested, and a start feature 120 and 122 is displayed to each of the participants on the participants' video-enabled electronic devices. When the participants input an indication to the start features, the first-phase discussion begins, as shown in FIG. 1D. The participants' video-enabled electronic devices are in communication with a relationship-counseling-session-controller subsystem, in certain implementations, that may run on the same server as, or a different server than, the server that runs the counseling services and the server that includes the analysis subsystem. In other implementations, a distributed control function is implemented by the counseling applications running on the two video-enabled electronic devices or by the web server that provides relationship-counseling services. Initially, the participants may be provided with instructions for the first-phase discussion, including a topic or topics to be discussed and a set of ground rules, by the relationship-counselingsession controller. In certain implementations, participants may receive visual, graphical cues, or other information during the first-phase discussion in order to facilitate a desired level of interaction and a desired density of information collection. As shown in FIG. 1D, each participant can see both himself or herself as well as his or her partner participant on his or her video-enabled electronic device. Following a fixed length of time for the first-phase discussion, or following determination that the first-phase discussion has reached an endpoint by the relationship-counseling-session controller, the first-phase discussion terminates and execution of the counseling application or connection to the counseling services provided by the web server also terminates, as shown in FIG. 1E. At this point in time, the collected information has been transferred, along with timing information, to the remote relational-counseling-processing system.

During the first-phase discussion, a significant amount of data from audio and video inputs as well as from physiological sensors is collected. One purpose of the initial phase is to carefully record both participants during a discussion in order to calibrate the participants' voice, facial-expression, and other characteristics, observe how the participants emotionally react to one another, perceive one another's statements, observations, facial expressions, gestures, posture, and other observable characteristics, and respond to one another's statements, observations, and perceived characteristics. The dynamics of the interaction, patterns observed in the interaction dynamics, and many other features of the recorded discussions may be analyzed by powerful pattern-recognition and machine-learning subsystems within the analysis subsystem within the relationship-counseling-processing system. These types of automated observations may contribute higher-level data to the subsequent relationship analysis. In addition, the recorded first-phase discussion is played back to the participants, individually, during a second phase of a relationship-counseling session during which participants provide a rating input as the first-phase discussion is played back.

Figure 1F:
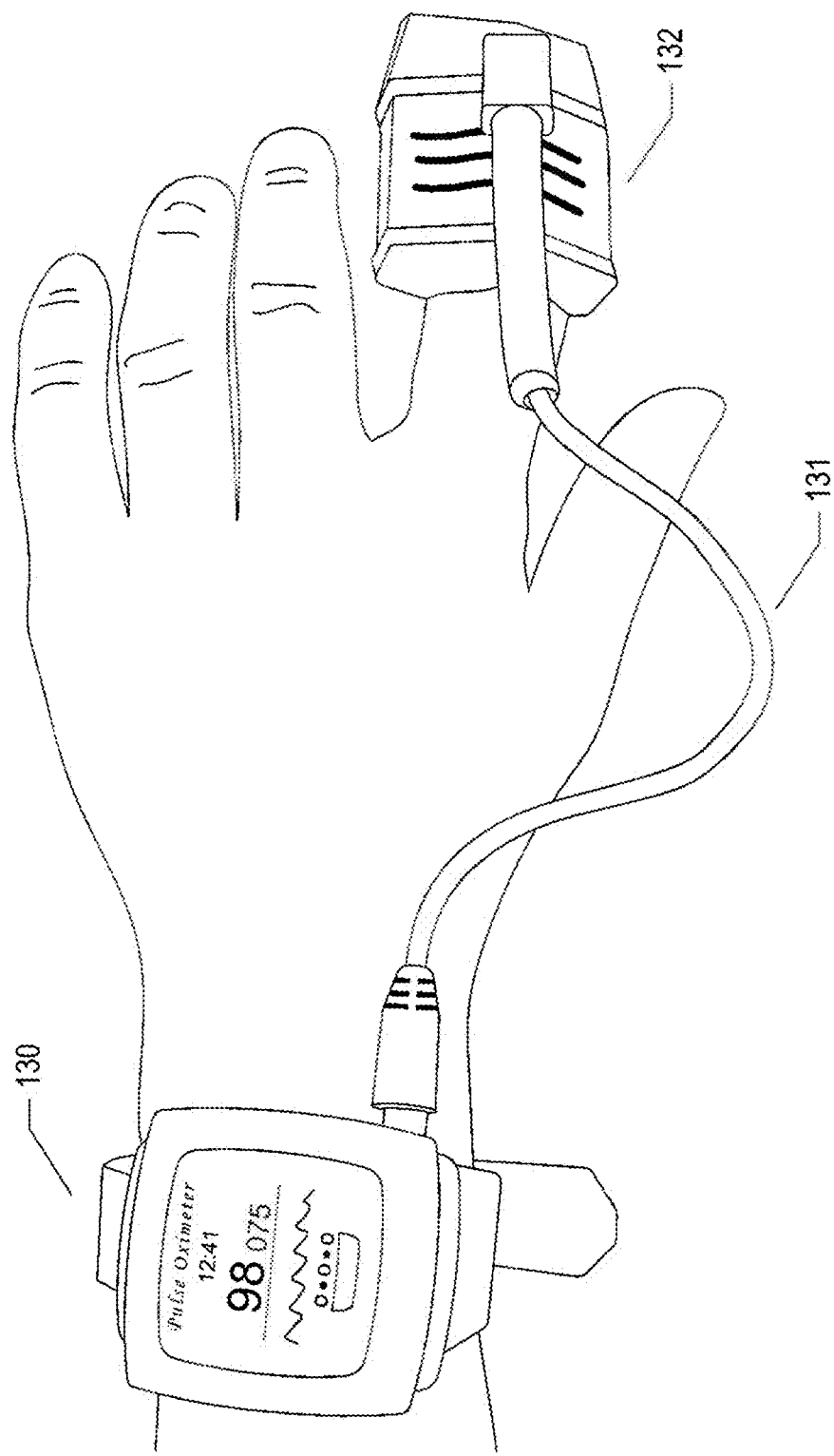

FIG. 1F shows one type of physiological sensor. The sensor 130-132 shown in FIG. 1F is a pulse oximeter, which continuously measures the level of oxygenation within a participant's blood as well as the pulse rate of the participant's heart. Many other types of physiological sensors may be employed in alternative implementations.

Figure 2A:
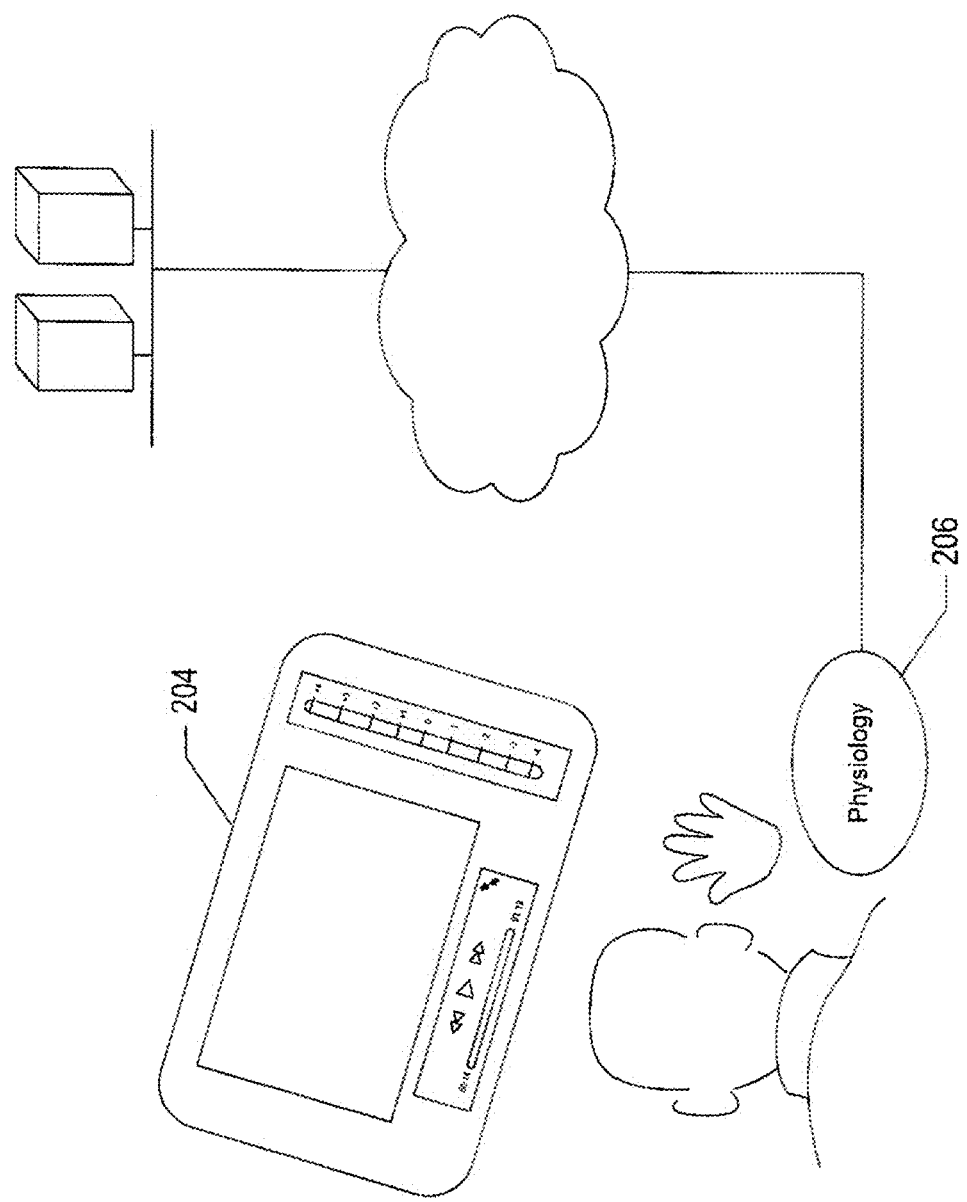
FIGS. 2A-D illustrate a second phase of a relationship-counseling session.

FIGS. 2A-E illustrate a second phase of a relationship-counseling session. In this second phase, also referred to below as a second-phase annotation sub-session, each of the two participants separately annotates the first-phase discussion previously recorded during the initial phase of the relationship-counseling session. As shown in FIG. 2A, during the second phase of the relationship-counseling session, the counseling environment includes a participant 202, the participant's video-enabled electronic device 204, and, in certain cases, one or more physiology sensors 206. The participant again powers on the video-enabled electronic device and launches a counseling application or connects to counseling services through a web browser. After providing inputs to solicit a second-phase annotation sub-session, a relationship-counseling-session-controller subsystem launches an annotation-session interactive display on the participants video-enabled electronic device and starts the second-phase annotation sub-session.

Figure 2B:
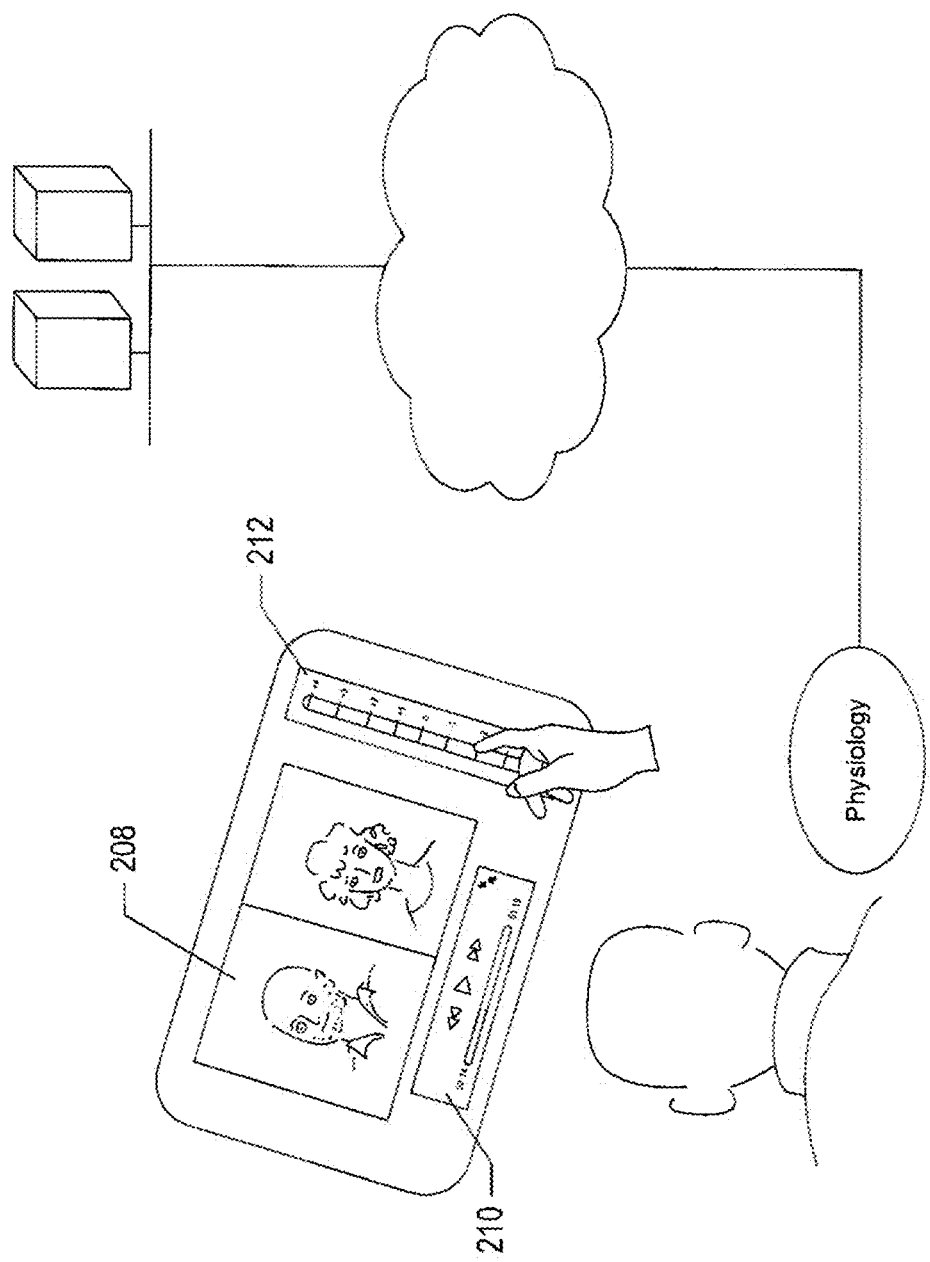

As shown in FIG. 2B, during the second-phase annotation sub-session, the first-phase discussion previously recorded during the initial phase of the relationship-counseling session is played back to the participant in split-screen mode 208. The participant is provided with playback controls 210 as well as a slidable rating feature 212 that the participant manipulates in order to input indications of varying degrees of positive and negative responses to what the participant is hearing and observing in the split-screen playback. The relationship-counseling-processing system collects the rating-feature inputs and physiological data, and scales the collected data to the common timescale to which the audio and video-recording data are scaled. In certain implementations, the time scaling, or synchronization, of the data may be carried out following recording of the data by the relationship-counseling-processing system. In other implementations, at least an initial time scaling may be carried out as the data is collected.

Figure 2C:
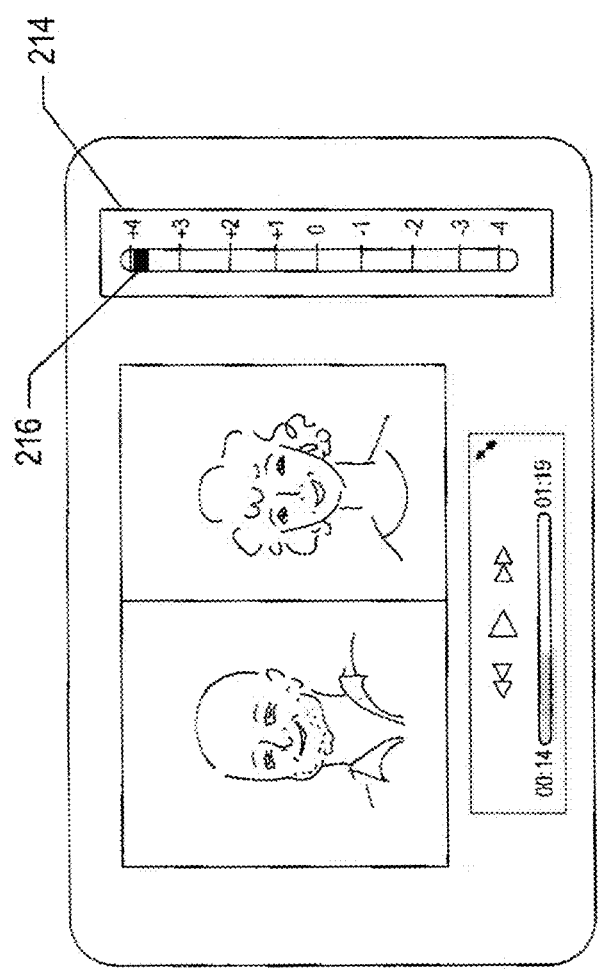
Figure 2D:
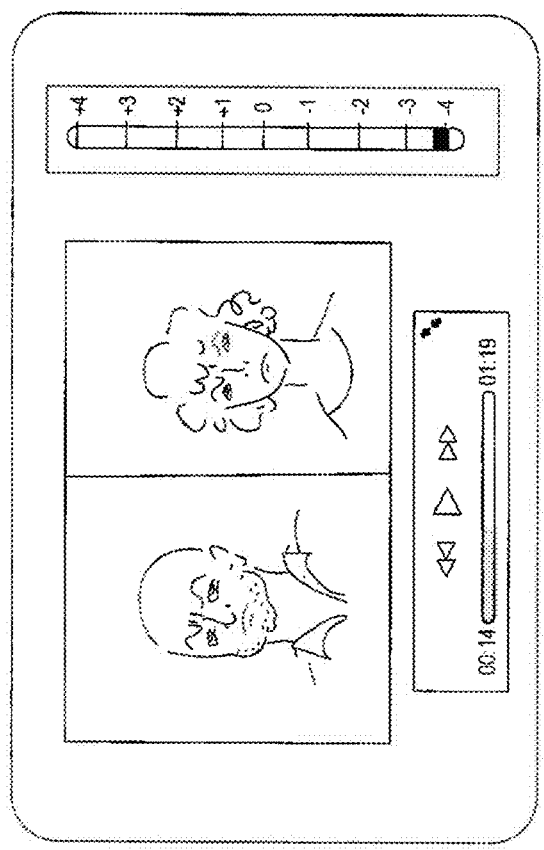

FIG. 2C shows the annotation-session display at a larger scale. The slidable rating feature 214, in the implementation shown in FIG. 2C, continuously ranges from a positive plus 4 to a negative minus 4. The position of the slider 216 is at the extreme position of the positive range, in FIG. 2C, while, in FIG. 2D, the slider 216 is at the extreme negative position of the negative range. Once the playback of the previously recorded discussion has finished, and the physiological data and slidable-rating-feature data have been collected, the second-phase annotation sub-session terminates. The second-phase annotation sub-session may be completed at different times by the two participants.

Figure 2E:
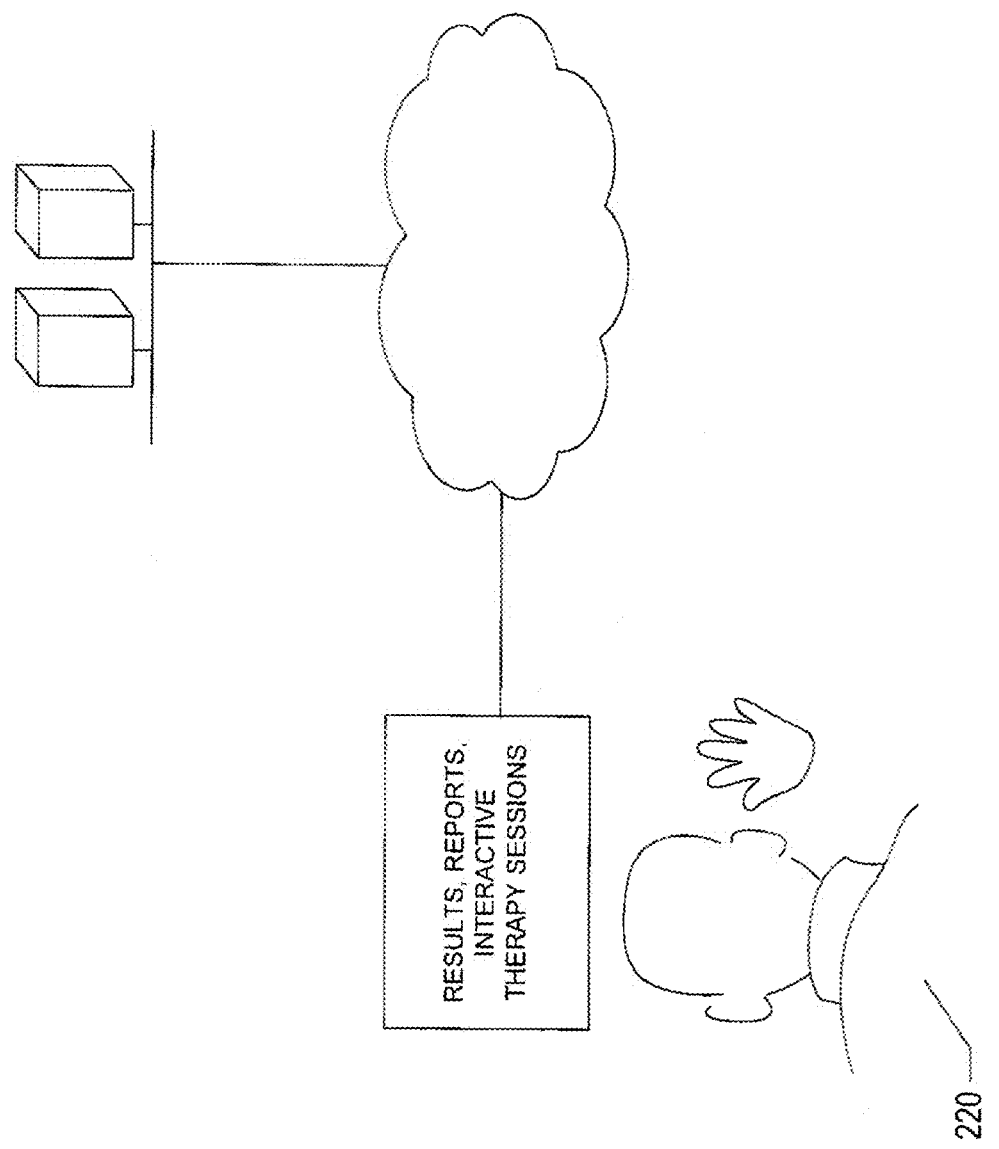
FIG. 2E illustrates a third phase of a relationship-counseling session.

FIG. 2E illustrates a third phase of a relationship-counseling session. In the third phase, a participant 220 logs back into the relationship-counseling application or connects to relationship-counseling services provided by the web server in order to receive results, reports, and, in certain cases, interactive therapy sessions with an automated counselor or a human therapist. Again, the results, reports, and interactive therapy sessions are displayed to the participant's video-enabled electronic device. The third phase of the relationship-counseling session generally occurs after a significant period of time has elapsed since completion of the second phase of relationship counseling by both participants. The elapsed time allows the relationship-counseling-processing system to fully scale the various different inputs, signals, and collected data to a common timescale, allows for execution of complex data-analysis and machine-learning subsystems, and, in certain implementations, may allow time for human-therapist review of the results in preparation for report and result in generation and/or interactive therapy sessions.

Figure 3:
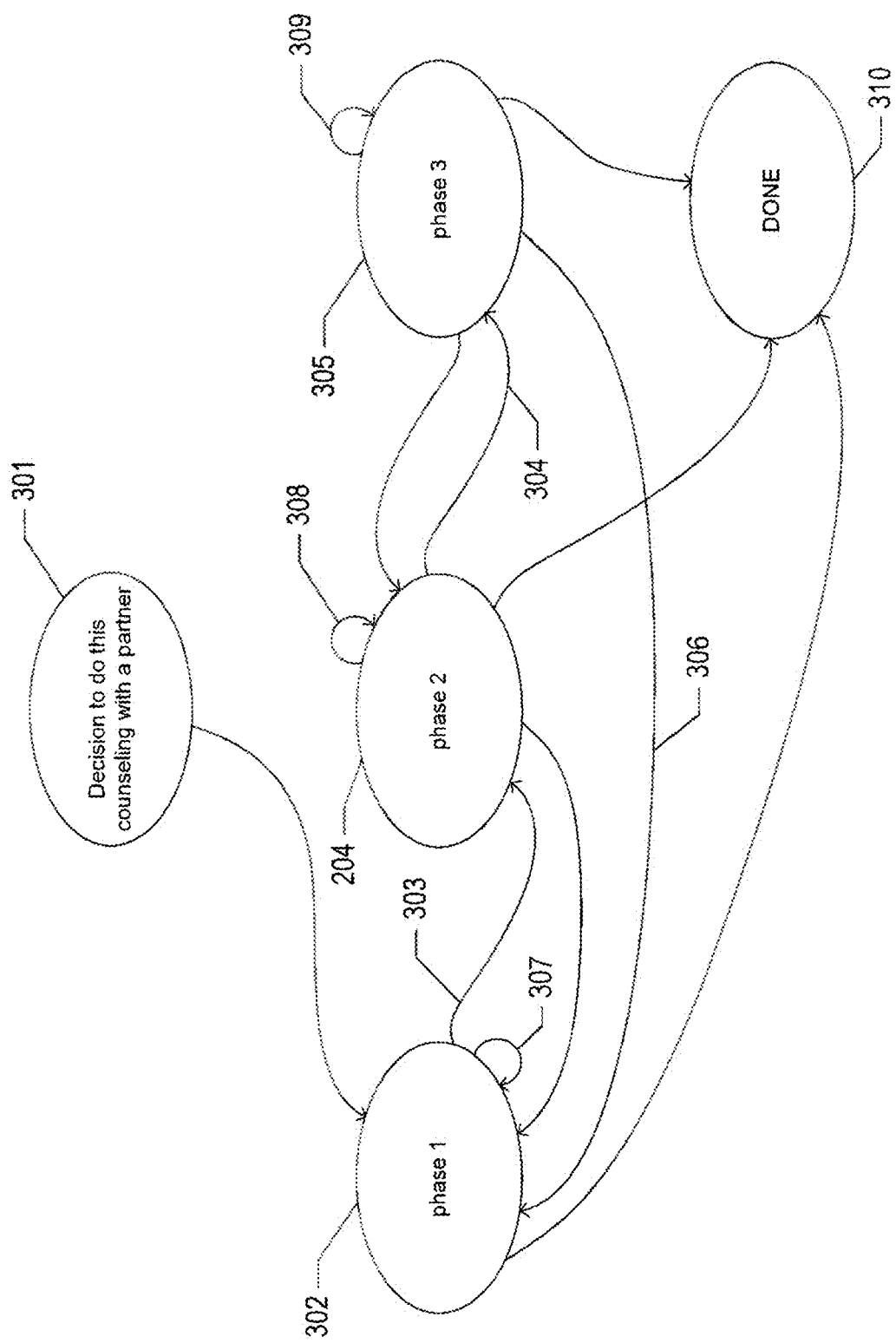
FIG. 3 shows a simple state-transition diagram for relationship counseling.

FIG. 3 shows a simple state-transition diagram for relationship counseling that is facilitated and partially automated by the disclosed semi-automated, distributed, interactive relationship-counseling system. A starting state 301 represents a pre-counseling state for a pair of participants who have decided to undertake relationship counseling. At some point in time, the participants initiate the initial-phase discussion, represented by state 302. When the initial phase is successfully completed, a transition 303 to a second-phase-annotation-sub-session state 304 may occur. This is a bifurcated state, in that both participants need to separately complete the second-phase annotation sub-session before a transition 311 to the third-phase state 305 can occur. Depending on the types of reports and advice received by the participants, the participants may elect to transition 306 back to the first-phase state 302 in order to undertake a subsequent relationship-counseling session. Of course, during any particular relationship-counseling phase, interruptions and problems may arise, in which case that phase may be restarted from the beginning or from an interruption point, as represented by transitions 307-309. Eventually, when the participants have satisfied their goals in undertaking relationship counseling, the participants may transition to a terminal state 310. Of course, participants may elect to discontinue relationship counseling during any of the 3 phases of a relationship-counseling session.

Overview of the System Architecture for One Implementation of the Semi-Automated, Distributed, Interactive Relationship-Counseling System One implementation of the semi-automated, distributed interactive relationship-counseling system ("SDIRCS") performs the following functions: (a) it provides a real-time audio/video session between the participants of the first phase discussion; (b) it creates a high quality recording of synchronized audio, video, and physiology data of both participants for subsequent second-phase annotation sub-session and the third phase of a relationship-counseling session data analysis phases; (c) it creates a mechanism to synchronize and map all captured audio, video, and physiology signals to a single high precision reference clock for all SDIRCS participants; (d) it creates a mechanism to output synchronized audio, video, and physiology signals to multiple output devices preserving precise timing relationship between these synchronized signals and human senses.

The real-time audio/video session between the participants results in a certain loss of quality of transmitted data due to the Internet quality-of-service issues such as variability of the available network bandwidth between the participants' devices, delays and loss of audio and video transport data frames, etc. The real-time audio/video session introduces significant time performance constraints for the communication system because the participants of the audio/video session generally notice communication delays that are greater than 120 milliseconds. The participants of the audio/video session also notice when visual lip movements of a speaker do not match the sound of the spoken words. These factors—the human perception of quality of real-time synchronized communication and the variability of Internet bandwidth available for the communications—cause the designers of real-time audio/video conferencing systems to optimize the delivery time and data compression at the expense of quality of the audio, video, and synchronization between the audio and the video of all the participants.

In addition to providing the real-time audio/video session between the participants of the first phase discussion, in one implementation SDIRCS also creates a high-quality recording of synchronized audio, video, physiology data, and the timing information for both participants for subsequent data analysis phase. SDIRCS captures and reproduces the precise audio/visual experience for each participating individual during multiple phases of SDIRCS operations. This is achieved by constructing and reproducing the precise time series of the audio/video signals that are presented to each participating individual during multiple phases of SDIRCS operations.

One implementation of SDIRCS is to combine the real-time audio/video session management between the participants with the recording of audio, video, and physiology data including all input and output signals' timing information for both participants. It is important to note that a typical synchronization requirement for the audio/video conference over the public Internet is about 120 milliseconds. SDIRCS has a much more significant synchronization requirement—the goal of some implementations is to get to a 10-millisecond synchronization of all audio, video, and physiology data of all participants to enable machine learning and other powerful forms of data analysis of the acquired data. An additional SDIRCS's objective is to record the higher quality of audio, video, and physiology data than the corresponding audio, video, and physiology data that are used during the real-time audio/video conferencing because the higher quality data allows a better subsequent data analysis. The overall SDIRCS system synchronization performance is limited by the weakest link among SDIRCS hardware components, as discussed below.

Figure 4A:
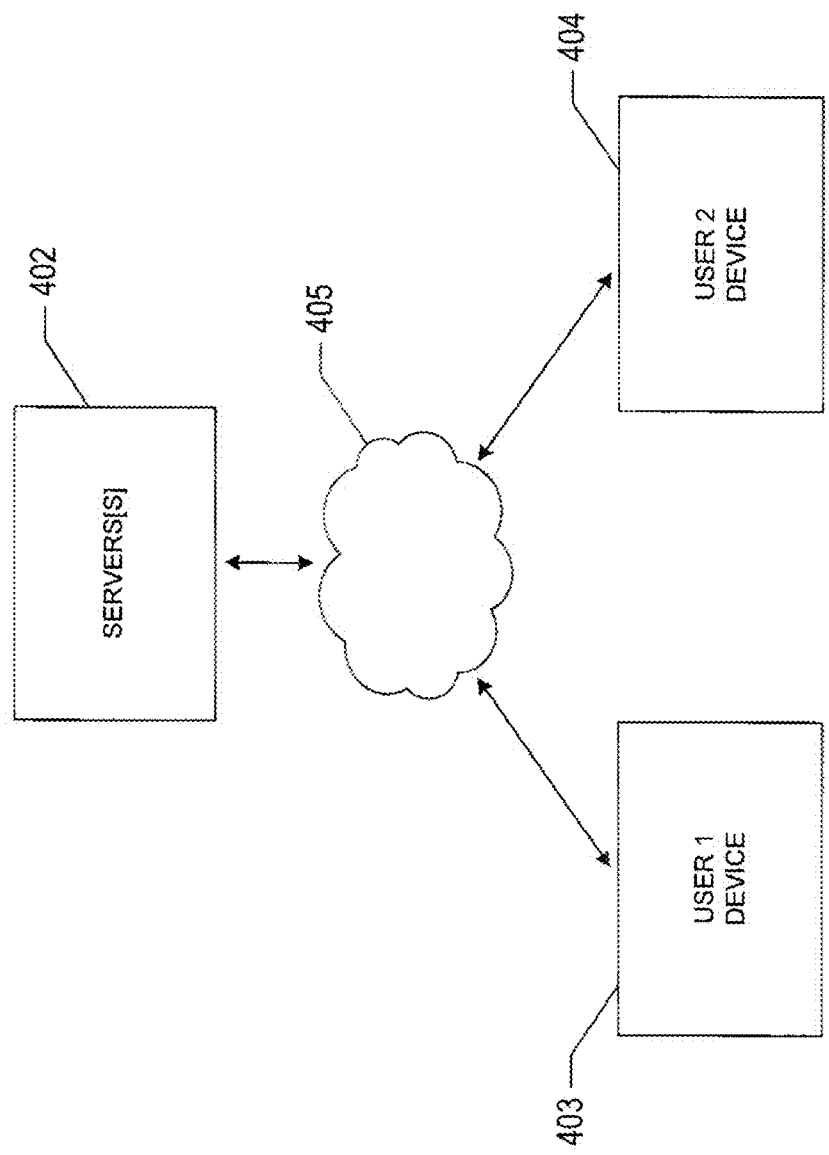
FIG. 4A-C illustrate an architecture for one implementation of the semi-automated, distributed, interactive relationship-counseling system.
Figure 4B:
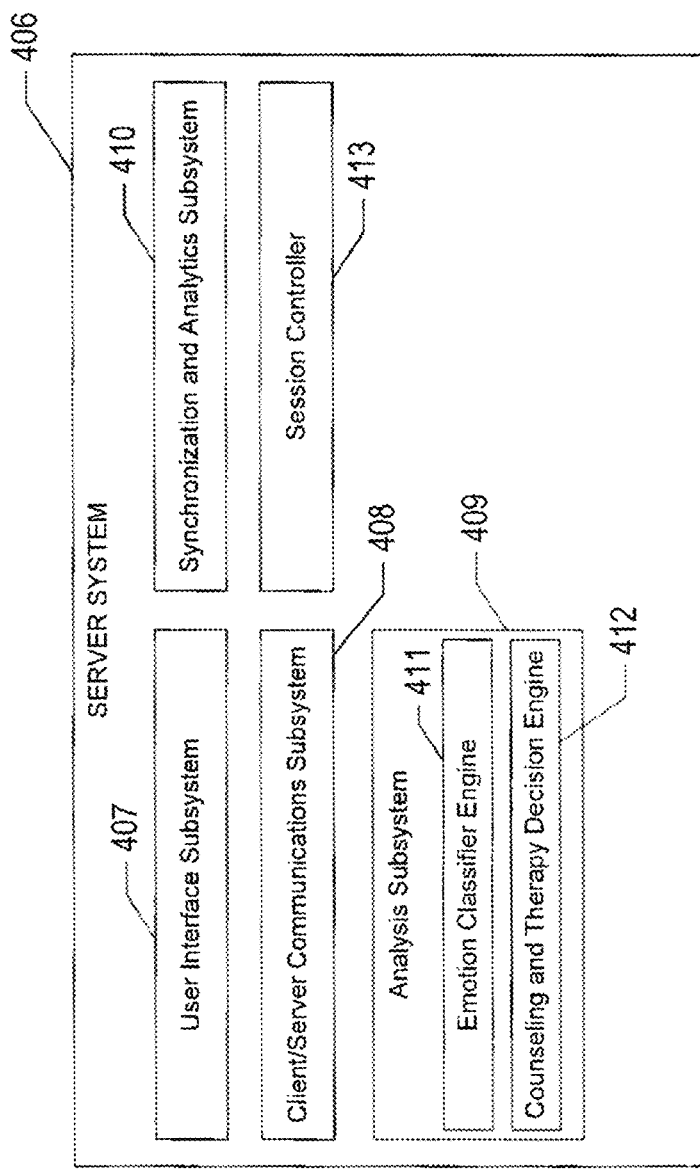
Figure 4C:
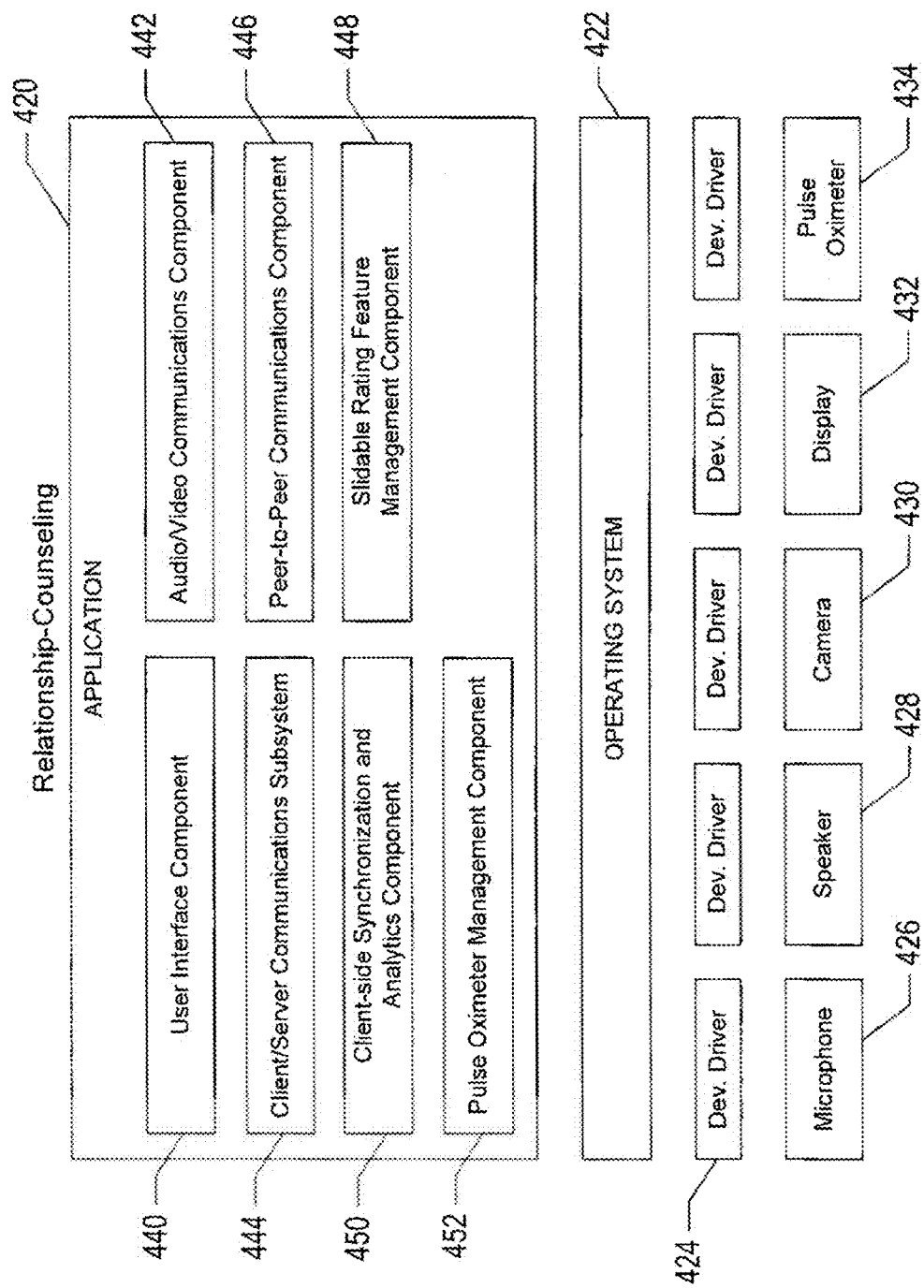

FIGS. 4A-C illustrate an architecture for one implementation of the semi-automated, distributed, interactive relationship-counseling system disclosed in the current document. As shown in FIG. 4A, in a simple implementation, the semi-automated, distributed, interactive relationship-counseling system includes one or more servers 402, in many implementations resident within a cloud-computing facility, and two video-enabled participant electronic devices 403 and 404. As indicated by cloud symbol 405, the servers and video-enabled participant electronic devices are interconnected through electronic communications.

FIG. 4B shows a block diagram of a server in a single-server implementation. The server 406 includes a user-interface subsystem 407, a communications subsystem 408 that provides for electronic communications with the two video-enabled participant electronic devices, a server-side timing-and-synchronization-management component 414, an analysis subsystem 409, and a synchronization and analytic subsystem 410. The analysis subsystem 409 includes an emotion-classifier engine 411 and a counseling-and-therapy-decision engine 412. A session controller 413 cooperates with the user-interface subsystem 407 and the communications subsystem 408 to control initial-phase discussions and second-phase annotation sub-sessions.

FIG. 4C provides a block diagram for a video-enabled participant electronic device. The video-enabled participant electronic device includes a relationship-counseling application 420 that executes in an execution environment provided by the device operating system 422. The device operating system includes multiple device drivers, such as device driver 424, that control operation of a microphone 426, a speaker 428, one or more video cameras 430, a display 432, one or more physiology sensors 434, rating dial 436, and a clock 438. The relationship-counseling application includes a user-interface component 440, an audio/video communications component 442, a client/server communications component 444, a peer-to-peer communications component 446, a slidable-rating-feature-management component 448, a client-side synchronization and analytics component 450, a pulse oximeter management component 452, and a client-side timing-and-synchronization-management component 454. Additional components may be included to manage other types of physiology sensors. The client/server communications component 444 manages communications with the relationship-counseling server or servers and the peer-to-peer communications component 446 manages communications with a partner participant's video-enabled electronic device.

Signals, Inputs, Outputs, and Time Scaling

Figure 5A:
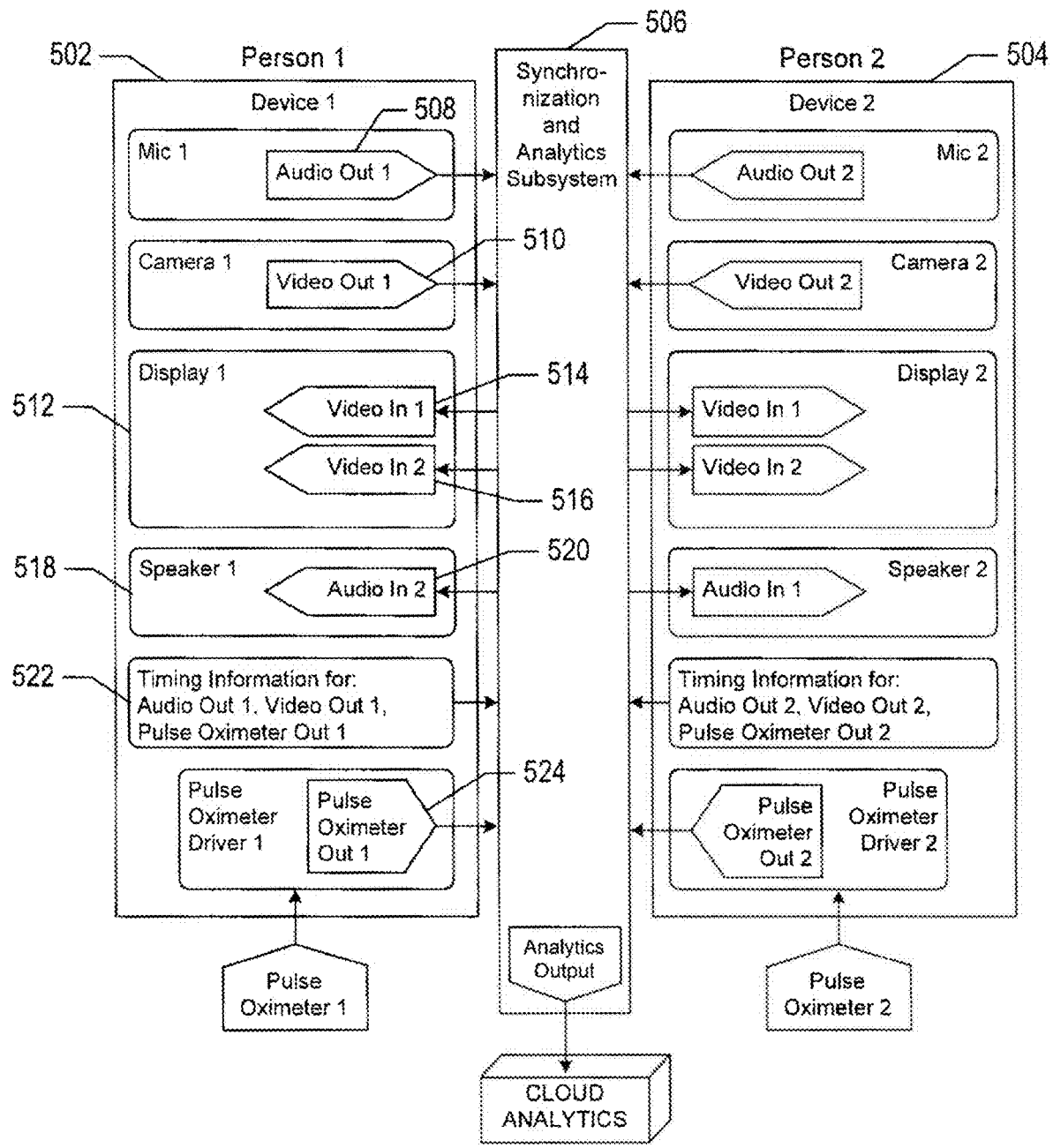
FIG. 5A-D illustrate the signals generated, output, transmitted, and input during the initial phase of a relationship-counseling session.

FIGS. 5A-D illustrate the signals generated, output, transmitted, and input during the initial phase of a relationship-counseling session. FIG. 5A illustrates signals input to, and output by, the video-enabled participant electronic devices. Rectangle 502 represents the video-enabled electronic device of a first participant, rectangle 504 represents the video-enabled electronic device of the second participant, and column 506 represents the communications, synchronization, and other subsystems within the relationship-counseling-processing system. The two video-enabled electronic devices have identical inputs and outputs, next discussed with reference to video-enabled electronic device 502. The video-enabled electronic device outputs an audio signal 508 generated by a microphone and a video signal 510 generated by a video-camera subsystem. The display of the electronic device 512 receives, as input, video signals 514 and 516. Video signal 514 is generated by the camera within the video-enabled electronic device 502 and a video signal 516 is generated by the camera within the second electronic device 504. Note that the two video signals are output from the electronic devices to the relationship-counseling-processing system and then received back from the relationship-counseling-processing system as a pair of video signals that have been initially scaled to a common clock. The speaker 518 within the electronic device receives an audio signal 520 initially output by electronic device 504 to the relationship-counseling-processing system and then forwarded by the relationship-counseling-processing system to electronic device 502. The pulse-oximeter signal 524 is output to the relationship-counseling-processing system. Finally, timing information for the locally generated signals 522 is continuously output to the relationship-counseling-processing system. This timing information includes the timing data that SDIRCS generates and utilizes to keep track of time progression of multiple clocks in SDIRCS distributed processing system and to keep track of the timing of the SDIRCS distributed processing system events. Important elements of this timing information are the integrated-time-correlation table for SDIRCS signals for all participants ("ITCT") and the integrated-system-events-timing table ("ISETT").

Conceptually, the integrated-time-correlation table is the time translation table between multiple SDIRCS system's clocks that allows SDIRCS to derive the time of one clock from the known time of another clock. This will be explained in detail in the following sections. Conceptually, the integrated-system-events-timing table is the table of specific SDIRCS system events. integrated-system-events-timing table can look like the following table:

| EVENT_ID | DEVICE_ID | CLOCK_ID | EVENT_TIME |
|---|---|---|---|
| Audio 1 Start | 2 | 7 | 6,023,123 |

In the Table above:
EVENT_ID is a specific SDIRCS system event ID, for example "Audio 1 Start" ID;
DEVICE_ID is the ID of a SDIRCS device corresponding to this specific EVENT_ID, for example Device #2;
EVENT_TIME is the time of the EVENT_ID occurrence measured in microseconds (or in other high precision units of time), for example EVENT_TIME=6,023,123 microseconds. EVENT_TIME can be measured by a free-running clock, and it can also be measured relative to many different SDIRCS events, for example EVENT_TIME equal zero may correspond to the start of SDIRCS data acquisition (the "START" event discussed below).
CLOCK_ID is the ID of a SDIRCS clock that was utilized by SDIRCS system to measure the EVENT_TIME, for example SDIRCS Clock #7.

Figure 5B:
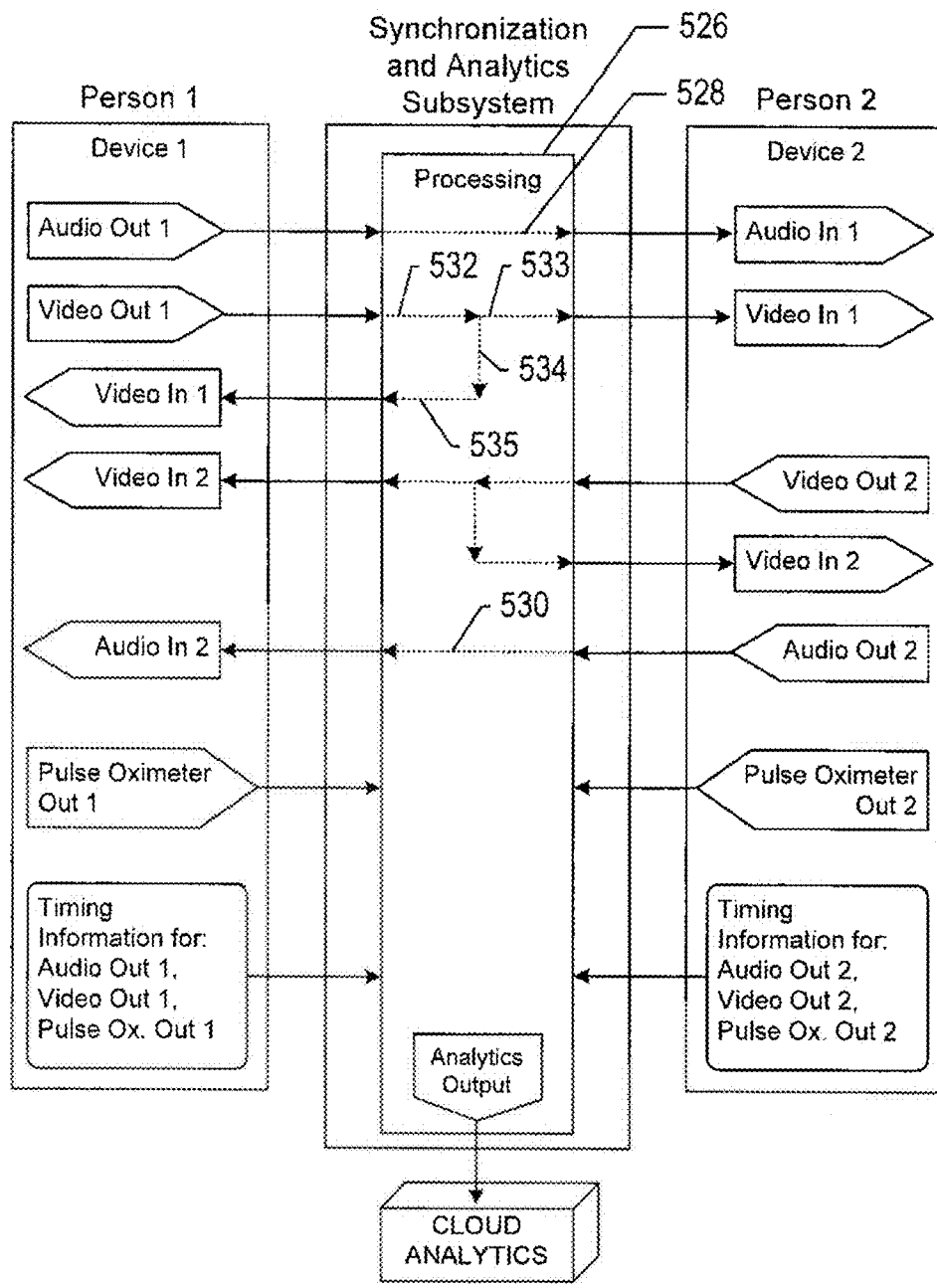
Figure 5C:
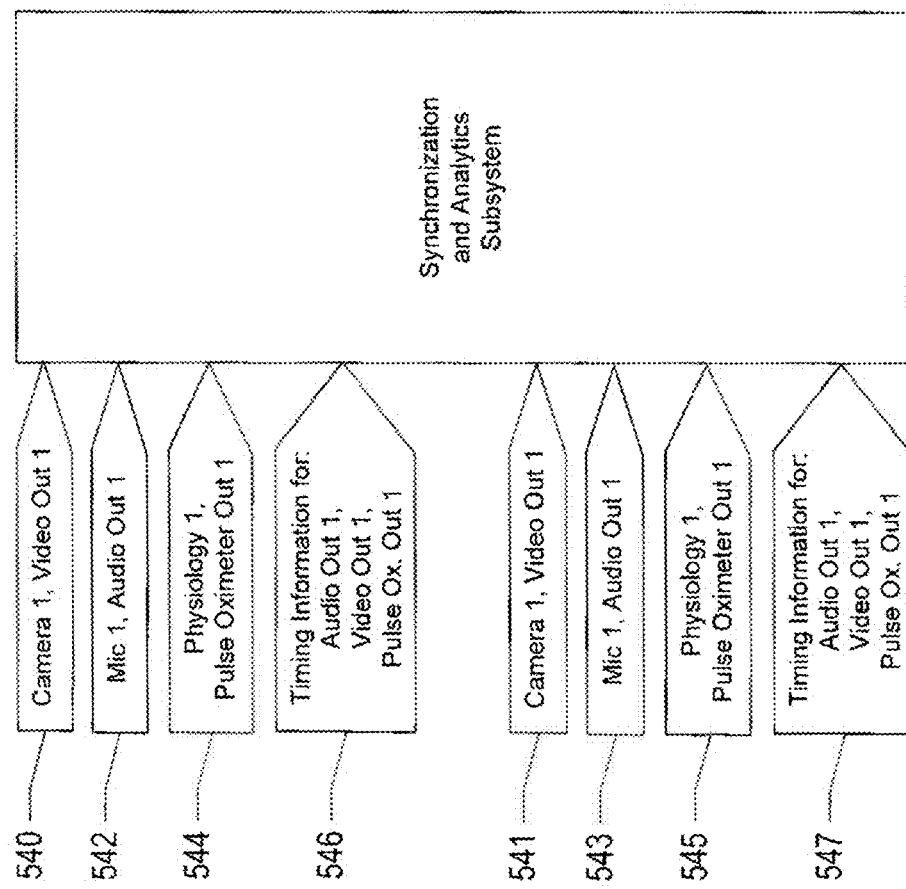

FIG. 5B illustrates routing of signals between the participant electronic devices. Routing is indicated, in FIG. 5B, by dashed lines within the signal-processing component 526 of the relationship-counseling-processing system. Audio signals output by one device are processed and then input to the other device, as represented by dashed lines 528 and 530. A video signal output by one device is processed by the processing component of the relationship-counseling-processing system and then output back to that device as well as to the other electronic device, as indicated by dashed lines 532-535 with respect to the video signal initially output from the first electronic device 502. FIG. 5C illustrates the signals generated within the electronic devices and output to the relationship-counseling-processing system. Again, the signals include video signals 540-541, audio signals 542-543, physiology-sensor signals 544-545 and timing signals 546-547.

Figure 5D:
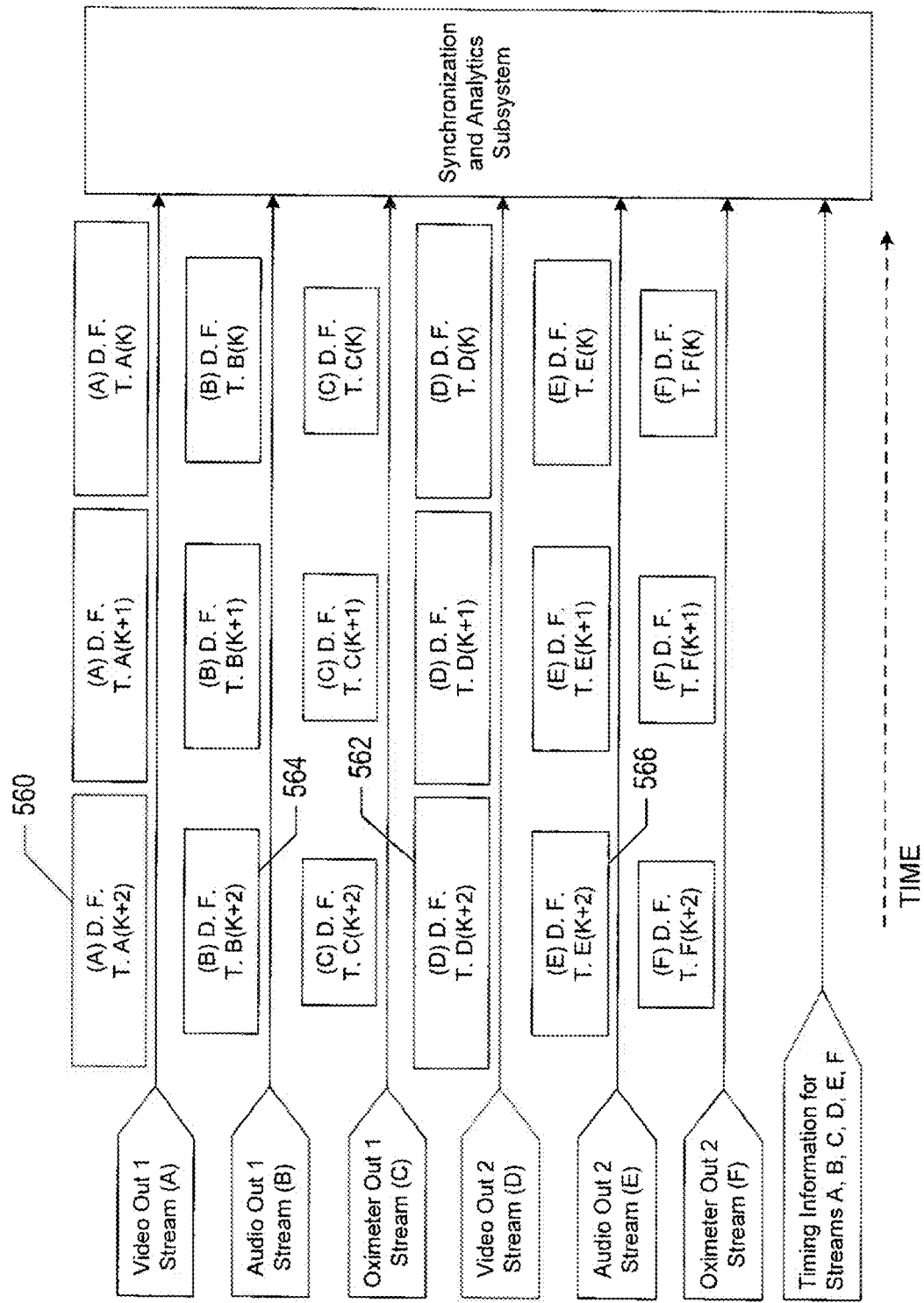

FIG. 5D illustrates the timescale problem associated with the various signals output by the video-enabled electronic devices and input to the relationship-counseling-processing system, including the synchronization and analysis subsystem of the relationship-counseling-processing system. The signals output from the video-enabled electronic devices can be considered to be partitioned into frames transmitted by electronic communications from the video-enabled electronic devices to the relationship-counseling-processing system. In FIG. 5D, these frames are shown as rectangles, such as rectangle 560. Assuming that the left-hand edge of the frame-representing rectangle corresponds to an absolute time at which the frame is sent, FIG. 5D illustrates the fact that the frames in the video stream output by the first electronic device, including frame 560, are not synchronized, in time, with the frames output by the second electronic device, including frame 562. Similarly, frame 564 output by the first electronic device is not synchronized, in time, with frame 566 output by the second electronic device. Not only are the transmission times of the frames not synchronized between electronic devices, the frames may be output at other than strictly fixed intervals in time and the overall timescales for each of the different signals may differ. A large part of the synchronization-related processing within the relationship-counseling-processing system involves correlating the different output-signal frames in time so that the data output by both electronic devices can be commonly assigned to a single, common timescale.

Figure 6A:
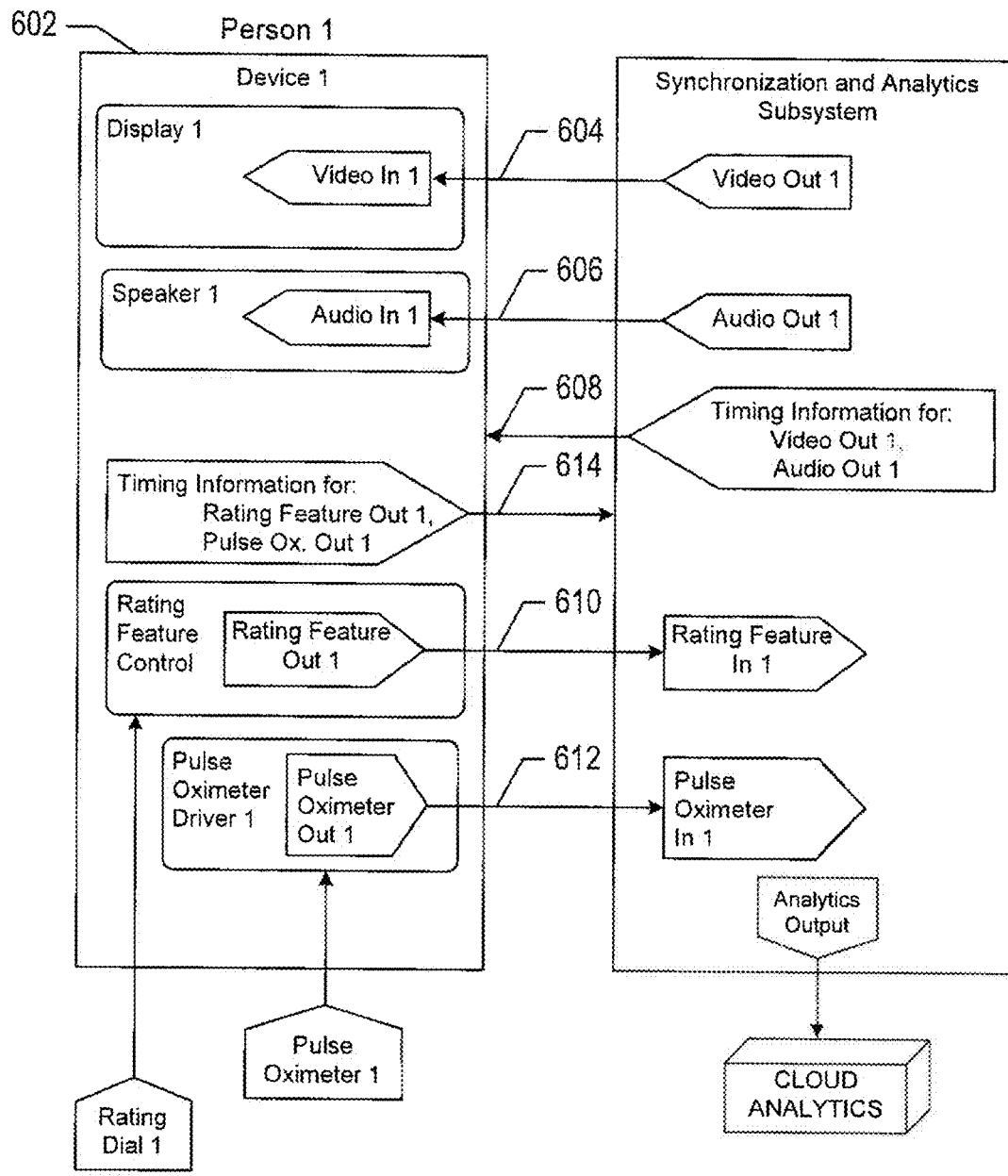
FIGS. 6A-B illustrate how relationship-counseling session participants experience the audio and video signals when these participants are not placed in one location.

FIG. 6A illustrates how SDIRCS participants experience the audio and video signals when these participants are not placed in one location. The participants person 1 604 and person 2 620 could be located far from one another. There is a delay for the captured audio/video data of one participant to be transmitted and presented to the other participant. In one SDIRCS implementation each participant will hear his/her own voice as soon as he/she speaks. The sound from mouth 1 605 of person 1 604 will propagate with the speed of sound to ears 1 608 of person 1 604, and the sound from mouth 2 622 will also propagate with the speed of sound to ears 2 621 of person 2 620. But there will be a transmission and processing delay for each participant to hear the other participant's voice and to see the other participant displayed on a monitor (or to see both participants in a split-screen video on a monitor). In order to analyze the audio, video, and physiology data for both participants, it is important to know precisely what and when these participants say, hear, and see, and to have their audiovisual sensory signals and physiological measurements mapped to a single high-precision common time reference clock.

Figure 6B:
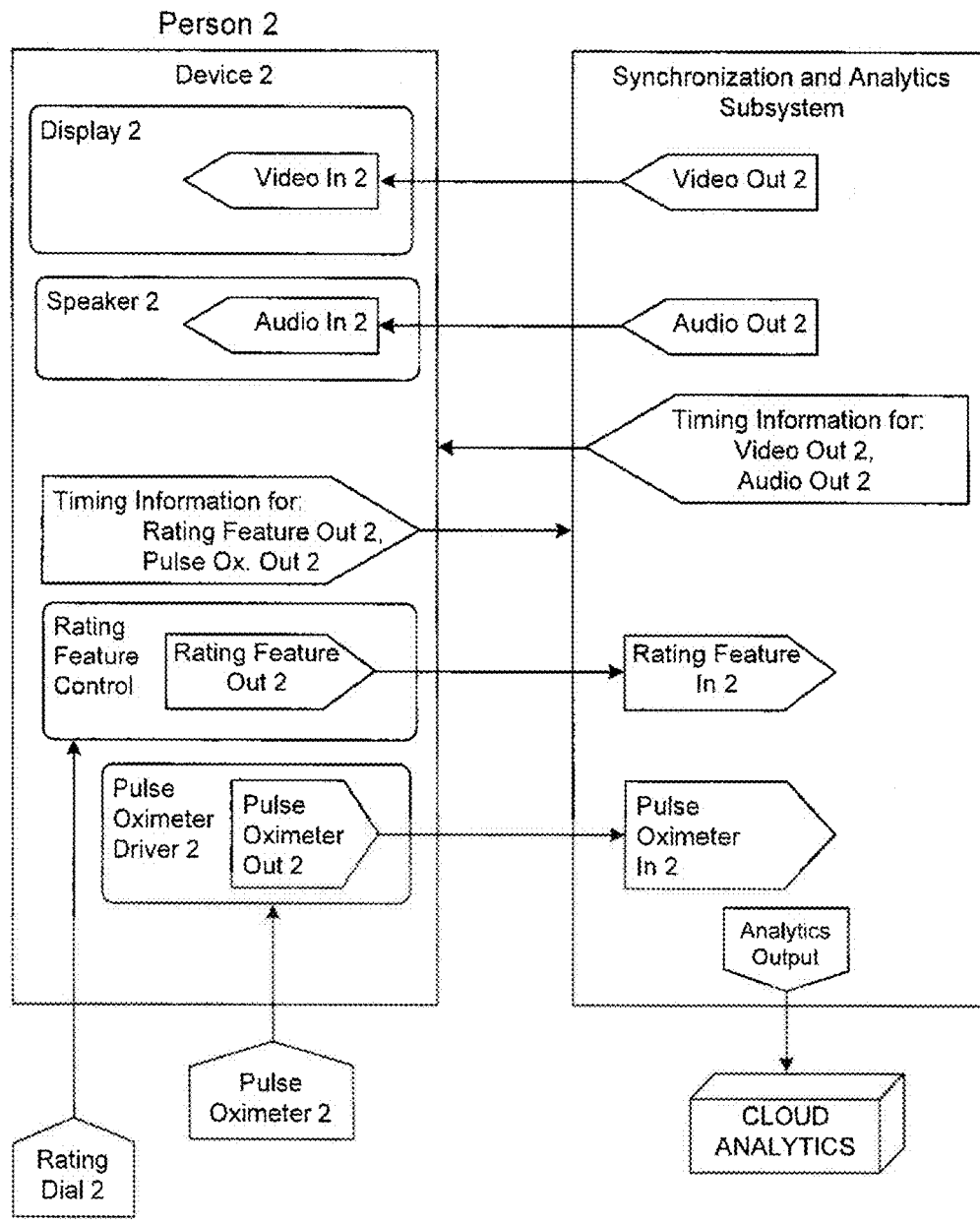

FIG. 6B further illustrates how SDIRCS participants experience the audio and video signals when these participants are not placed in one location. A1 640 depicts one of the time segments when person 1 speaks (shown as "P1 speaks"). Speaking period is shown as an elevated level of a corresponding audio signal. The speaking periods illustrate the turns of the speech between persons 1 and 2; these turns of the speech may include some periods of speaker's silence. These turns of the speech start when one person starts speaking and they generally end before another person starts speaking. An overlap when both participants speak is also possible. These turns of the speech-based diagrams are shown here to illustrate the asymmetry between person 1 and person 2 audio/video experiences as is demonstrated below and not to identify the audio signals generated by persons 1 and 2 precisely. In this FIG. 6B, A1 starts at the time=1 time unit and A1 lasts for 3 time units. B1 642 depicts one of the time segments when person 2 speaks (shown as "P2 speaks"). B1 starts at the time=5.5 time units and B1 lasts for 1 time unit. A1' 644 depicts the time segment of person 2 hearing person 1 speaking that corresponds to the time segment A1 640. A1' 644 assumes no sound and no timing distortions of the original A1 sound. For illustration purposes, A1' 644 assumes a fixed delay of one unit of time between the person 1 speaking and the person 2 hearing the corresponding audio signal. Therefore A1' 644 starts at the time=2 time units and it lasts for 3 time units. B1' 646 depicts the time segment of person 1 hearing the person 2 speaking that corresponds to the time segment B1 642. B1' assumes no sound and no timing distortions of the original B1 sound; B1' also assumes a fixed delay of one time unit for illustration purposes. Therefore BF starts at 6.5 time units and BF lasts for 1 time unit. The time progression in this FIG. 6B is the progression of a single high precision physical wall clock, shown as Reference Clock 645. It is not important for the purpose of this illustration to specifically identify such a clock—it is important to understand that these timing observations at different locations of participant 1 and participant 2 are made relative to a single high precision physical wall clock. FIG. 6B shows that there is a 2.5 time units distance between the beginning of B1' segment at 6.5 time units (person 1 hears the start of person 2 talking during person's 2B1 segment) and the ending of A1 segment at 4 time units (person 1 hears the end of his own talking segment A1). person 2 will have a very different experience—for person 2 there is only a 0.5 time units distance between the beginning of B1 segment at 5.5 time units (person 2 hears the beginning of his own talking segment B1) and the ending of A1' segment at 5 time units (person 2 hears the end of Person's 1 talking during the Person's 1 A1 segment). FIG. 6B shows that even without any loss of data during the transmission of audio/video signals in the first phase discussion session between the persons 1 and 2, the timing relationship between the corresponding audio and video signals will be substantially different for these persons 1 and 2. The persons 1 and 2 will have substantially different sensory experiences which will affect their physiological responses—this is significant for any system that measures the participants' physiology and emotion, such as SDIRCS. Therefore this FIG. 6B shows that in order to analyze the audio, video, and physiology data for both participants and for their interaction, it is necessary to capture and reconstruct multiple sensory contexts of the audio, video, and physiology data collected for all SDIRCS participants: (1) the sensory context of person 1 when a split-screen video is played for person 1 during the initial phase of SDIRCS; (2) the sensory context of person 2 when a split-screen video is played for person 2 during the initial phase of SDIRCS; (3) the sensory context of person 1 when a reconstructed post-processed split-screen video is played for person 1 during the second phase annotation session of SDIRCS; (4) the sensory context of person 2 when a reconstructed post-processed split-screen video is played for person 2 during the second phase annotation session of SDIRCS; (5) the sensory context of any third party observing person 1 or person 2 or both person 1 and person 2 during various phases of SDIRCS; (6) many additional possible contexts.

Capturing the Signals that are Sensed by the Participants of SDIRCS System

As presented in the discussion of FIG. 6B above, person 1 and person 2 experience different timing intervals between the corresponding audio/video events such as the time interval between the end of one person's turn of speech and beginning of another person's turn of speech. Because SDIRCS system includes human physiology and emotion measurements and analysis, SDIRCS needs to precisely capture and reproduce the original audio/visual sensory experience of the SDIRCS participants in multiple phases of SDIRCS operations. This original audio/visual sensory experience of the SDIRCS participants can be described by SDIRCS recording the audio/video signals presented to them by the system with a high precision common time reference. The presented system constructs the mechanism to compute the presentation time of the audio/video signals relative to a high precision common time reference, as explained below.

The following Table A describes a logical level view of the audio/visual sensory experience of person 1 during this Person's audio/video conference with person 2. A physical level view of the audio/visual sensory experience of person 1 during this person's audio/video conference with person 2 will be discussed in the following sections.

Let us introduce the following notation.

Person 1 will see himself/herself—this is identified as the "Video of person 1" item below.

Person 1 will see person 2—this is identified as the "Video of person 2" item below.

Person 1 will hear himself/herself—as shown by the "Audio of person 1" item below.

Person 1 will hear person 2—as shown by the "Audio of person 2" item below.

We will use similar notation for person 2.

TABLE A

The logical level view of audio/visual sensory experience of person 1 during audio/video conference with person 2.

| Video of person 1 | Video of person 2 |
|---|---|
| Audio of person 1 | Audio of person 2 |

Let us add the following notation:

"Audio 1 at the Source" is the audio produced by person 1's mouth.

"Video 1 at the Source" is the real-time video of person 1 at the person 1 location.

"Audio 2 at the Source" is the audio produced by person 2's mouth.

"Video 2 at the Source" is the real-time video of person 2 at the person 2 location.

"Person 1-Audio 1 Presented at the Destination" is the audio of person 1 that is received by person 1's ears.

"Person 1-Video 1 Presented at the Destination" is the video of person 1 that is rendered on a display to person 1 at the person 1 location.

"Person 1-Audio 2 Presented at the Destination" is the audio of person 2 that is played by a speaker to person 1 at the person 1 location.
"Person 1-Video 2 Presented at the Destination" is the video of person 2 that is rendered on a display to person 1 at the person 1 location.
"Person 2-Audio 1 Presented at the Destination" is the audio of person 1 that is played by a speaker to person 2 at the person 2 location.
"Person 2-Video 1 Presented at the Destination" is the video of person 1 that is rendered on a display to person 2 at the person 2 location.
"Person 2-Audio 2 Presented at the Destination" is the audio of person 2 that is received by person 2's ears.
"Person 2-Video 2 Presented at the Destination" is the video of person 2 that is rendered on a display to person 2 at the person 2 location.

There are many different situations and many ways to present the captured audio and video data to the SDIRCS human participants and to the SDIRCS analysis subsystem as shown below.

Situation 1.
Person 1 is presented with the audio/video data during person 1's communication with person 2 during the first-phase discussion:
The Table A will look like the following table in this situation:

| Video of person 1 = | Video of person 2 = |
|---|---|
| Person 1 - Video 1 | Person 1 - Video 2 |
| Presented at the Destination | Presented at the Destination |
| Audio of person 1 = | Audio of person 2 = |
| Audio 1 at the Source | Person 1 - Audio 2 |
| | Presented at the Destination |

In this Situation 1, person 1 directly hears his own voice. That is why Audio of person 1=Audio 1 at the Source. Other audio and video signals that are presented by SDIRCS to person 1 are the corresponding "Presented at the Destination" audio/video signals.

Situation 2.
Person 2 is presented with the audio/video data during person 2's communication with person 1 during the first-phase discussion. The Table A will look like the following table in this situation:

| Video of person 1 = | Video of person 2 = |
|---|---|
| Person 2 - Video 1 | Person 2 - Video 2 |
| Presented at the Destination | Presented at the Destination |
| Audio of person 1 = | Audio of person 2 = |
| Person 2 - Audio 1 | Audio 2 at the Source |
| Presented at the Destination | |

Situation 3.
The machine-learning component of analysis subsystem of SDIRCS is observing person 1 during his/her communication with person 2. The Table A may look like the following table in this situation:

| Video of person 1 = | Video of person 2 = |
|---|---|
| Video 1 at the Source | NOTHING |
| Audio of person 1 = | Audio of person 2 = |
| Audio 1 at the Source | NOTHING |

In this Situation 3 it is preferable for the machine-learning component of SDIRCS to analyze the audio and video signals that are captured at their source in order to reproduce the context of an independent observer (such as the machine-learning component of SDIRCS) looking at the person 1 and listening to person 1 in his/her original setting.

Situation 4.
The machine-learning system is observing person 2 during his/her communication with person 1:

| Video of person 1 = | Video of person 2 = |
|---|---|
| NOTHING | Video 2 at the Source |
| Audio of person 1 = | Video of person 2 = |
| NOTHING | Video 2 at the Source |

Situation 5.
The machine-learning component of SDIRCS is observing both person 1 and person 2 during their initial phase of the relationship-counseling session communication:

| Video of person 1 = | Video of person 2 = |
|---|---|
| Video 1 at the Source | Video 2 at the Source |
| Audio of person 1 = | Audio of person 2 = |
| Audio 1 at the Source | Audio 2 at the Source |

In this Situation 5, the machine-learning component of SDIRCS analyzes the audio and video signals that are captured at their source for both participants in order to construct a context of an independent observer (being the machine-learning component of SDIRCS) looking at the person 1 and at the person 2 in their original setting. Because Video 1 at the Source, Audio 1 at the Source, Video 2 at the Source, Audio 2 at the Source signals are captured using different hardware clocks, SDIRCS will need to solve the problem of mapping of all these four streams to one common high precision time base. This is discussed below.

Situation 6.
Person 1 is presented with the audio/video split screen video during person 1's second-phase annotation sub-session. The logical level view of audio/visual sensory experience of person 1 in this Situation 6 is as follows.

| Video of person 1 = | Video of person 2 = |
|---|---|
| Person 1 - Video 1 | Person 1 - Video 2 |
| Presented at the Destination | Presented at the Destination |
| Audio of person 1 = | Audio of person 2 = |
| Person 1 - Audio 1 | Person 1 - Audio 2 |
| Presented at the Destination | Presented at the Destination |

In this Situation 6, unlike in situation 1, person 1 does not hear his own voice directly—the person 1 hears his/her recorded voice played back by SDIRCS. That is why Audio of Person 1=Person 1-Audio 1 Presented at the Destination.

Let us define the physical level view of audio/visual sensory experience of person 1 in this Situation 6.
The physical level view of audio/visual sensory experience of a person A in a context C is a combination of the following elements: (1) the combination of all audio signals that the person A receives in context C; (2) the combination of all video signals that the person A receives in context C; (3) the combination of other sensory signals that the person A receives in context C. Let us further describe these elements:
(1) the combination of all audio signals that the person A receives in context C is a combination of audio signals that is received by person A's ears. Let us call this combination a "person A. Physical Audio Presented at the Destination".

In Situation 6 this combination includes Audio of person 1 and Audio of person 2 that are mixed into a single audio stream of the split screen video (the audio/video file) played to person 1.

(2) the combination of all video signals that the person A receives in context C is a combination of video signals that is rendered on one or more displays to person A at the person A location. Let us call this combination a "Person A-Physical Video Presented at the Destination". In Situation 6 this combination includes Video of person 1 and Video of person 2 that are mixed into a single video stream of the audio/video split screen video that is rendered on a single display device. Note that the above definitions are applicable to any situation and these definitions will be used throughout this patent application.

There are many additional important situations and scenarios that SDIRCS system manages. Just from the examples of Situations 1 to 6, it was shown that SDIRCS needs to be able to construct and present various types of audio and video streams: captured (at the source), rendered (presented at the destination), post-processed (presented at the destination) to the participants and to the SDIRCS analysis subsystem depending on a particular application context and SDIRCS needs to be able to identify the timing of these audio and video streams' signals in order to correctly construct and synchronize them and to present them at the correct time to each participant and to the analysis subsystem. In addition to capturing the audio samples, video frames, and physiology data, one SDIRCS implementation also captures their corresponding clocks' progression relative to a high precision reference clock.

Figure 6C:
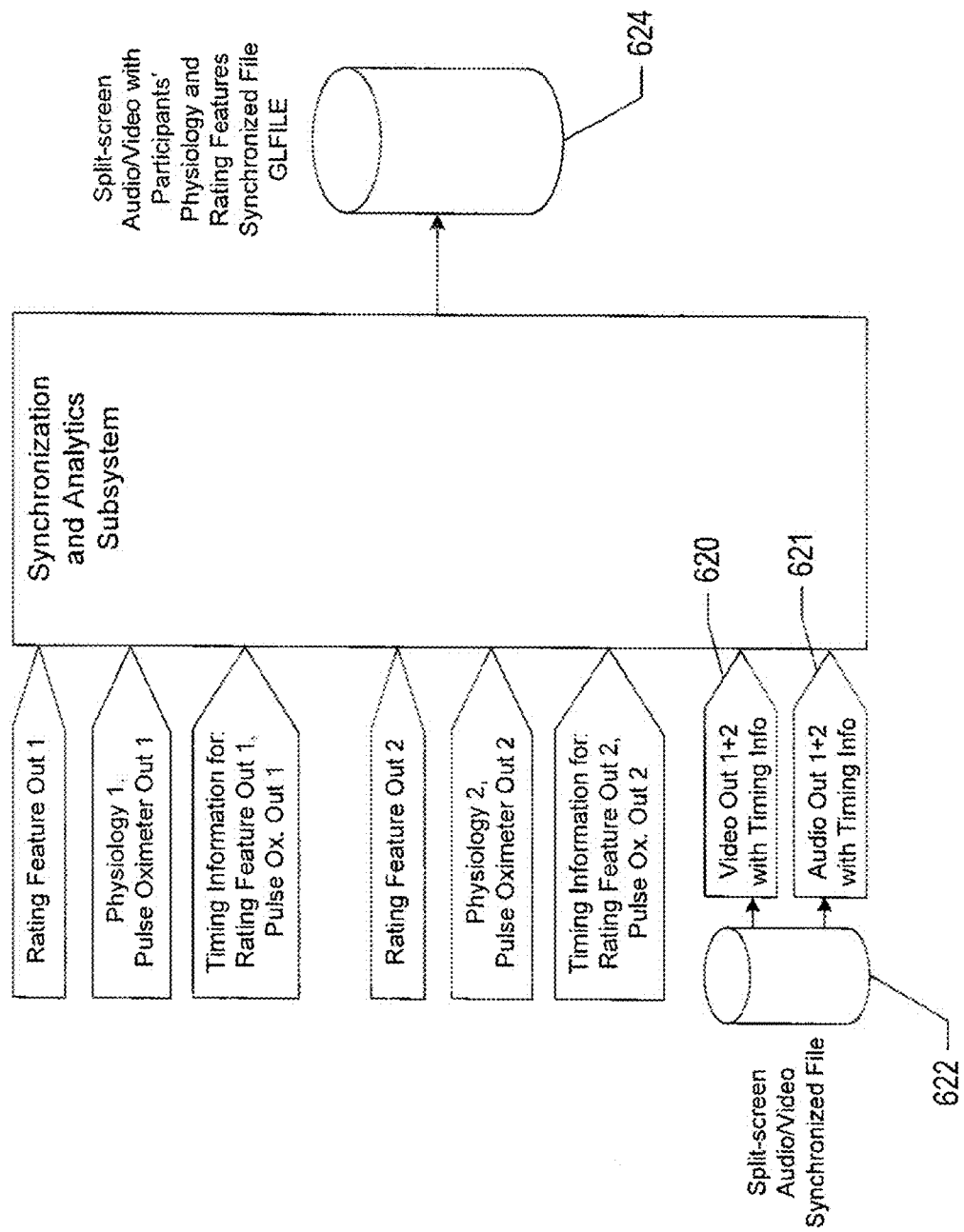
FIGS. 6C-D show the relationship between the signal clocks and the signal data samples.

FIG. 6C shows the relationship between the signal clocks and the signal data samples. The same signal S that is a set of the signal S data samples' time series 650 will be interpreted differently by the systems based on different clocks: A 652 and B 654 as shown by different shapes—shape A 656 and shape B 658 and it will be reproduced differently by various renderers based on different clocks. FIG. 6C also shows how SDIRCS can reproduce the captured signal S 650 based on the time series of the signal S data samples and based on the sampling clocks' A (or B) time progression relative to a high precision reference clock. The clock drift between clocks A and B causes different representations of the same signal S as illustrated by "Signal S: Shape A" 656 and "Signal S: Shape B" 658.

Figure 6D:
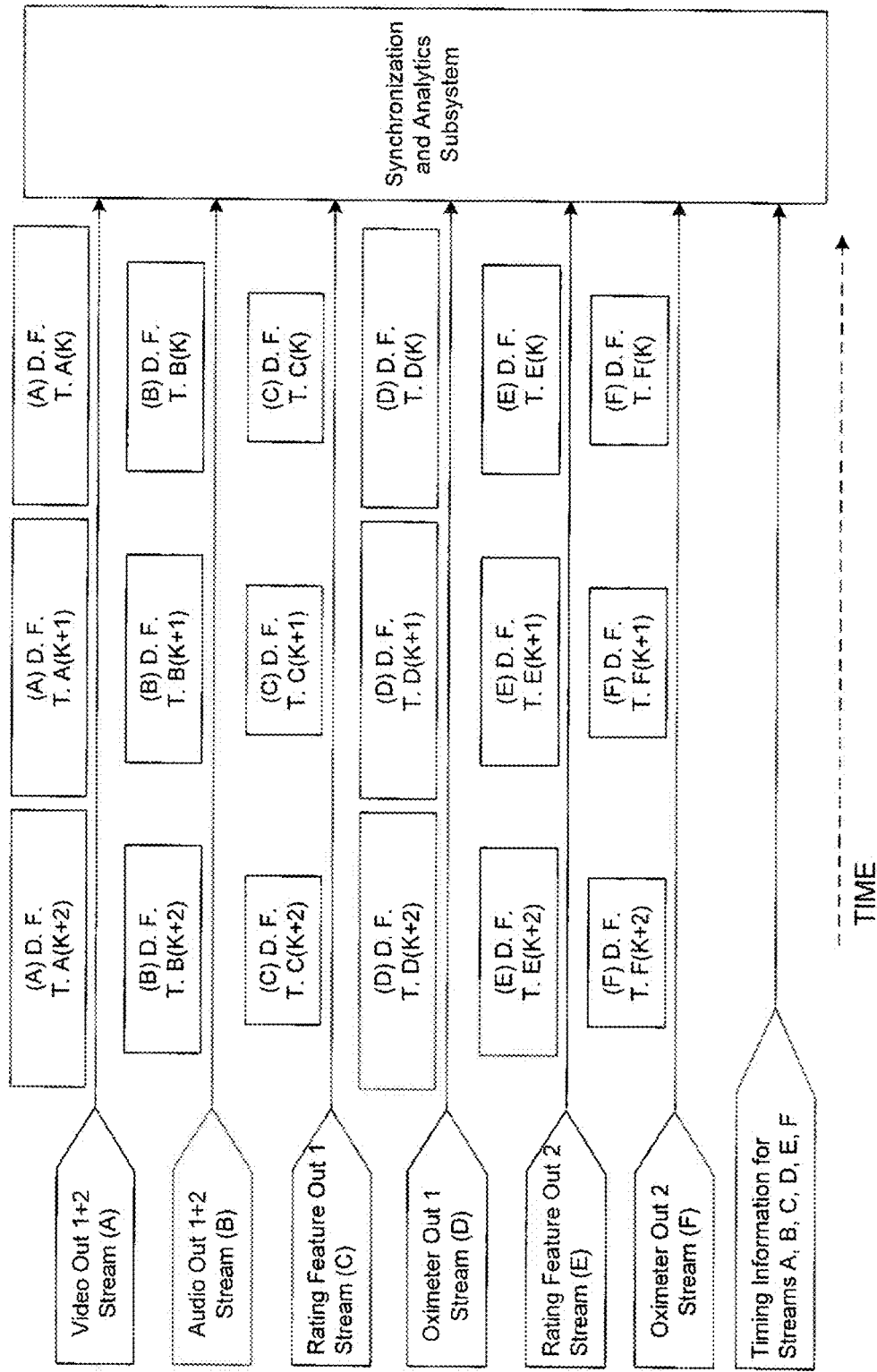

Another important factor in capturing, rendering, or processing of a signal is a clock-based system's determination of the signal start time, shown in FIG. 6D. The same signal S 670 will be represented by different shapes depending on "start time 1" 672 or "start time 2" 674. "signal S: shape 1" 676 corresponds to "start time 1" 672 and "signal S: shape 2" 678 corresponds to "start time 2" 674.

In addition to that, the audio/video data presented to each participant by the real-time audio/video session are not the same audio/video data that were captured at the source location of each participant. Real-time communication session mechanisms employ rather crude perceptional coding to compensate for the network-quality-of-service issues which results in a modification of original audio/video signals that will not be satisfactory in many SDIRCS scenarios.

System Operations

Let us introduce the following definitions.
Sensory Experience of a Person is an aggregate combination of the following signals: the audio signals sensed by the Person's ears and the video signals sensed by the Person's eyes. This can be extended to other human senses that SDIRCS can control.

Sensory Observation of a Person is an aggregate combination of the following signals: the audio signals produced by the Person's mouth; one or more video signals obtained by video recording the Person by one or more video cameras looking at this Person; various physiological sensors' data collected from this Person.

One implementation of SDIRCS is a system that (1) precisely captures the sensory experience and sensory observation of each Participant to enable an analysis of each Participant's physiological and emotional state, and that (2) precisely reconstructs this captured sensory experience of each Participant in subsequent phases of SDIRS by rendering the matching sensory audio/video data to each Participant or/and to the analysis component of SDIRCS.

Let us add the following definitions:
Sensory Objective is a modifiable system-selected Sensory Experience that the system desires to construct for any one of the system participants and/or for the analysis component of the system itself and/or for the third-party system.
Subject of Sensory Objective is the target of Sensory Objective—a particular Person or the analysis component of the system itself, or any third-party system.
The Situations 1 to 6 discussed above are the examples of various Sensory Objectives for different Subjects of Sensory Objective.

A pseudocode of one example of a high level process of SDIRCS operation is as follows:

```
Initialize SDIRCS_system( )
Phase_No=1;
WHILE (NOT END EVENT) DO {
   // Get the Sensory Objective from the System
   Get_System_Sensory_Objective (Phase_No);
   // Participants_List is a list of Subjects of Sensory Objec-
      tive
   FOR EACH Person_I in Participants_List DO {
      // capture Sensory Experience in the current phase
      Capture_Sensory_Experience_Of_Participant    (Pha-
         se_No, Person_I);
      // capture Sensory Observation in the current phase
      Capture_Sensory_Observation_Of_Participant (Phase
         No, Person_I);
   }
   // get the next Phase_No
   Phase_No=Get System_Next_Phase_No (Phase_No);
   FOR EACH Person_I in Participants_List DO {
      // construct Sensory Experience for each Subject of
         Sensory Objective for the next
      // phase
      Construct_Next_Sensory_Experience_Of_Participant
         (Phase_No, Person_I);
   }
   FOR EACH Person_I in Participants_List DO {
      // deliver constructed Sensory Experience for each
         Subject of Sensory Objective
      // at a predetermined time in the next phase
      Deliver_Constructed_Sensory_Experience_Of_Par-
         ticipant (Phase_No, Person_I);
   }
}
Shutdown_SDIRCS_system( );
EXIT;
```

The mechanisms of the following functions from the pseudocode above: capturing Sensory Experiences and Sensory Observations; constructing Sensory Experience for each Subject of Sensory Objective; delivering the Constructed Sensory Experience for each Subject of Sensory Objective at a predetermined time; etc. will be presented in detail below.

Let SSV1 be the name of the split-screen video that was generated and presented by SDIRCS to the Participants of the first phase audio/video session between them. It is important to note that Sensory Experience of a Participant in the first phase of SDIRCS could be materially different from the Sensory Experience of this Participant in the second phase of SDIRCS if in the second phase SDIRCS system simply presents to this Participant the split-screen video SSV1 from the first phase. Let us examine the difference between the following two scenarios:

Scenario 1. In the second phase, SDIRCS presents to person 1 the split-screen video SSV1 that was generated during the first phase discussion between person 1 and person 2. The logical level view of audio/visual sensory experience of person 1 viewing the split-screen video SSV1 is as follows:

| Video of person 1 = | Video of person 2 = |
|---|---|
| Person 1 - Video 1 | Person 1 - Video 2 |
| Presented at the Destination | Presented at the Destination |
| Audio of person 1 = | Audio of person 2 = |
| Person 1 - Audio 1 | Person 1 - Audio 2 |
| Presented at the Destination | Presented at the Destination |

Scenario 2. SDIRCS constructs and presents to person 1 the new split-screen video SSV2P1 that was generated after the first phase discussion between person 1 and person 2 from the following logical level components:

| Video of person 1 = | Video of person 2 = |
|---|---|
| Person 1 - Video 1 | Person 1 - Video 2 |
| Presented at the Destination | Presented at the Destination |
| Audio of person 1 = | Audio of person 2 = |
| Audio 1 at the Source | Person 1 - Audio 2 |
| | Presented at the Destination |

And SDIRCS constructs and presents to person 2 the new split-screen video SSV2P2 that was generated after first phase discussion between person 1 and person 2 from the following logical level components:

| Video of person 1 = | Video of person 2 = |
|---|---|
| Person 2 - Video 1 | Person 2 - Video 2 |
| Presented at the Destination | Presented at the Destination |
| Audio of person 1 = | Audio of person 2 = |
| Person 2 - Audio 1 | Audio 2 at the Source |
| Presented at the Destination | |

This example illustrates that SDIRCS constructs a particular Sensory Experience for each Subject of Sensory Objective in order to preserve the original Sensory Experience of each Person.

Let us also illustrate how the logical level view of audio/visual sensory experience of a Person can be different from the physical level view of audio/visual sensory experience of this Person. In the Scenario 1 above, the physical level view of audio/visual sensory experience of person 1 is as follows:

"Person 1-Physical Audio Presented at the Destination" is the audio mix of "Person 1-Audio 1 Presented at the Destination" and "Person 1-Audio 2 Presented at the Destination" audio streams. This audio mix was created by SDIRCS when the audio/video file SSV1 was built.

"Person 1-Physical Video Presented at the Destination" is a single split-screen video stream that was constructed by SDIRCS by combining two video streams: one of person 1 and one of person 2.

This shows that there are many different topologies of physical level signals that make up a logical level view of the audio/visual sensory experiences. For example, in situation 1, discussed in the "Capturing the Signals that are Sensed by the Participants of SDIRCS System" section above, the following logical level view of audio/visual sensory experience of person 1 during person 1's communication with person 2 during the first-phase discussion was presented:

| Video of person 1 = | Video of person 2 = |
|---|---|
| Person 1 - Video 1 | Person 1 - Video 2 |
| Presented at the Destination | Presented at the Destination |
| Audio of person 1 = | Audio of person 2 = |
| Audio 1 at the Source | Person 1 - Audio 2 |
| | Presented at the Destination |

In situation 1, person 1 directly hears his own voice. That is why "Audio of person 1"="Audio 1 at the Source". Other audio and video signals that are presented by SDIRCS to person 1 are the corresponding "Presented at the Destination" audio/video signals. At the physical level view of this audio/visual sensory experience of person 1 during person 1's communication with person 2 during the first-phase discussion, "Person 1-Physical Audio Presented at the Destination" consists of two separate audio signals: (1) the "Audio 1 at the Source" signal is the sound of person 1's own voice and (2) "Person 1-Audio 2 Presented at the Destination" is the sound of person 2 received by person 1's system and played on person 1's speakers by SDIRCS.

Let us examine each step of the "high level process of SDIRCS operation" presented above at a high logical level; more specific details will be provided in the following sections:

(1) Capture_Sensory_Experience_Of_Participant (Phase_No, Person_I)
This is done by SDIRCS capturing the audio and video streams that correspond to Sensory Experience of Person_I and their precise timing information.

(2) Capture_Sensory_Observation_Of_Participant (Phase_No, Person_I);
This is done by SDIRCS capturing the audio and video and physiology data that correspond to Sensory Observation of Person I and their precise timing information.

(3) Construct Sensory Experience for each Subject of Sensory Objective.
This is done by SDIRCS constructing particular audio and video streams from one or more data sources. This could include: replacing the streams, transcoding the streams, etc. For example, the split-screen video SSV2P1 above can be generated from the split-screen video SSV1 and from the "Audio 1 at the Source" audio capture file. More details are provided in "Transcoding and Modifying the Streams" and in "Precise Rendering and Synchronization of Streams" sections below.

(4) Deliver_Constructed_Sensory Experience_Of_Participant (Phase_No, Person_I);
This is done by SDIRCS constructing and controlling the mechanism of rendering of audio and video data to specific devices at specific predetermined time. This mechanism has to deal with the details of the audio/video processing chains, controlling and synchronizing multiple clocks and data rates and it will be explained in detail in "Precise Rendering and Synchronization of Streams" section and in other sections below.

One implementation of SDIRCS includes the following mechanisms: (1) capturing audio, video, and physiology data at their source; (2) capturing audio and video data at their destination; (3) capturing timing information of audio, video, and physiology data at their source; (4) capturing timing information of audio and video data at their presentation point to all the participants; (5) rendering audio and video data at their presentation point at a SDIRCS-determined presentation time to each participant to precisely control each participant's audiovisual perception and to achieve a predetermined level of synchronization between multiple streams; (6) determining the relationship between the audio, video, and physiology data source's and data sink's clocks in order to build the following data sets: (a) the integrated-time-correlation table for SDIRCS signals for all participants; and (b) the integrated-system-events-timing table. As it was already noted, conceptually, the integrated-time-correlation table for SDIRCS signals for all participants is the time translation table between multiple SDIRCS system's clocks that allows SDIRCS to derive the time of one clock from the known time of another clock. And, as it was already noted, conceptually, the integrated-system-events-timing table is the table of specific SDIRCS system events. It may include the following elements: (1) specific SDIRCS system event ID, (2) ID of a SDIRCS device corresponding to the specific event ID above, (3) time of the specific event ID above, (4) ID of a SDIRCS clock that was utilized by SDIRCS system to measure the time of the specific event ID above. The details of ITCT and ISETT will be presented in the following sections.

One implementation of SDIRCS system includes the following elements: System Inputs: (1) a complete set of captured and rendered audio and video data files; (2) integrated-time-correlation table; (3) integrated-system-events-timing table; (4) System's Intent (defined as the targeted set of Sensory Experiences that needs to be constructed and delivered to the Subjects of Sensory Objectives); (5) Performance Parameters such as latency, synchronization, available resources, etc. System Outputs: (1) A set of Sensory Experiences that is constructed and delivered based on the System's Intent; (2) Data Analysis, Reports, etc. The set of Sensory Experiences that is constructed and delivered based on the System's Intent includes the audio/video streams that need to be constructed and presented to the Participants of SDIRCS and to other Subjects of Sensory Objectives. SDIRCS will construct necessary audio/video streams and data sets based on the captured and transmitted streams from the Participants.

In an alternative implementation of SDIRCS, the System's Intent is the only System's input, and the System automatically resolves this Intent by building and managing a graph of interconnected client-server components.

Figure 7A:
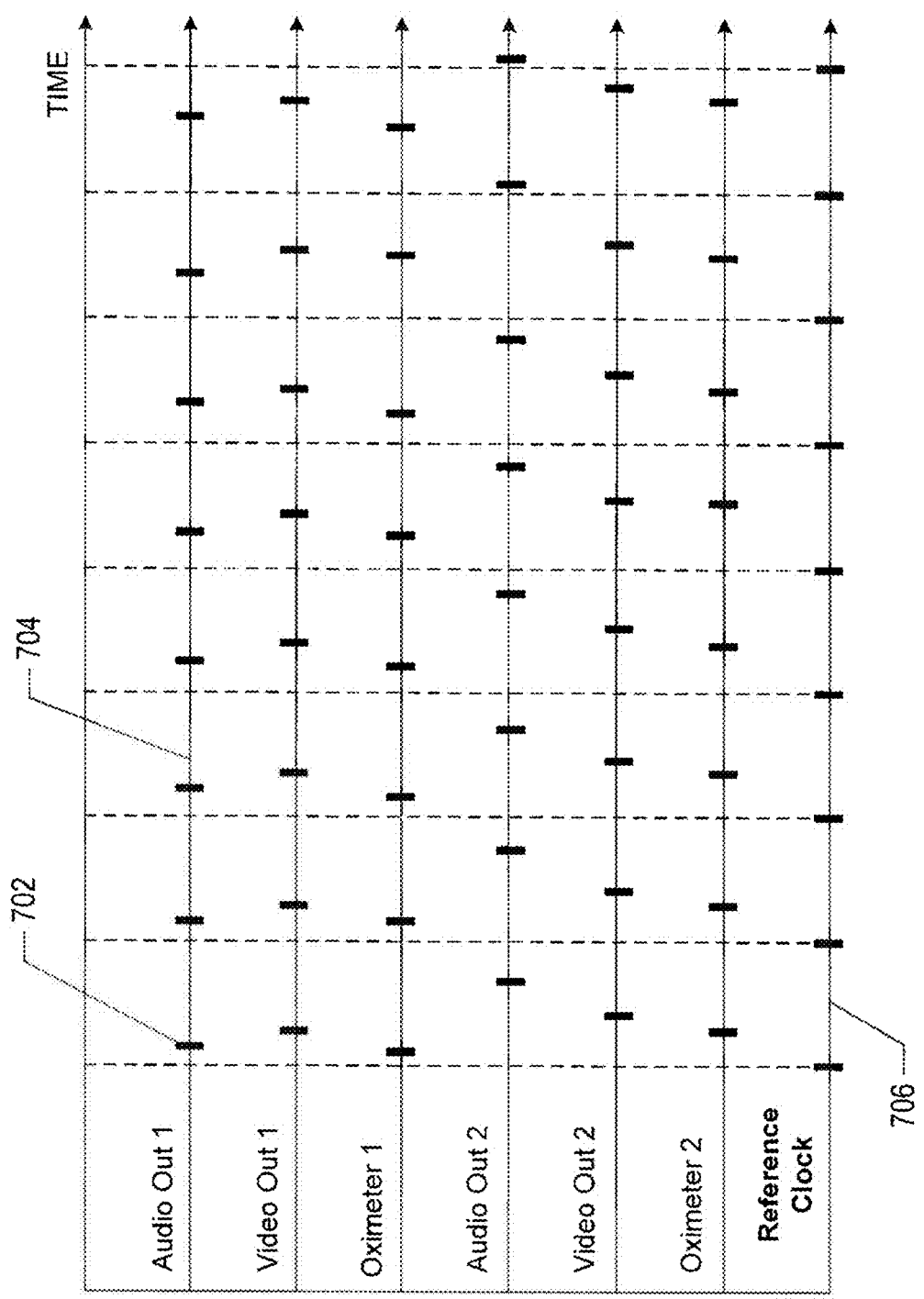
FIG. 7A illustrates one implementation that combines the real-time audio/video session management between the participants with the recording of audio, video, and physiology data including all signals' timing information for both participants.

As noted earlier, in addition to providing the real-time audio/video session between the participants of the first phase discussion, in one implementation SDIRCS also creates a high quality recording of synchronized audio, video, and physiology data of both participants for subsequent analysis phase and SDIRCS preserves the captured audio, video, and physiology data, and the timing information for both participants. FIG. 7A illustrates one implementation that combines the real-time audio/video session management between the participants with the recording of audio, video, and physiology data including all signals' timing information for both participants. In this FIG. 7A, person 1 702 is communicating with person 2 717 over the network 715. Video is captured from Camera 1 701 and this captured video is processed and transported to person 2 via "Video 1 Processing and Transmit (TX) Transport" 704. The captured video from Camera 1 is also stored in "Video 1 Captured" data file 703. Note that in a split-screen video environment this captured video from person 1 will be shown to person 1 on Display 1 710. This video path is not shown on this FIG. 7A because the purpose of this FIG. 7A is to demonstrate how SDIRCS system manages two tasks: (1) handling the real-time audio/video communications between person 1 and person 2; and (2) storing the captured and received data streams along with their timing information for further processing.

Audio is captured from Microphone 1 707 and is written to "Audio 1 Captured" data file 706 and the captured audio is processed and transported to person 2 via "Audio 1 Processing and Transmit (TX) Transport" 705. The "Audio 1 Captured" data file 706 could contain uncompressed captured audio when SDIRCS devices have sufficient memory to store it.

"Timing Information for Device 1 Captured and Rendered Signals" 708 contains the timing information about SDIRCS data capture, processing, and rendering events, and the information about relative time progression of SDIRCS devices clocks. The details will be presented in the sections below. "Video 2 Receiving (RX) Transport and Processing" component 711 receives the captured video data from Person's 2 Camera 2 725 via "Video 2 Processing and Transmit (TX) Transport" 726. This received video data are recorded to "Video 2 Received" data file 709 and are rendered on Display 1 710. "Audio 2 Receiving (RX) Transport and Processing" component 712 receives the captured audio data from Person's 2 Microphone 2 728 via "Audio 2 Processing and Transmit (TX) Transport" 727. This received audio data are recorded to "Audio 2 Received" data file 714 and are played on Speaker 1 713. The person 2 717-related processing is similar to the person 1 corresponding processing as shown by FIG. 7A. Note: SDIRCS can use different compression mechanisms and data formats for real-time transmission and recording, for example, using a higher quality data formats for audio/video capture than for the transmission.

Figure 7B:
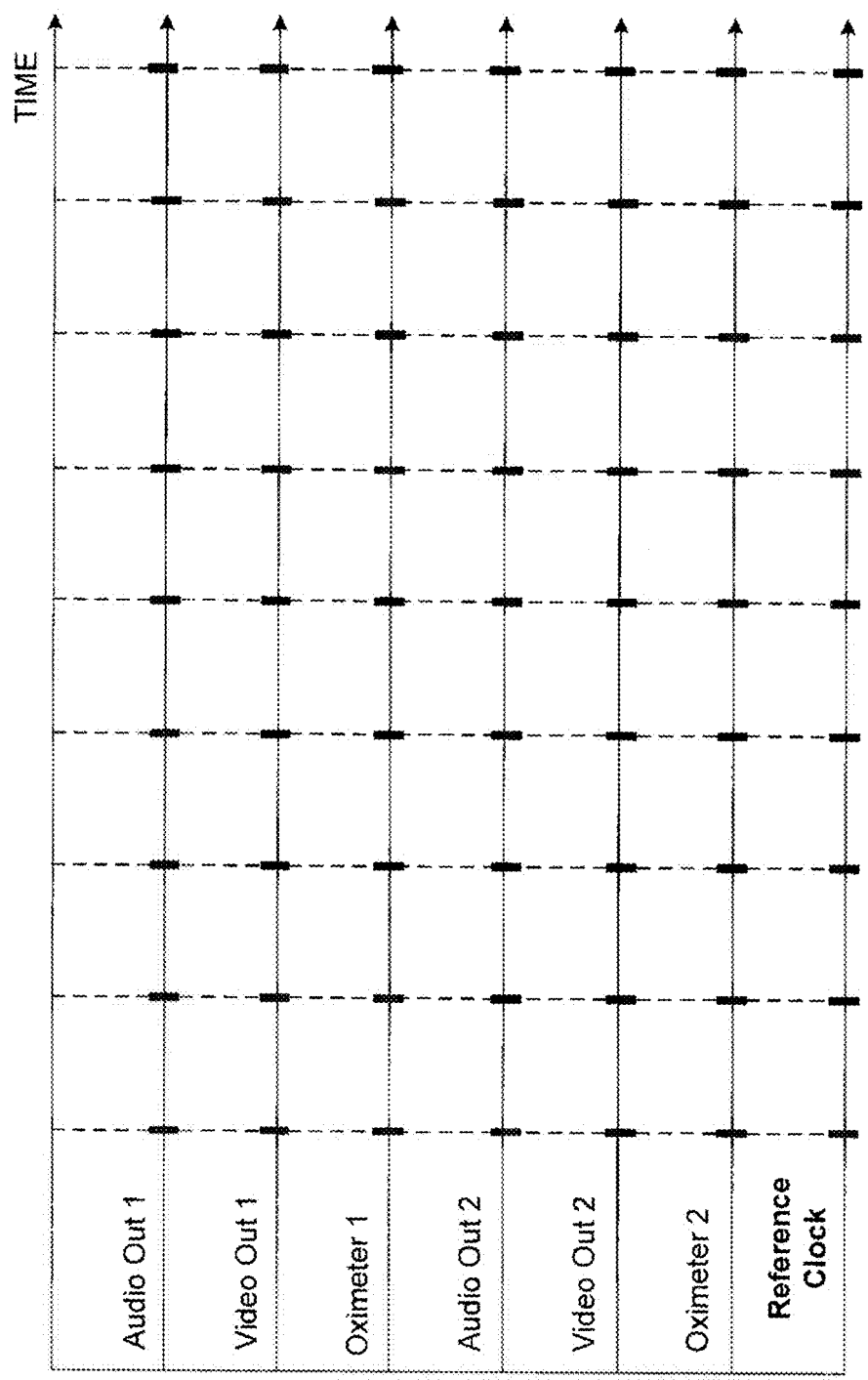
FIG. 7B illustrates the difference between the captured and transmitted audio and video data.

The real-time audio/video session between the participants results in a certain loss of quality of transmitted data due to the Internet quality-of-service issues such as variability of the available network bandwidth between the participants' devices, delays and loss of audio and video transport data frames, etc. FIG. 7B illustrates the difference between the captured and transmitted audio and video data. It shows the difference between "Video 1 Captured" sequence of data frames 740 and "Video 1 Received" sequence of data frames 741. The "Video 1 Received" sequence of data frames 741 may include the frames that were not received by the destination device during the data transmission—they are shown as missing "M" or dropped frames 748, and the data frames with Poor Quality 749 (such as the frames with a lower resolution of data relative to the original captured data frames)—they are shown as "PQ" 749. The difference between the captured and transmitted audio and video data is also shown for other corresponding pairs of data streams such as 742 and 743, 744 and 745, 746 and 747.

By recording the data at their capture point as was shown in FIG. 7A, SDIRCS can utilize a better-quality audio and video data for the subsequent second-phase annotation subsession and for machine learning and other data analysis methods.

Figure 8A:
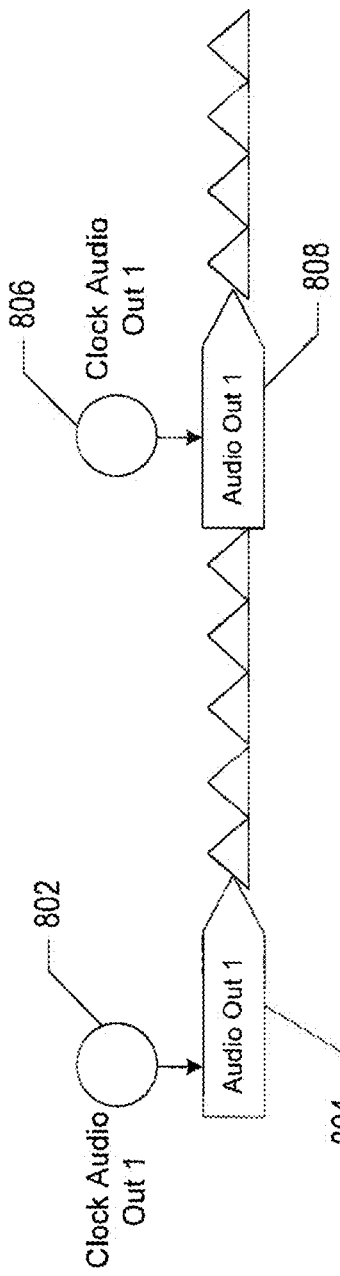
FIGS. 8A-B illustrate one system implementation that combines the real-time data transmission and recording in the first-phase discussion session.

FIG. 8A illustrates one system implementation that combines the real-time data transmission and recording in the first-phase discussion session. Conceptually, this FIG. 8A integrates the FIG. 5A that illustrated the signals generated, output, transmitted, and input during the initial phase of a relationship-counseling session with the FIG. 7A that illustrated how SDIRCS can record the captured and transmitted audio and video data to the corresponding data files for future processing. Rectangle 803 represents the video-enabled electronic device of a first participant 802, rectangle 831 represents the video-enabled electronic device of the second participant 830, and column 826 represents the communications, synchronization, and other subsystems within the relationship-counseling-processing system. The two video-enabled electronic devices have identical inputs and outputs, next discussed with reference to video-enabled electronic device 803. The video-enabled electronic device outputs an audio signal 806 generated by a microphone 805 and a video signal 808 generated by a video-camera subsystem 807. The audio signal 806 is processed by the "Audio 1 Processing and Transmit Transport" component 809 and transmitted to the second participant 830. The audio signal 806 is also recorded to the "Audio 1 Captured" file 804. The video signal 808 is processed by the "Video 1 Processing and Transmit Transport" component 810 and transmitted to the second participant 830. The video signal 808 is also recorded to the "Video 1 Captured" file 811. The display of the electronic device 812 receives, as input, video signals 813 and 814. Video signal 813 is generated by the camera 807 within the video-enabled electronic device 803 and video signal 814 is generated by the camera 844 within the second electronic device 831. Note that the two video signals are output from the electronic devices to the relationship-counseling-processing system and then received back from the relationship-counseling-processing system as a pair of video signals that have been initially scaled to a common clock. Video signal 814 is received by "Video 2 Receive Transport and Processing" component 816 from the "Video 2 Processing and Transmit Transport" component 842 of the second participant 830. This video signal 816 is recorded to the "Video 2 Received" file 817. Video signal 813 is received by the "Video 1 Receive Transport and Processing" component 815 from the "the Video 1 Processing and Transmit Transport" component 810. This signal 813 can be modified by the relationship-counseling-processing system 826. This video signal 813 can be recorded to the "Video 1 Received" file—it is not shown in this FIG. 8A. The speaker 818 within the electronic device 803 receives an audio signal 819 initially output by electronic device 831 to the relationship-counseling-processing system and then forwarded by the relationship-counseling-processing system to electronic device 803. Audio signal 819 is received by "Audio 2 Receive Transport and Processing" component 820 from the "Audio 2 Processing and Transmit Transport" component 846 of the second participant 830. This audio signal 819 is recorded to the "Audio 2 Received" file 821. The pulse-oximeter signal 824 is output to the relationship-counseling-processing system. It is captured by Pulse Oximeter Driver 823 from Pulse Oximeter Device 825. Finally, timing information for the locally generated signals 822 is continuously output to the relationship-counseling-processing system. This timing information includes the timing data that SDIRCS generates and utilizes to keep track of time progression of multiple clocks in SDIRCS distributed processing system and to keep track of the timing of the SDIRCS distributed processing system events. Important elements of this timing information are the integrated-time-correlation table and the integrated-system-events-timing table. These tables have been described in the sections above. As noted, the video-enabled electronic device 831 has similar inputs and outputs to the video-enabled electronic device 803.

Figure 8B:
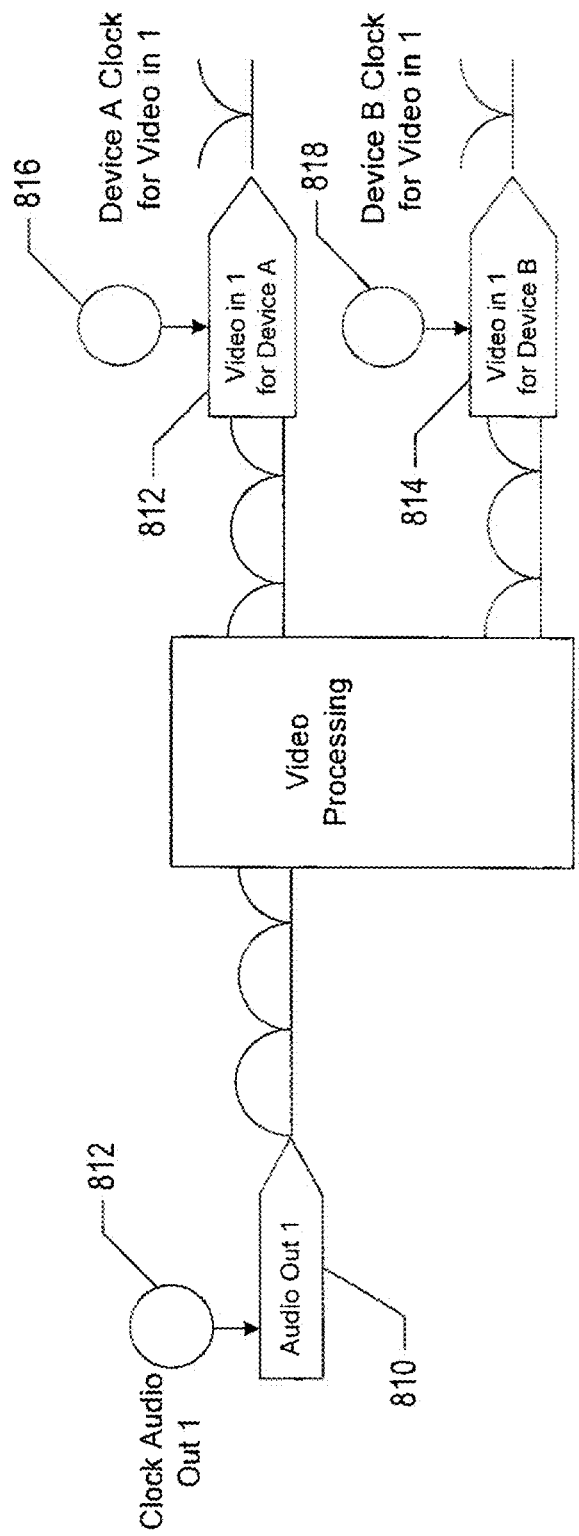

FIG. 8B illustrates an alternative SDIRCS implementation using audio/video multiplexing and demultiplexing technologies. There are many implementations of audio/video multiplexing at the source and demultiplexing at the destination of audio/video data processing. These multiplexing and demultiplexing implementations can be done at the hardware level and at the software level of multimedia data processing. FIG. 8B shows that the audio and video output streams 806 and 808 of the video-enabled electronic device 803 can be multiplexed in the "Multiplexer and Transmit Transport 1" 861, recorded to the "Audio/Video 1 Captured" file 860, and transmitted to the video-enabled electronic device 831. The "Receive Transport and Demultiplexer 1" component 871 receives this multiplexed audio/video data stream 864, records it to the "Audio/Video 1 Received" file 870, demultiplexes it, and renders the separated audio and video streams to the corresponding audio and video devices. The "Receive Transport and Demultiplexer 2" component 862 receives the multiplexed audio/video data stream 865 from device 831, records it to the "Audio/Video 2 Received" file 863, demultiplexes it, and renders the separated audio and video streams to the corresponding audio and video devices. The video-enabled electronic device 831 has similar inputs and outputs to the video-enabled electronic device 803.

Main Processing Loop for Phase 1 of Relationship Counseling Application Running on Device 1.

Figure 9A:
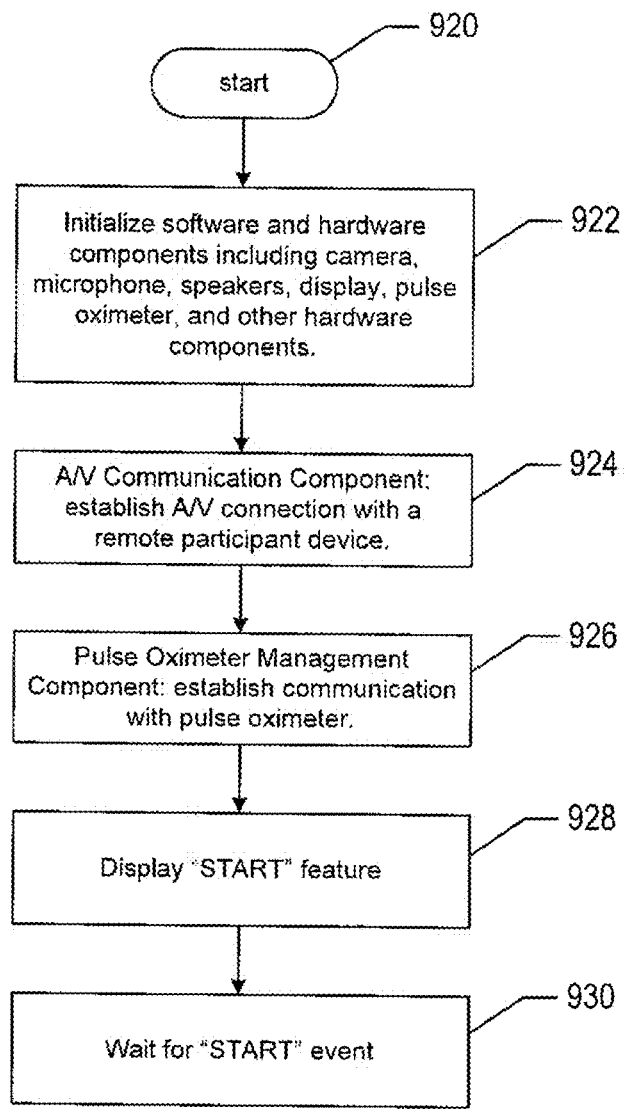
FIGS. 9A-F illustrate the flowchart of the Main Processing Loop for an initial phase of a Relationship Counseling Application running on a Participant's Device.

FIG. 9A illustrates the Main Processing Loop for Phase 1 of Relationship Counseling Application running on a Participant's Device. The Relationship Counseling Application is started on Device 1 in step 920. All hardware and software components of the Relationship Counseling Application including camera, microphone, speakers, display, pulse oximeter, and other hardware components are initialized in step 922. In step 924 the Audio/Video Communications Component establishes audio/video connection with a remote participant's device. In step 926 the Pulse Oximeter Management Component establishes communication with pulse oximeter. In step 928 the User Interface Component displays the "START" feature which could be implemented as a "Start" user interface button. At the next step 930 the Relationship Counseling Application is waiting for the "START" event which can be signaled by participant 1 or participant 2 or other SDIRCS system software or hardware components or the third person.

Figure 9B:
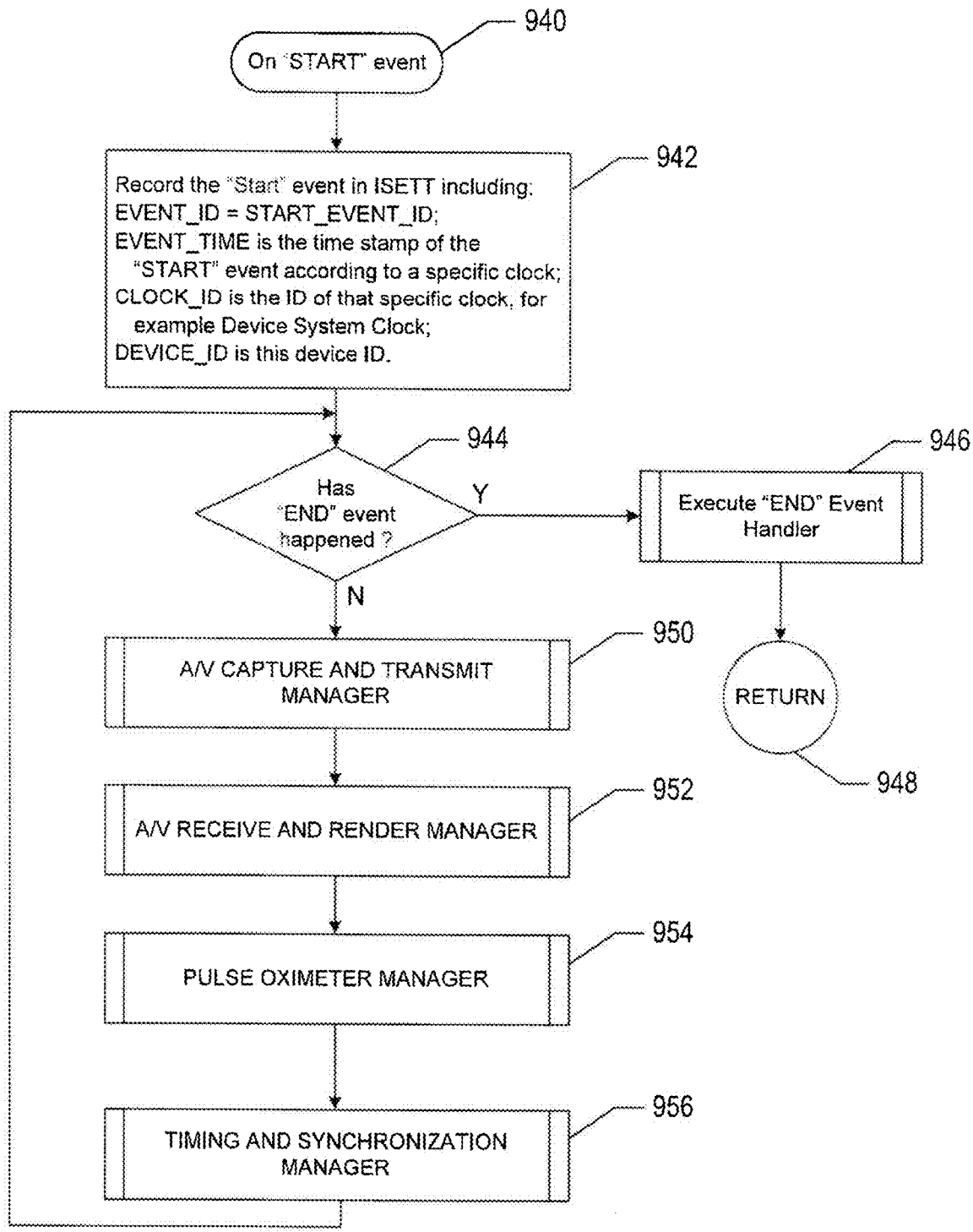

FIG. 9B illustrates the "START" event handler. On "START" event the "START" event handler starts executing in step 940. In step 942 the "START" event handler records the time stamp of the "Start" event as a following record in ISETT table:
EVENT_ID=START_TIME_EVENT_ID;
DEVICE_ID=a corresponding device ID;
EVENT_TIME=the time stamp of the "Start" event according to a specific clock;
CLOCK_ID=the ID of that specific clock, for example the ID of Device System Clock.

Step 944 shows that the "START" event handler will execute the "END" Event Handler 946 and return (948) if the "END" event was signaled. The "END" event can be signaled by participant 1 or participant 2 or by the third person—any of these individuals can signal the "END" event by pressing the "END" user interface button or by other software or hardware components. The "END" event can be signaled by the expiration of a predetermined data acquisition timer, for example 15 minutes after the "START" event. While the "END" event is not signaled, the "START" event handler will execute the four following steps: 950, 952, 954, and 956. The flowchart on FIG. 9B shows sequential execution of these four steps above. In a modern multi-processing multi-threaded operating system, there are many ways to execute the above steps in parallel until the "END" event is signaled to these threads by any of the Relationship Counseling Application components. In step 950 the Audio/Video Capture and Transmit Manager is called. In step 952 the Audio/Video Receive and Render Manager is called. In step 954 the Pulse Oximeter Manager is called. In step 956 the Timing and Synchronization Manager is called.

Figure 9C:
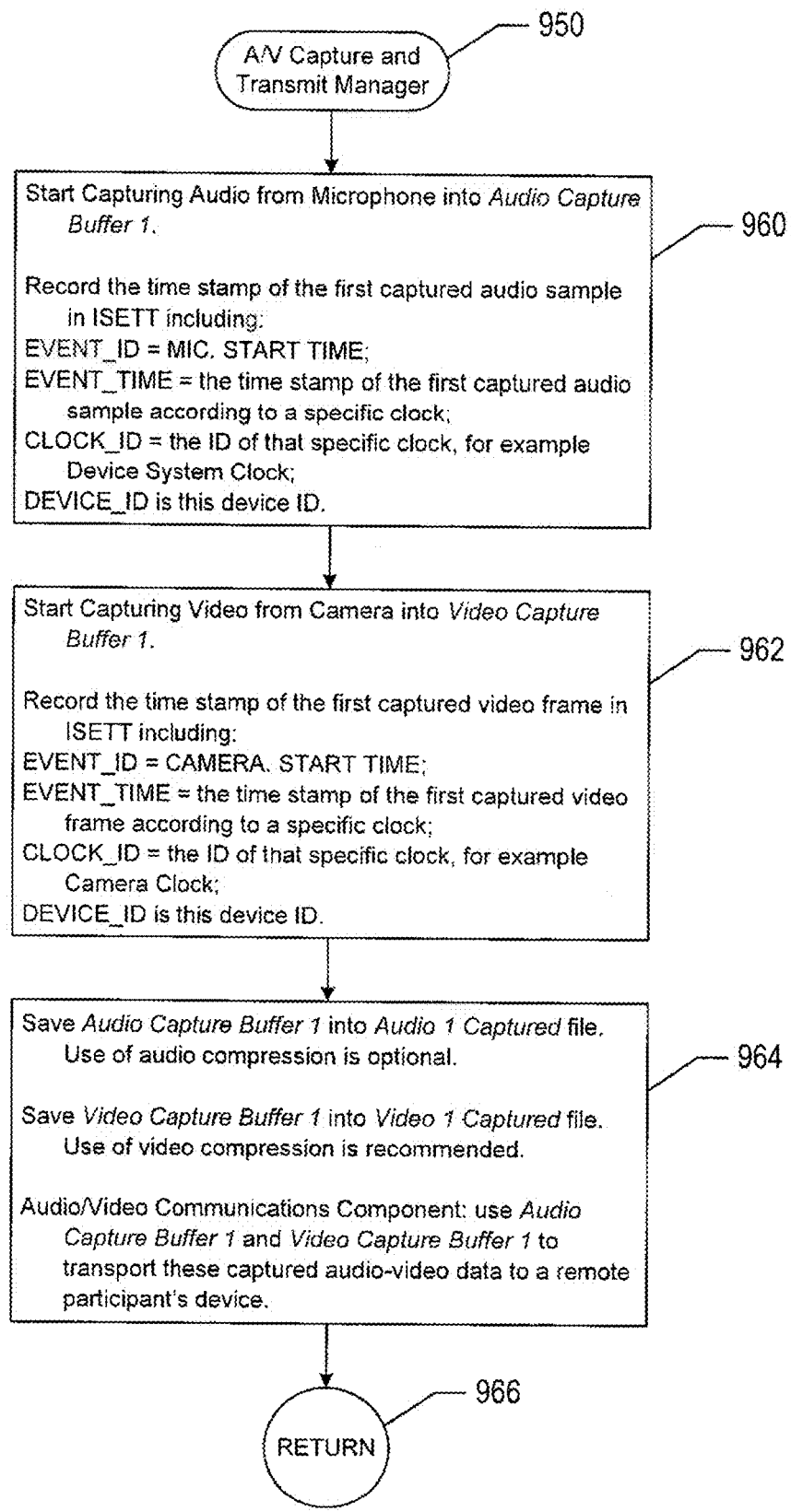

FIG. 9C shows the flowchart of the Audio/Video Capture and Transmit Manager which was called in step 950 above. In step 960 the Audio/Video Capture and Transmit Manager starts Capturing Audio from Microphone into Audio Capture Buffer 1. It records the time stamp of the first captured audio sample as a following record in ISETT table:
EVENT_ID=MICROPHONE START TIME;
DEVICE_ID=a corresponding device ID;
EVENT_TIME=the time stamp of the first captured audio sample according to a specific clock;
CLOCK_ID=the ID of that specific clock, for example the ID of Device System Clock.
There are many ways of capturing the time stamp of audio and video processing events, which will be described in detail below.
In step 962 the Audio/Video Capture and Transmit Manager starts Capturing Video from Camera into Video Capture Buffer 1. It records the time stamp of the first captured video frame as a following record in ISETT table:
EVENT_ID=CAMERA START TIME;
DEVICE_ID=a corresponding device ID;
EVENT_TIME=the time stamp of the first captured video frame according to a specific clock;
CLOCK_ID=the ID of that specific clock, for example the ID of Camera Clock.
In step 964 the Audio/Video Capture and Transmit Manager saves Audio Capture Buffer 1 into Audio 1 Captured file. Use of audio compression is optional here because modern devices come with significant amount of memory capable of storing uncompressed audio. The Audio/Video Capture and Transmit Manager saves Video Capture Buffer 1 into Video 1 Captured file. Video compression is typically used in modern systems for video storage and transmission. Finally, in step 964, the Audio/Video Communications Component is called to transport Audio Capture Buffer 1 and Video Capture Buffer 1 to a remote participant's device. In step 966 the Audio/Video Capture and Transmit Manager returns the execution to its caller.

Figure 9D:
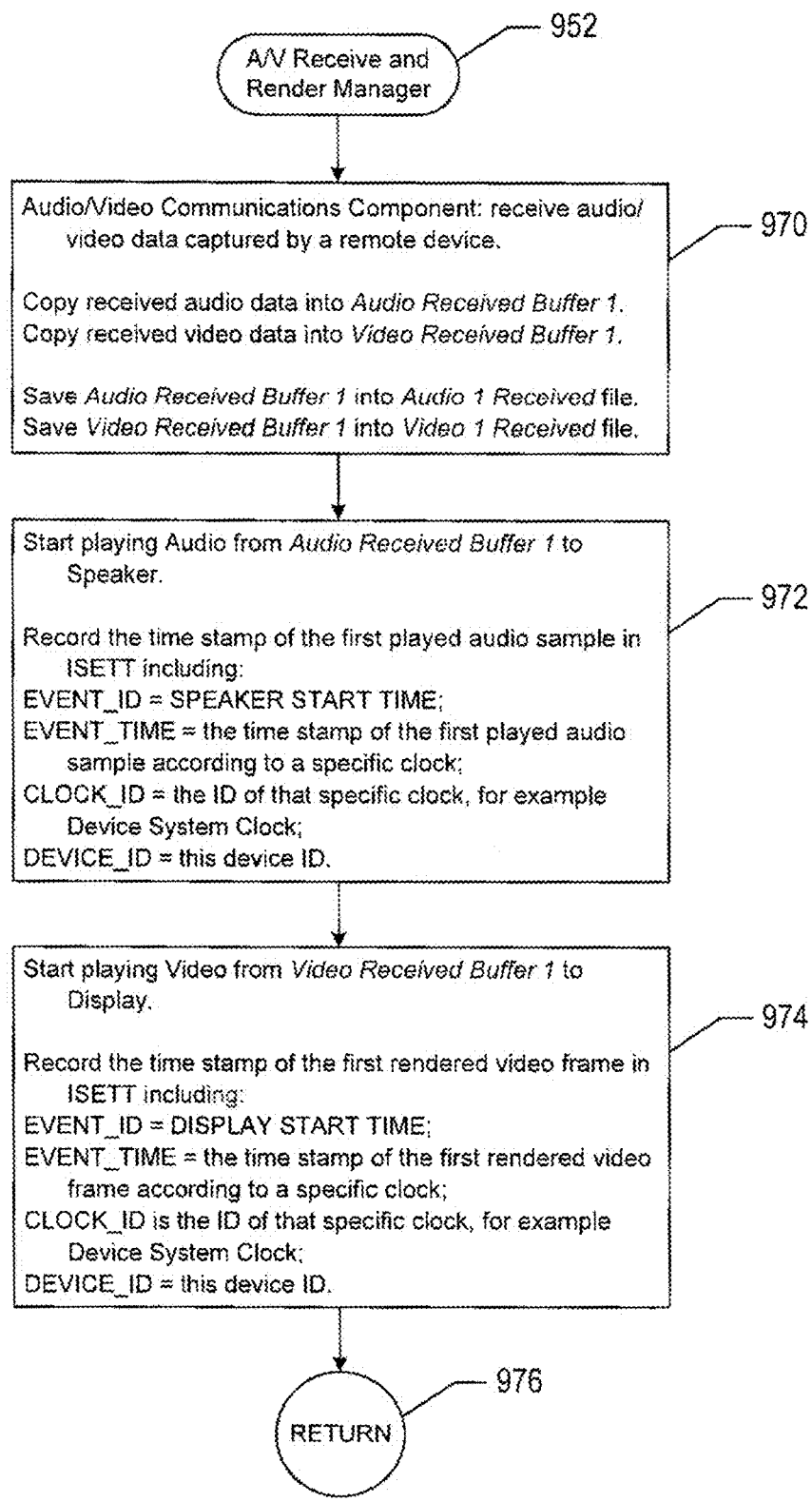

FIG. 9D shows the flowchart of the Audio/Video Receive and Render Manager which was called in step 952 above. In step 970 the Audio/Video Receive and Render Manager receives audio/video data captured by a remote device and it copies received audio data into Audio Received Buffer 1 and it copies received video data into Video Received Buffer 1. The Audio/Video Receive and Render Manager saves Audio Received Buffer 1 into Audio 1 Received file and it saves Video Received Buffer 1 into Video 1 Received file. In step 972 the Audio/Video Receive and Render Manager starts playing Audio Received Buffer 1 to Speaker. It records the time stamp of the first rendered audio sample as a following record in ISETT table:
EVENT_ID=SPEAKER START TIME;
DEVICE_ID=a corresponding device ID;
EVENT_TIME=the time stamp of the first rendered audio sample according to a specific clock;
CLOCK_ID=the ID of that specific clock, for example the ID of Device System Clock.
In step 974 the Audio/Video Receive and Render Manager starts rendering Video Received Buffer 1 to Display. It records the time stamp of the first rendered video frame as a following record in ISETT table:
EVENT_ID=DISPLAY START TIME;
DEVICE_ID=a corresponding device ID;
EVENT_TIME=the time stamp of the first rendered video frame according to a specific clock;
CLOCK_ID=the ID of that specific clock, for example the ID of Device System Clock.
It should be noted that the Audio/Video Receive and Render Manager outputs audio and video data to the corresponding audio and video devices at a predetermined presentation time in order to achieve audio/video synchronization and to control the precise timing of signals' rendering. This will be described in "Precise Rendering and Synchronization of Streams" section below.
In step 976 the Audio/Video Receive and Render Manager returns the execution to its caller.

Figure 9E:
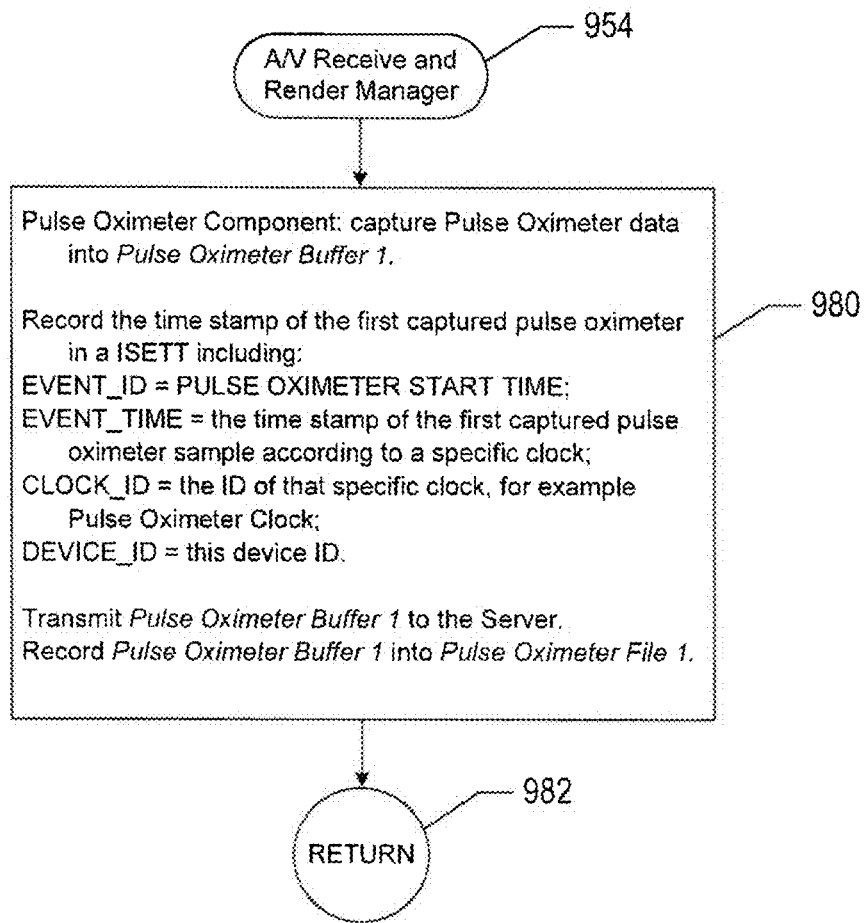

FIG. 9E shows the flowchart of the Pulse Oximeter Manager which was called in step 954 above. In step 980 the Pulse Oximeter Manager requests Pulse Oximeter Management Component to start Capturing Pulse Oximeter data into Pulse Oximeter Buffer 1 and to record the time stamp of the first captured pulse oximeter sample as a following record in ISETT table:
EVENT_ID=PULSE OXIMETER START TIME;
DEVICE_ID=a corresponding device ID;
EVENT_TIME=the time stamp of the first captured pulse oximeter sample according to a specific clock;
CLOCK_ID=the ID of that specific clock, for example the ID of Device System Clock.
Pulse Oximeter Manager transmits Pulse Oximeter Buffer 1 to the SDIRCS Server and records Pulse Oximeter Buffer 1 into Pulse Oximeter File 1.
In step 982 the Pulse Oximeter Manager returns the execution to its caller.

Figure 9F:
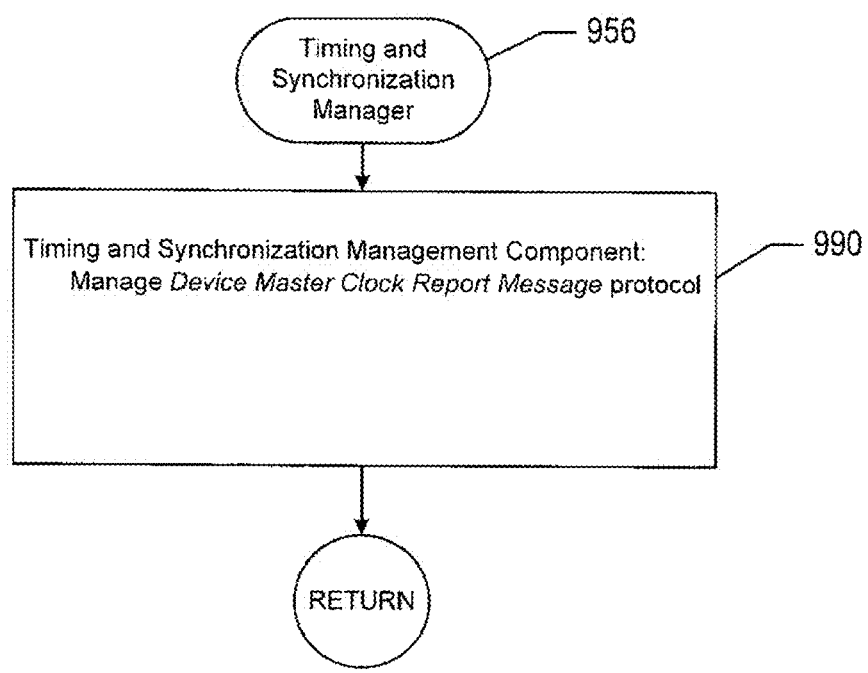

FIG. 9F shows the flowchart of the Timing and Synchronization Manager which was called in step 956 above.
In step 990 the Timing and Synchronization Manager requests the Timing and Synchronization Management Component to manage Device Master Clock Time Report Message protocol as described below.

Figure 10A:
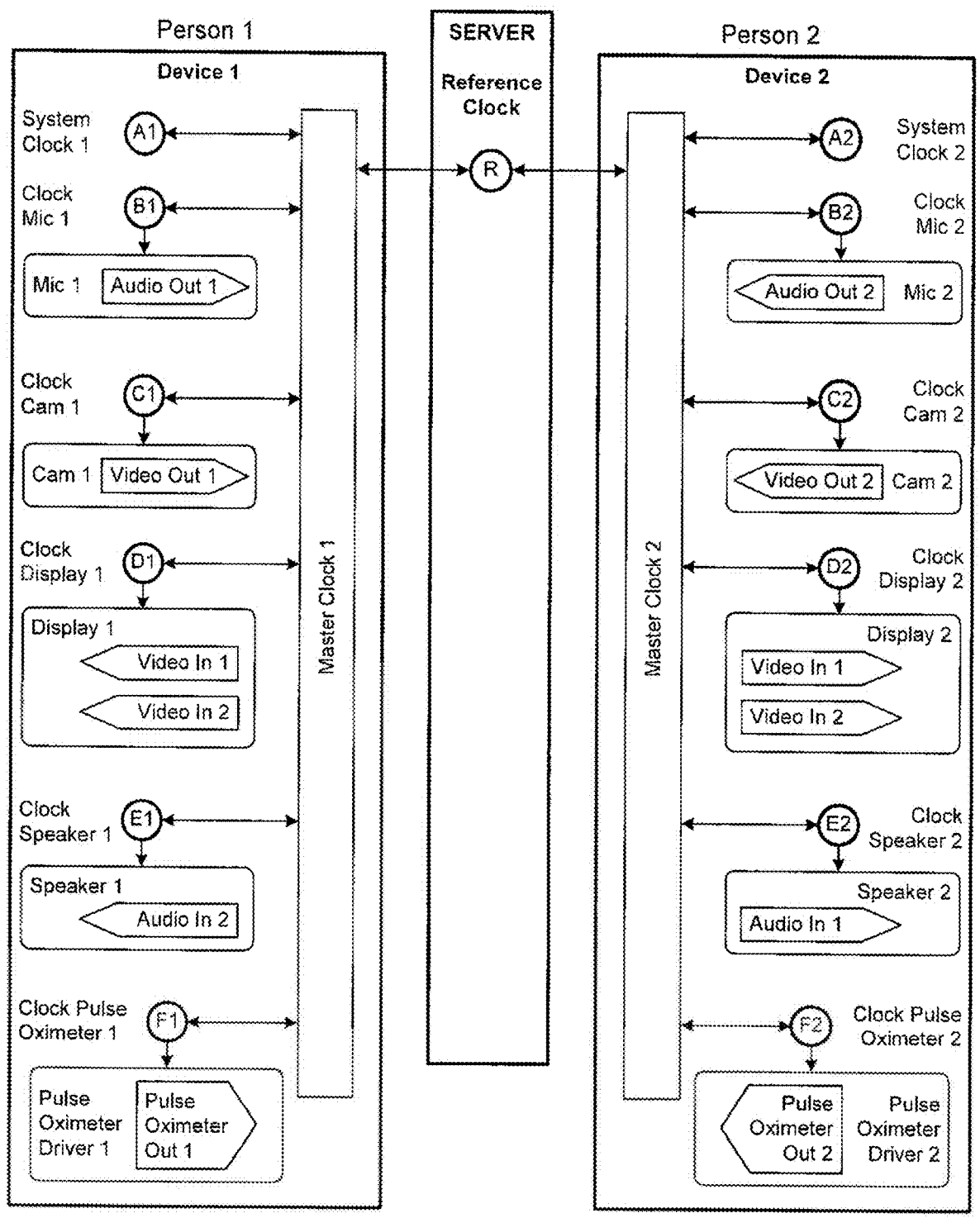
FIGS. 10A-B illustrate one implementation of the timing and synchronization process using the hierarchical clocks system.

FIG. 10A illustrates one implementation of the timing and synchronization process using the hierarchical clocks system. This Figure shows the following clocks: A1 is the Device 1 System Clock, B1 is the clock of Device 1 that drives the frequency of sampling of Microphone 1 audio, C1 is the Camera clock of Device 1, D1 is the Display 1 clock, E1 is the Speaker 1 clock, F1 is the clock of Device 1 that drives the frequency of Pulse Oximeter 1 data sampling. Any of clocks B1, C1, D1, E1, and F1 could be an internal hardware clock of a corresponding hardware component or they could use the Device 1 system clock A1 as their time reference.
The same notation is applied to the clocks representing Device 2 components.
Some physical clocks are independent from the Device System Clock and are accessible to a programming method to get/set their time with a very high precision. Other physical clocks could not be accessible directly to such a programming method. In such cases SDIRCS can still compute the time progression of a physical clock by computing the effective data rate with which the Device's component driven by such a clock is producing (or consuming or processing) the data relative to the Device System Master Clock.

Server system of SDIRCS provides a high precision Reference Clock R. An example of such a high precision server system reference clocks is Microsoft Windows Time Service that is based on Network Time Protocol NTP.

One implementation of SDIRCS includes the following steps:
(1) SDIRCS enumerates all Device 1 clocks and selects the Master Clock 1 for Device 1 from the Clocks A1, B1, C1, D1, E1, F1. In one SDIRCS implementation, System Clock A1 is selected as the Master Clock MC1;
(2) SDIRCS enumerates all Device 2 clocks and selects the Master Clock 2 for Device 2 from the Clocks A2, B2, C2, D2, E2, F2. In one SDIRCS implementation, System Clock A2 is selected as the Master Clock MC2;
(3) SDIRCS selects the Reference Clock R from the available Server's clocks.

Figure 10B:
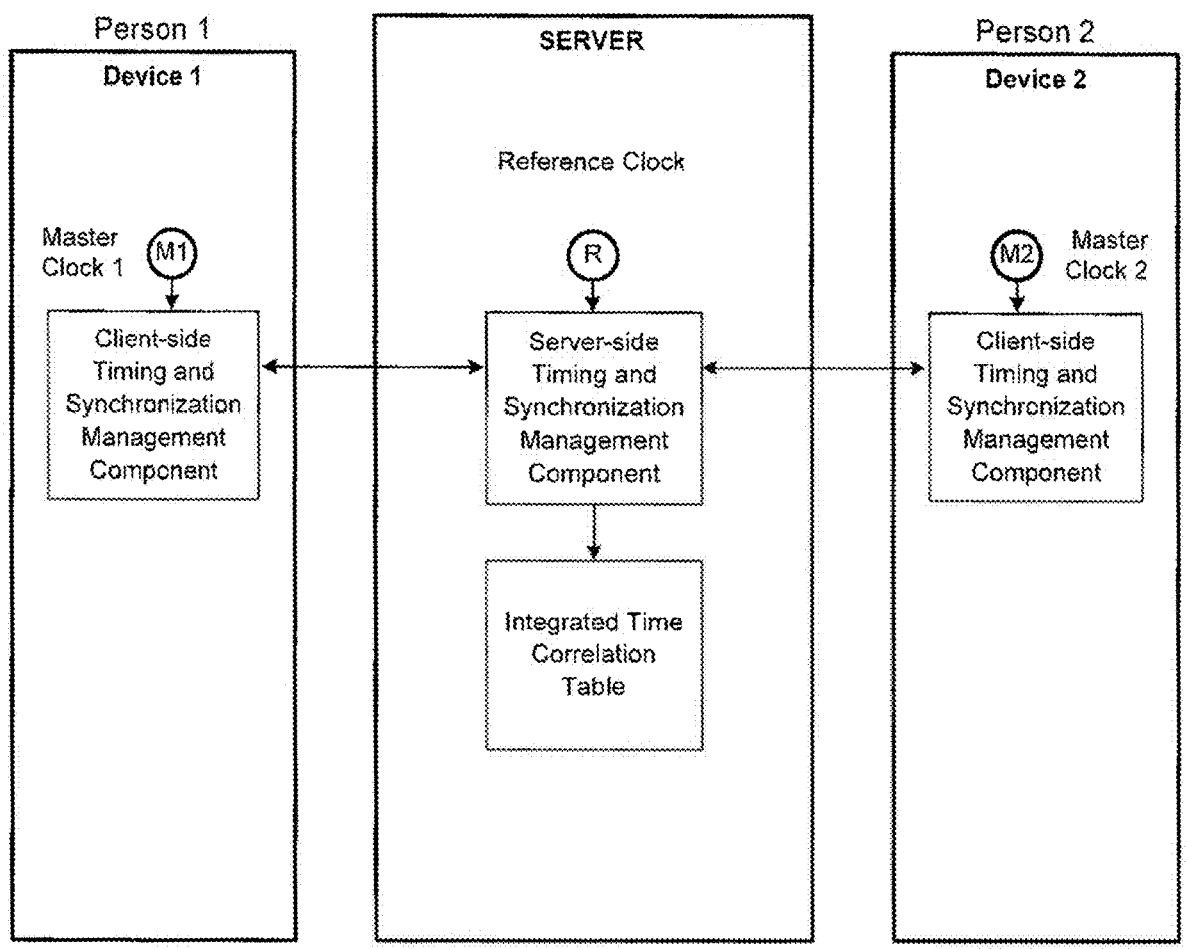

FIG. 10B illustrates more details of SDIRCS timing and synchronization solution including the client-side and server-side timing and synchronization management components.

Clock error (drift) can be measured in PPM (parts per million). It is common to see the clocks of SDIRCS components with the clock errors being around 100 PPM or 0.01% error rate. If SDIRCS polls the clocks twice more often (for example) than the average period of a clock drift of 1 Unit of Time then SDIRCS would have a good set of observations to catch almost every event of the 1 Unit of Time clock drift. With our example of a 100 PPM clock drift, a 1 millisecond clock drift will occur on average once every 10,000 milliseconds or once every 10 seconds. If SDIRCS polls the clocks twice faster than the period of a 1 millisecond time drift then SDIRCS can poll the clock once every 5 seconds. The first-phase discussion of SDIRCS system takes about 15 min. If SDIRCS polls the clocks once every 5 seconds then SDIRCS integrated-time-correlation table will have about 15 min/5 sec=15×60/5=180 entries.

SDIRCS Server will provide a high quality Reference Clock for the SDIRCS system. There are many readily available systems that provide high precision time signal such as GPS, DCF77, WWVB, etc. SDIRCS Server can implement NTP (Network Time Protocol), for example as defined in IETF RFC 5905. Microsoft Windows Time Service is one example of a high quality Reference Clock component for the SDIRCS system.

Figure 10C:
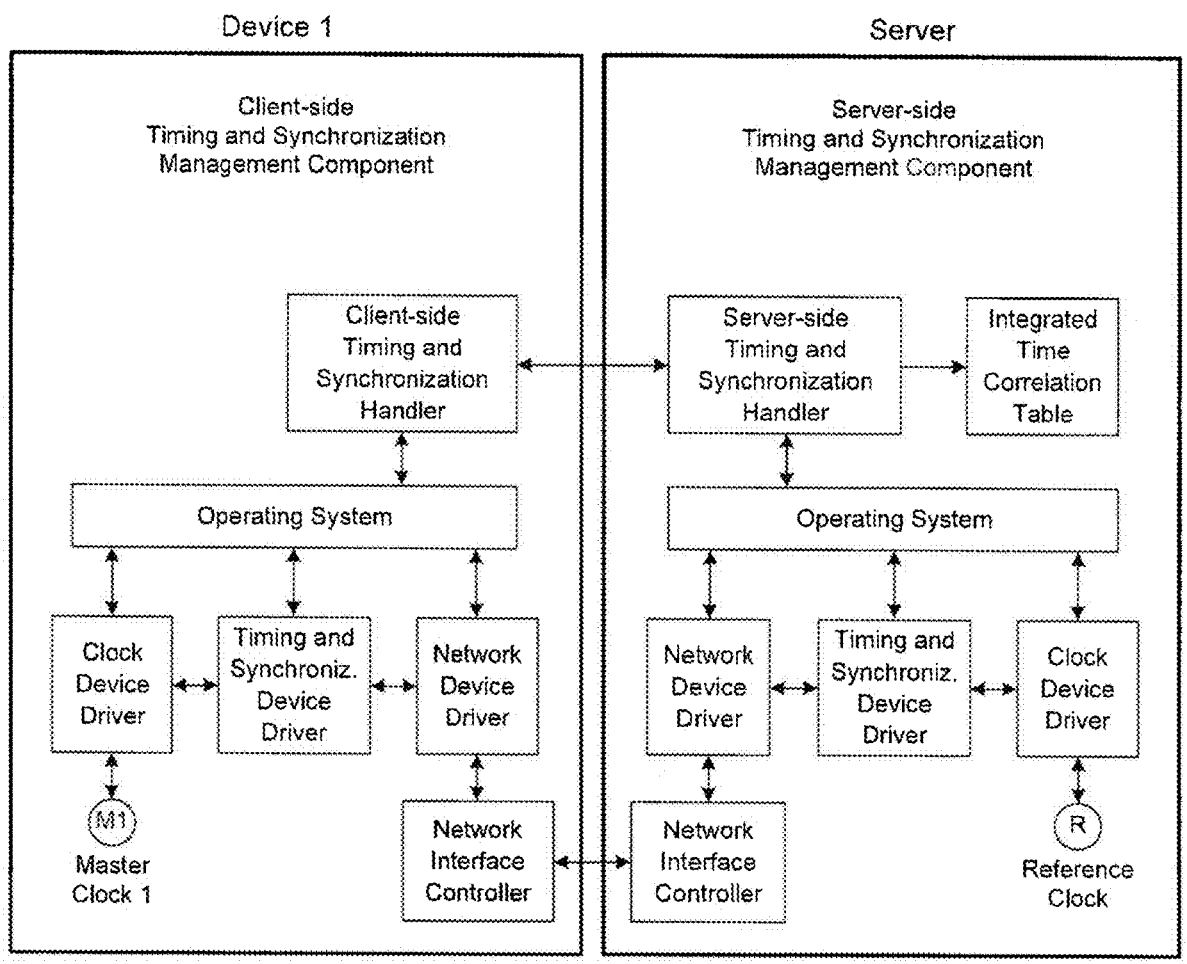
FIG. 10C illustrates one implementation of Client-Side Timing and Synchronization Management Component and Server-Side Timing and Synchronization Management Component.

FIG. 10C illustrates one implementation of Client-Side Timing and Synchronization Management Component and server-side timing-and-synchronization-management component. It shows the Client-Side Timing and Synchronization Management Component for Device 1 only. Device 2 can have similar implementation.

A more precise time reference of a physical event is a hardware-generated time stamp indicating the time of the event. The quickest execution path for identifying and communicating the time to a remote system is typically achieved at the software layers that are closer to the corresponding hardware components and that are closer to the operating system. That is why this FIG. 10C shows one implementation in which the processing of time signaling to a remote system is done at the device drivers level. In Microsoft Windows operating systems this processing will be executed in kernel mode.

Client-side Timing and Synchronization Handler configures Timing and Synchronization Device Driver to send a Device Master Clock Time Report Message to the Server every pre-configured time period, for example every 5 seconds. Determination of said pre-configured time period is made by SDIRCS based on the synchronization goals of the system. The first Device Master Clock Time Report Messages are sent by both Device 1 and Device 2 Client-side Timing and Synchronization Handlers during their "START" event handler processing. Client-side Timing and Synchronization Device Driver configures Clock Device Driver to report Master Clock 1 timer events every pre-configured time period. Interrupt Service Routine (or similar precise clock event-driven mechanisms) of Clock Device Driver will be executed when the pre-configured time period expires and it will signal this event to client-side Timing and Synchronization Device Driver via a driver-to-driver call mechanism using IRPs (I/O request packets) or other similar real-time methods. Client-side Timing and Synchronization Device Driver will send the Device Master Clock Time Report Message to the Server via Network Device Driver. One example of Device Master Clock Time Report Message network packet payload is as follows:

| SOURCE_ID | PACKET_ID | TIME |
|---|---|---|
| 1 | 25 | 24,067,754,545 |

SOURCE_ID is the sending Device's ID; PACKET_ID is the incremental decimal number of Device Master Clock Time Report Message starting from 1, TIME is the device's Master Clock time in microseconds (or in other high precision units of time).

Client-side Network Device Driver sends this Device Master Clock Time Report Message to the Server via client-side Network Interface Controller. Server Network Interface Controller receives this Message and Server Network Device Driver passes this Message to Server Timing and Synchronization Device Driver which communicates with Server Clock Device Driver to get the real-time value of Server Reference Clock R. Server Timing and Synchronization Device Driver passes the corresponding values of the device's Master Clock time received from the Device Master Clock Time Report Message and the real-time value of Server Reference Clock R to the Server-side Timing and Synchronization Handler which puts these values into the Time Events Table which looks like the following:

| REFERENCE CLOCK TIME | DEVICE ID | DEVICE MASTER CLOCK TIME |
|---|---|---|
| 229,237,722,858 | 1 | 24,067,754,545 |

Depending on a particular participant's device hardware and software, it may be possible to implement a high precision timing and synchronization mechanism at a higher level of software stack, above the operating system level. For example, it can be done in a context of a very high priority system thread which can query the physical time of the system clock and that executes very quickly. In any case it will take some processing time to execute the entire client-server time signaling chain. It will be generally faster from the device driver level than from the application level. The total processing time to execute the entire client-server time signaling chain will vary from time to time and this processing time must be reflected in the calculation of the timing relationship between the corresponding clocks. For example, the entire client-server time signaling chain execution time may be 5 milliseconds with the variability of the client-server time signaling chain execution time of 1 millisecond. If the variability of client-server time signaling chain execution time is less than a SDIRCS-configured precision threshold (for example, 1 millisecond) then SDIRCS Timing and Synchronization Management Components provides acceptable time correlation solution for SDIRCS system. Every step in this client-server signaling chain introduces some latency and time variability which can be accurately measured and thus said client-server time signaling chain execution time and its variability can be accurately measured.

The server-side timing-and-synchronization-management component can construct the following Clocks Relationship Table by arranging the data received from the Device Master Clock Time Report Messages from Devices 1 and 2 in the following order:

| Sequence Number | 1 | 2 | 3 | ... |
|---|---|---|---|---|
| Server Clock | S1 = 229,237,722,858 | S2 = 229,242,722,986 | S3 = 229,247,723,414 | ... |
| Device 1 Master Clock | D1,1 = 24,067,754,545 | D1,2 = 24,072,755,347 | D1,3 = 24,077,756,561 | ... |
| Device 2 Master Clock | D2,1 = 115,327,226,015 | D2,2 = 115,332,224,990 | D2,3 = 115,337,224,091 | ... |

From the Clocks Relationship Table above, the server-side timing-and-synchronization-management component can construct the following integrated-time-correlation table that captures relative progression of devices' clocks in milliseconds as follows.

$SER[I] = ROUND\ ((S[I+1]-S[1])/1000);$
$DEV[1,I] = ROUND\ ((D[1,I+1]-D[1,1])/1000);$
$DEV[2,I] = ROUND\ ((D[2,I+1]-D[2,1])/1000);$
where $I = 1, 2, \ldots, N$ For example, $DEV[1,1] = ROUND\ ((D[1,2]-D[1,1])/1000) = ROUND\ ((24,072,755,347-24,067,754,545)/1000) = ROUND\ (5,000,802/1000) = 5,001$ $DEV[1,2] = ROUND\ ((D[1,3]-D[1,1])/1000) = ROUND\ ((24,077,756,561-24,067,754,545)/1000) = ROUND\ (10,002,016/1000) = 10,002$ For the integrated-time-correlation table above, only the columns for Sequence Numbers 1 and 2 are computed based on the provided Clocks Relationship Table for illustration purposes. The columns with Sequence Numbers 3 and above are given as an example without computation.

It should be noted that similar method can be used to construct the timing relationship between any SDIRCS clocks, for example between the Device Master Clock and any additional device clocks such as Camera clock. Thus, the hierarchical client-server clock system can be constructed and the progression of time of one clock can be derived from the progression of time of any other SDIRCS clock.

The Time Translations Using ITCT

Let us describe the time translations using ITCT. Let us show how SDIRCS system can translate the time INPUT_TIME relative to INPUT_CLOCK into OUTPUT_TIME relative to OUTPUT_CLOCK.

For example, here is how SDIRCS can translate INPUT_TIME=Start Time relative to INPUT_CLOCK=Start_Clock into OUTPUT_TIME=Stream1_Start_Time relative to OUTPUT_CLOCK=Clock_1_ID using ITCT Table.

Let Start Time=6,023 milliseconds; Start Clock be the ID of Device 2 Master Clock; Clock_1_ID=ID of Device 1 Master Clock.

Let us use the ITCT EXAMPLE TABLE example above. SDIRCS system can do the following 3 step procedure to translate the INPUT_TIME time between two clocks: INPUT_CLOCK and OUTPUT_CLOCK:

(a) Find the time segment [A, B] in ITCT table that contains INPUT_TIME for the INPUT_CLOCK row.

In our example, INPUT_TIME=Start Time=6,023 milliseconds for the INPUT_CLOCK=Device 2 Master Clock. SDIRCS finds [A, B]=[DEV2,1=4,999, DEV2,2=9,998] time segment in Device 2 Master Clock row of ITCT. Thus A=4,999 and B=9,998.

(b) Find the time segment [C, D] in ITCT table that corresponds to [A, B] segment defined above as follows: C is the OUTPUT_CLOCK time value that corresponds to the time value of A of the INPUT_CLOCK. D is the OUTPUT_CLOCK time value that corresponds to the time value of B of the INPUT_CLOCK In our example, C=DEV1,1=5,001 because C is an intersection of OUTPUT_CLOCK=Device 2 Master Clock row of ITCT with the column of ITCT that contains A=DEV2,1=4,999 time value in the INPUT_CLOCK row. D=DEV1,2=10,002 because D is an intersection of OUTPUT_CLOCK=Device 2 Master Clock row of ITCT with the column of ITCT that contains B=DEV2,2=9,998 time value in the INPUT_CLOCK row. Thus C=5,001 and D=10,002.

(c) Compute OUTPUT_TIME=INPUT_TIME×(D−C)/(B−A)

In our example, OUTPUT_TIME=6,023×(10,002−5,001)/(9,998−4,999)=6,025.4 milliseconds.

| ITCT EXAMPLE TABLE: | | | | | | |
|---|---|---|---|---|---|---|
| Sequence Number | 0 | 1 | 2 | 3 | 4 ... | 180 |
| Server Clock | 0 | SER1 = 5,000 | SER1 = 10,000 | SER1 = 15,000 | SER1 = 20,000 ... | SER180 = 90,000 |
| Device 1 Master Clock | 0 | DEV1,1 = 5,001 | DEV1,2 = 10,002 | DEV1,3 = 15,002 | DEV1,4 = 20,002 ... | DEV1,180 = 90,013 |
| Device 2 Master Clock | 0 | DEV2,1 = 4,999 | DEV2,2 = 9,998 | DEV2,3 = 14,998 | DEV2,4 = 19,997 ... | DEV2,180 = 89,987 |

More Technical Details of Capturing the Time Stamps of Events

Methods of precise capturing of the time stamps of hardware and software events depend on the device, its operating system capabilities, and its hardware and software components. Typically, for a given device and its operating system, there are multiple ways of achieving a high precision capturing of the time stamps of hardware and software events. One example of such methods is presented here for illustration purposes. This example is for Microsoft Windows operating system. Microsoft implemented the following software methods to manage device clocks, synchronization, and to obtain the time stamps of device events.

Relationship Counseling Application and Filter Graph Components.

Figure 11A:
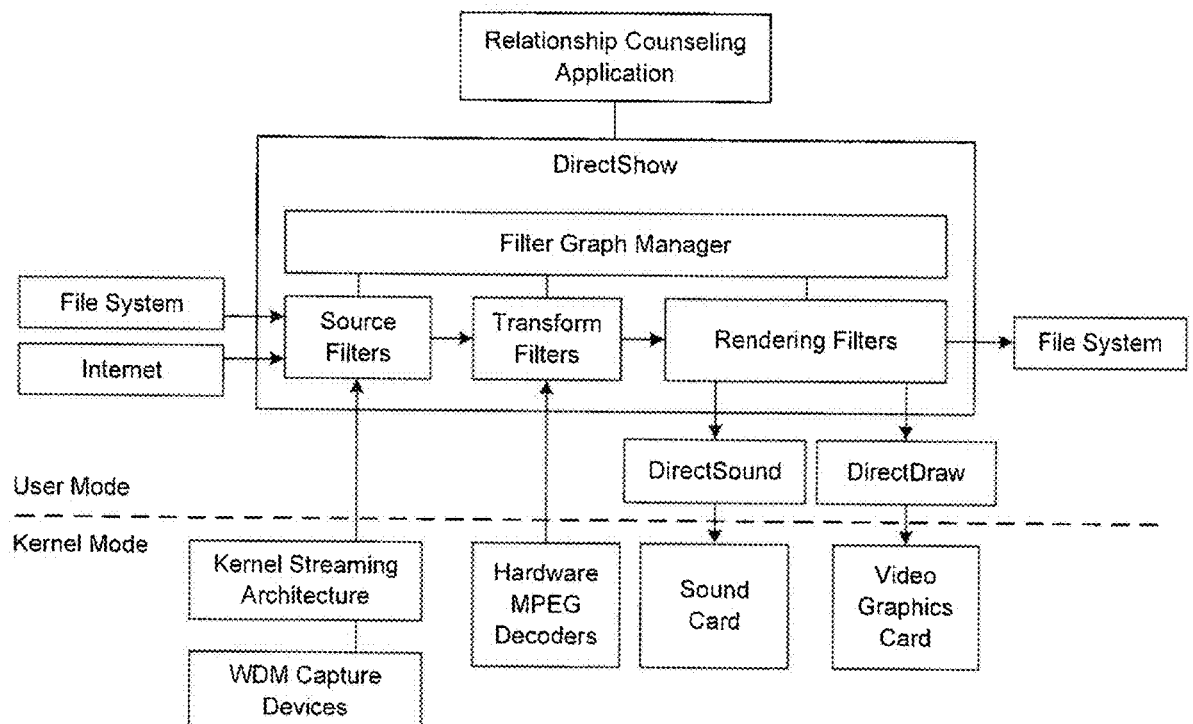
FIGS. 11A-B illustrate how Relationship Counseling Application can utilize Microsoft DirectShow and Kernel Streaming components.

FIG. 11A illustrates how Relationship Counseling Application can utilize Microsoft DirectShow and Kernel Streaming components. It shows the relationship between the Relationship Counseling Application, the DirectShow, Kernel Streaming Architecture, and some of the hardware and software systems that DirectShow supports. As illustrated here, DirectShow components called filters communicate with, and control, a wide variety of devices, including the local file system, video capture cards, the video display (through DirectDraw or GDI), and the sound card (through DirectSound). DirectShow also provides native compression and decompression filters for certain file formats.

Figure 11B:
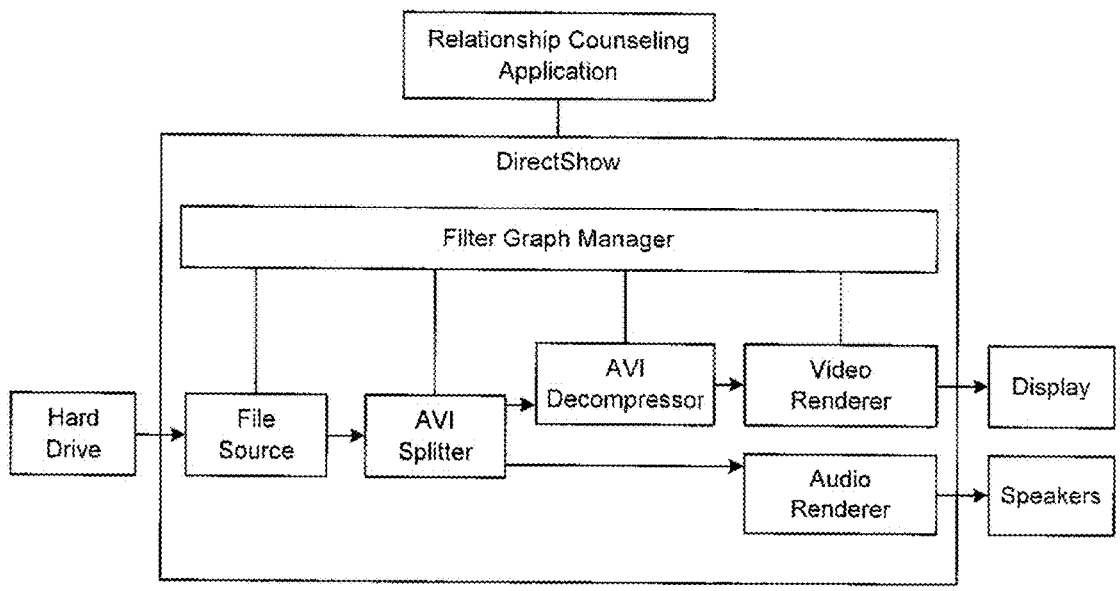

FIG. 11B illustrates how SDIRCS system can construct and manage the graph of DirectShow components. DirectShow uses a modular architecture, where each stage of processing is done by a COM object called a filter. DirectShow provides a set of standard filters for applications to use, and custom software systems can extend the functionality of DirectShow. To illustrate, here are the steps needed to play an AVI video file. As the diagram shows, each filter is connected to one or more other filters. The connection points are also COM objects, called pins. Filters use pins to move data from one filter the next. The arrows in the diagram show the direction in which the data travels. In DirectShow, a set of filters is called a filter graph. Filters have three possible states: running, stopped, and paused. When a filter is running, it processes media data. When it is stopped, it stops processing data. The paused state is used to cue data before running. Filters can be grouped into several broad categories: a source filter introduces data into the graph. The data might come from a file, a network, a camera, or anywhere else. Each source filter handles a different type of data source. A transform filter takes an input stream, processes the data, and creates an output stream. Encoders and decoders are examples of transform filters. Renderer filters typically sit at the end of the chain. They receive data and present it to the user. For example, a video renderer draws video frames on the display; an audio renderer sends audio data to the sound card; and a file-writer filter writes data to a file. A splitter filter splits an input stream into two or more outputs, typically parsing the input stream along the way. For example, the AVI Splitter parses a byte stream into separate video and audio streams. A mux filter takes multiple inputs and combines them into a single stream. For example, the AVI Mux performs the inverse operation of the AVI Splitter. It takes audio and video streams and produces an AVI-formatted byte stream. The distinctions between these categories are not absolute. For example, the ASF Reader filter acts as both a source filter and a splitter filter.

Relationship Counseling Application and Kernel Streaming Components.

Kernel streaming (KS) refers to the Microsoft-provided services that support kernel-mode processing of streamed data. In this model, streaming data flows through a series of nodes that are grouped into blocks called filters. Each filter encapsulates some processing task to be performed upon the data. A KS filter is implemented as a kernel-mode DRIVER_OBJECT.

A KS filter appears through the proxy as a DirectShow filter in user mode. As such, the graph builder and user-mode applications can interact with KS filters. In an active graph, the kernel-mode components still communicate directly, eliminating resource-consuming transitions between user mode and kernel mode. Data flows into and out of filters at connection points called pins. A pin instance renders or captures a data stream, such as digital audio. A filter graph is a group of connected filters. A filter graph links multiple processing tasks to be performed on a stream. One can set various filter graph configurations by using the GraphEdit tool in the Microsoft Windows Driver Kit (WDK).

Drivers that support on-board clocks expose the clock as a file object. A minidriver can query the clock time, or alternatively request to be notified when the clock reaches a certain time.

Kernel streaming architecture supports interaction between minidrivers and user-mode clients through properties, events, and methods. Using these constructs, clients of a KS object can get and set object state, register notification callbacks for events, and execute object methods.

Kernel streaming minidrivers support clock operations by providing callbacks for the properties in the set KSPROPSETID_Clock.

A user-mode client can request to be notified when a clock reaches a certain time stamp, or to receive periodic notification that a fixed amount of time on the clock has elapsed. To do so, clients can register for KSEVENT_CLOCK_POSITION_MARK and KSEVENT_CLOCK_INTERVAL_MARK notifications.

Master Clocks

Minidrivers can synchronize streams to clocks created by other minidrivers; multiple streams can be synchronized to one clock. If the pin uses or produces such a master clock, the minidriver should support KSPROPERTY_STREAM_MASTERCLOCK. Clients also can use this property to set the master clock for the pin. Pins that perform rendering and capturing operations may use a master clock. The interface to a master clock is a file object that supports methods, properties and events.

All queries against the file object are available only at PASSIVE_LEVEL. However, the clock position query also is supported through a direct function call pointer available at DISPATCH_LEVEL, which is valid as long as the file object is valid. This direct call must be passed to the clock's file object as a context parameter. The file handle is acquired through a create request on a filter pin instance, much as the pin creation is done by IRP_MJ_CREATE. The request causes a file handle to be created, just as a file handle to a pin is created, with its own context information. This file handle is then passed back to the caller and can be used to set the master clock for kernel-mode filters. At the time the filter is being assigned the graph's master clock, a pin instance can query the parent file object to determine if it owns the master clock. When a filter is given the file handle to this master clock, it can then be used to query properties. If a master clock is based on a kernel-mode filter, it must support an interface to query the file handle to the kernel-mode portion of the master clock. If the interface is not supported, then it is assumed that the clock is user mode-based, and kernel-mode filters cannot synchronize to it. The DirectShow proxy filter requesting the master clock handle then passes it to its underlying kernel-mode filter file handle. The kernel-mode filter references the underlying file object. If the filter already had a master clock, it dereferences the file object and uses the new handle. To do this, the filter must be in Stop state. The physical time on the master clock object is frequently hardware-based. If a filter that presents the master clock has no physical clock, then the stream time progresses according to the time stamps of the data presented. In such a situation, time stamps may stop due to a lack of data. The physical time behind the master clock may be remote, in which case it is the responsibility of the local proxy to provide accurate readings. For example, the proxy has responsibility for compensating for the delay across a 1394 connection, or averaging the delay across a network. Minidrivers can support the KSPROPERTY_CLOCK_FUNCTIONTABLE property to provide user-mode clients with a mechanism to check reference clock time. This property fills in a structure with function pointers that enable this, thereby supporting precise rate matching. In addition, minidrivers support the KSPROPERTY_STREAM_RATE property if a specified pin allows rate changes. Relationship Counseling Application can use functions of the IKsClockPropertySet interface to get and set time on physical clocks and for the data streams rate matching.

Relationship Counseling Application and DirectShow Event Notification.

A filter notifies the Filter Graph Manager about an event by posting an event notification. The event could be something expected, such as the end of a stream, or it could represent an error, such as a failure to render a stream. The Filter Graph Manager handles some filter events by itself, and it leaves others for the Relationship Counseling Application to handle. If the Filter Graph Manager does not handle a filter event, it places the event notification into a queue. The filter graph can also queue its own event notifications for the Relationship Counseling Application. The Relationship Counseling Application retrieves events from the queue and responds to them based on the type of event. Event notification in DirectShow is therefore similar to the Microsoft Windows message queuing scheme. The Relationship Counseling Application can also cancel the Filter Graph Manager's default behavior for a given event type. The Filter Graph Manager then puts those events directly into the queue for the Relationship Counseling Application to handle. The Filter Graph Manager exposes three interfaces that support event notification: IMediaEventSink contains the method for filters to post events, IMediaEvent contains methods for applications to retrieve events, IMediaEventEx inherits from and extends the IMediaEvent interface. Filters post event notifications by calling the MediaEventSink::Notify method on the Filter Graph Manager. An event notification consists of an event code, which defines the type of event, and two parameters that give additional information. Depending on the event code, the parameters might contain pointers, return codes, reference times, or other information. To retrieve an event from the queue, the Relationship Counseling Application calls the IMediaEvent::GetEvent method on the Filter Graph Manager. This method blocks until there is an event to return or until a specified time elapses. Assuming there is a queued event, the method returns with the event code and the two event parameters. The following code example provides an outline of how to retrieve events from the queue:

```
long evCode;
LONG_PTR param1, param2;
HRESULT hr;
while  (hr=pEvent->GetEvent(&evCode,   ¶m1,
  ¶m2, 0), SUCCEEDED(hr))
  {
  switch(evCode)
  {
    // Call application-defined functions for each
    // type of event that you want to handle.
  }
  hr=pEvent->FreeEventParams(evCode,      param1,
    param2);
  }
```

How SDIRCS Captures the Time Stamps of Events

Now that the relevant technical details of Microsoft DirectShow and Kernel Streaming technologies have been presented, more details of SDIRCS utilization of these technologies is discussed below.

START_TIME event time of the Relationship Counseling Application can be reported by the User Interface Component that handles the "START" event (for example, when person 1 presses the user interface "START" button) by querying the Device System Clock device driver to obtain the Device System Clock current time and by posting the "START_TIME" event using IMediaEventSink::Notify DirectShow method with the following parameters: EVENT_ID=START_TIME_EVENT_ID; EVENT TIME=the time reported by the Device System Clock device driver; CLOCK_ID=Device System Clock ID; DEVICE_ID=a corresponding device ID. Any DirectShow-compliant component of Relationship Counseling Application can then receive the START_TIME notification by calling the IMediaEvent::GetEvent method.

In step 960 of FIG. 9C, the Audio/Video Capture and Transmit Manager records the time stamp of the first captured audio sample as a following record in ISETT table: EVENT_ID=MICROPHONE START TIME; DEVICE_ID=a corresponding device ID; EVENT_TIME=the time stamp of the first captured audio sample according to a specific clock; CLOCK_ID=the ID of that specific clock, for example the ID of Device System Clock. MICROPHONE START TIME time can be reported by the Speaker device driver querying the Device System Clock device driver to obtain the Device System Clock current time and by posting the "MICROPHONE START TIME" event using IMediaEventSink::Notifiy DirectShow method with the following parameters: EVENT_ID=MICROPHONE START TIME; EVENT_TIME=the time reported by the Device System Clock device driver; CLOCK_ID=Device System Clock ID; DEVICE_ID=a corresponding device ID.

Any DirectShow-compliant component of Relationship Counseling Application can then receive the MICROPHONE START TIME notification by calling the IMediaEvent::GetEvent method.

Other audio, video, timer, and other hardware and software events utilized by the Relationship Counseling Application can be reported and managed in a similar fashion.

Master/slave clock relationship and synchronization can be handled by the Relationship Counseling Application by utilizing KSPROPERTY_STREAM_MASTERCLOCK described above. The Relationship Counseling Application components can request to be notified when a clock reaches a certain time stamp, or to receive periodic notification that a fixed amount of time on the clock has elapsed by registering to receive KSEVENT_CLOCK_POSITION_MARK and KSEVENT_CLOCK_INTERVAL_MARK DirectShow notifications described above.

Precise Rendering and Synchronization of Streams

Precise rendering and synchronization of audio and video streams is utilized in multiple phases of SDIRCS including the initial phase of the relationship-counseling session and the second-phase annotation sub-session. SDIRCS multimedia methods are presented below.

Let us agree that the output device (such as speaker or display) can also be called the presentation device. The definition of presentation time depends on the output device: for video displays, the presentation time of a frame in a video sequence is the moment that the image is output to the screen. For audio devices, the presentation time for a sample of audio is the moment that the endpoint speakers emit the audio sample. The presentation times of the audio and video streams on the output devices should match the capture times at the input devices except for the systems that desire some special audio/video effects. These input devices (such as camera or microphone) are also called capture devices. The method of determining the capture time depends on the media: for a video camera, the capture time for a video frame is the moment that the camera captures the image. For a microphone, the capture time for a sample of audio is the moment that the microphone records the sample. Except for the special audio/video effects scenarios, the relationship between audio and video at presentation time, on the presentation device, should match the relationship between audio and video at capture time, on the capture device, even in the presence of numerous delays in the entire end-to-end path, which might differ between video and audio.

Playout devices come in two types: malleable and non-malleable. Malleable playout devices can play a media sample on command, at any time. An example of a malleable playout device is a video display monitor. Typically, malleable devices do not request data; for instance, a receiver can send a video frame directly to the display device, and the device immediately writes the frame into video memory. The video frame appears on the screen the next time the TV raster scans the screen. In contrast, nonmalleable devices consume data at a constant rate. The audio playout device is an example: the receiver must move data to the audio device at exactly the real-time rate. Nonmalleable devices typically issue interrupt requests each time they must receive new data, and the receiver must service the interrupt request quickly to maintain a constant data rate to the device. After the receiver sends the first packet of audio to the audio device, the audio device typically proceeds to generate interrupt requests on a regular basis to acquire a constant stream of audio data.

A separate crystal oscillator drives each clock, which means that none of the clocks are synchronized to each other. In most video conferencing systems, the sender audio clock also provides the common timebase clock; however, this example considers the most general case. Typically, the method of synchronizing audio and video presentation at the destination is to have the audio stream being the master and the video stream slave to the audio presentation clock. This is typically done when the audio playout device is nonmalleable and the video playout device is malleable.

There are two major types of the audio/video playback: (1) from live source (such as videoconferencing), and (2) from a stored data file. In the second case, SDIRCS has less constraints to control the presentation time on the output devices because SDIRCS does not have to deal with the network quality of service issues and with the videoconferencing latency constraints.

Microsoft Media Foundation Architecture is one example of software frameworks supporting presentation time management. Media sinks use the presentation time to schedule when to render samples. Whenever a media sink receives a new sample, it gets the time stamp from the sample and renders the sample at the indicated time, or as close to that time as possible. Because all of the media sinks in a topology share the same presentation clock, multiple streams (such as audio and video) are synchronized. Media sources and transforms typically do not use the presentation clock because they do not schedule when to deliver samples. Instead, they produce samples whenever the pipeline requests a new sample. If a Microsoft Media Foundation Architecture-based software application, such as one possible implementation of SDIRCS application, is using the Media Session interface for playback, the Media Session handles all of the details of creating the presentation clock, selecting a time source, and notifying the media sinks. The software application might use the presentation clock to get the current presentation time during playback, but otherwise will not call any methods on the presentation clock. To get the latest clock time from the presentation clock, the software application can call IMFPresentationClock::GetTime method. Clock times are in 100-nanosecond units. To run the clock, IMFPresentationClock::Start is called. The Start method specifies the clock's starting time. While the clock is running, the clock time increments from the starting time, at the current clock rate. To pause the clock, IMFPresentationClock::Pause is called. While the clock is paused, the clock time does not advance, and GetTime returns the time at which the clock was paused. To stop the clock, IMFPresentationClock::Stop is called. When the clock is stopped, the clock time does not advance, and GetTime returns zero. Objects can receive notifications of state changes (including rate changes) from the presentation clock. To receive notifications, the IMFClockStateSink interface can be used and IMFPresentationClock::AddClockStateSink method on the presentation clock.

Figure 11C:
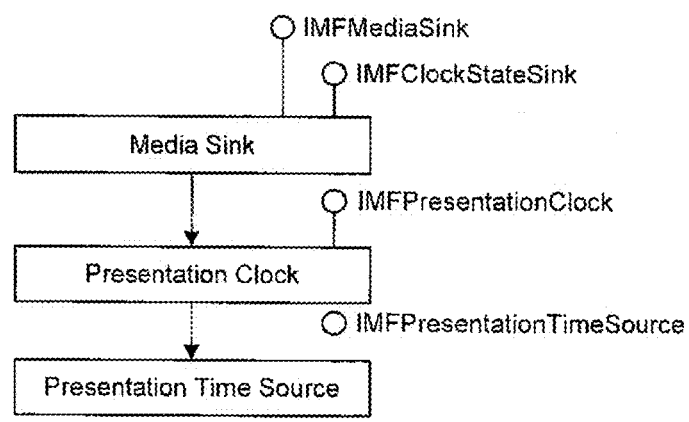
FIG. 11C shows the Presentation Clock interfaces.

Despite its name, the presentation clock does not actually implement a clock. Instead, it gets the clock times from another object, called a presentation time source. The time source can be any object that generates accurate clock ticks and exposes the IMFPresentationTimeSource interface. FIG. 11C shows the Presentation Clock interfaces. When the presentation clock is first created, it does not have a time source. To set the time source, IMFPresentationClock::SetTimeSource is called with a pointer to the time source's IMFPresentationTimeSource interface. A time source supports the same states as the presentation clock (running, paused, and stop), and must implement the IMFClockStateSink interface. The presentation clock uses this interface to notify the time source when to change state. In this way, the time source provides the clock ticks, but the presentation clock initiates state changes in the clock. Some media sinks have access to an accurate clock, and therefore expose the IMFPresentationTimeSource interface. In particular, the audio renderer can use the frequency of the sound card as a clock. In audio playback, it is useful for the audio renderer to act as the time source, so that video is synchronized to the audio playback rate. This generally produces better results than attempting to match the audio to an external clock.

In one illustrative implementation, SDIRCS can utilize Microsoft Media Foundation Architecture interfaces and methods presented above in order to control the precise rendering of audio and video streams. For example, below is a code fragment to use the Microsoft Media Foundation Architecture presentation clock-related methods to achieve the audio/video synchronization by slaving the video rendering presentation clock rate to the audio renderer's master clock:

Code Fragment 1:
    // create the presentation clock
    MFCreatePresentationClock(&presentation_Clock);
    // set the time source of the presentation clock to the audio renderer
    presentation_Clock->SetTimeSource(pTimeSourceAudioRenderer);
    // set the presentation clock on the media sink
    pSink->SetPresentationClock(presentation_Clock);
    // start the clock at the beginning
    presentation_Clock->Start(0);

Audio/Video Player is one practical example of precise synchronization and rendering of audio/video streams. It is described below in the "Media Player Program example" section of this patent application.

Postprocessing after the the First Phase Discussion Session

As noted, one of the implementations of SDIRCS constructs a particular Sensory Experience for each Subject of Sensory Objective in order to preserve the original Sensory Experience of each Person.

Scenario 2 that was described in the "System operations" section above, identified the new split-screen video SSV2P1 that SDIRCS can construct and present to person 1 after the first phase discussion between person 1 and person 2. Audio/video file SSV2P1 preserves the original Sensory Experience of person 1 in the first phase discussion between person 1 and person 2. Audio/video file SSV2P1 can be built by SDIRCS from the following logical level components:

| Video of person 1 = | Video of person 2 = |
|---|---|
| Person 1 - Video 1 | Person 1 - Video 2 |
| Presented at the Destination | Presented at the Destination |
| Audio of person 1 = | Audio of person 2 = |
| Audio 1 at the Source | Person 1 - Audio 2 |
| | Presented at the Destination |

The physical level view of audio/visual sensory experience of person 1 viewing the audio/video file SSV2P1 is as follows:

"Person 1-Physical Audio Presented at the Destination" is the audio mix of "person 1. Audio 1 at the Source" and "Person 1-Audio 2 Presented at the Destination" audio streams. This audio mix can be created by SDIRCS from the two following audio files: "Audio 1 Captured" and "Audio 2 Received" and from the SDIRCS system collected timing information about these files and the corresponding clocks utilized for the time stamping. That collected timing information includes integrated-time-correlation table and integrated-system-events-timing table.

"Person 1-Physical Video Presented at the Destination" is a single split-screen video stream that was constructed by SDIRCS by combining two video streams: one of person 1 in a "Video 1 Received" file and one of person 2 in a "Video 2 Received" file.

In the Scenario 2 the split-screen audio/video file SSV2P1 is built by SDIRCS and this audio/video file needs to be presented to person 1. Note that for the person 2, a corresponding audio/video file SSV2P2 is built by SDIRCS according to Scenario 3 above and its operation is similar to the person 1-related operation. Therefore only the person 1-related processing is described here.

FIG. 12A illustrates one implementation of a postprocessing procedure after the first phase discussion session. SDIRCS rebuilds the split screen video using "Video 1 Received" 1204, "Audio 1 Captured" 1206, "Video 2 Received" 1208, "Audio 2 Received" 1210 data files and using the integrated-system-events-timing table and the integrated-time-correlation table that captures the timing relationship between the Device 1 Master Clock, Device 2 Master Clock, and Server Reference Clock. ISETT and ITCT tables are part of the Timing Information data set 1212. To construct SSV2P1 audio/video file shown as "Synchronized Improved Quality Split-screen Audio/Video File" 1220, SDIRCS constructs the audio part of SSV2P1 file and the video part of SSV2P1 file. To construct SSV2P1 file, SDIRCS needs to align all of the audio and video streams with respect to a single, common clock; and to mix these time-aligned audio and video streams from multiple audio and video components. Also shown are "Pulse Oximeter Data Set for Device 1" 1214 and "Pulse Oximeter Data Set for Device 2" 1216. The "Synchronized Pulse Oximeter Data Set for Device 1" 1218 is built by SDIRCS from "Pulse Oximeter Data Set for Device 1" 1214 and the "Synchronized Pulse Oximeter Data Set for Device 2" 1222 is built by SDIRCS from "Pulse Oximeter Data Set for Device 2" 1216 using the data set synchronization procedure described in the section "Postprocessing after the second-phase annotation sub-session" below.

One method of SDIRCS system aligning all of the audio, video, and physiology data streams with respect to a single, common clock is presented here. FIG. 12B shows how two files can be time-aligned relative to a common reference clock. It illustrates how the two files File 1 1230 and File 2 1232 can be processed in a such a way that their data samples that correspond to the same time position relative to a common clock can be located. The method shown in FIG. 12B can be used with audio files or streams that are represented by the audio signal's data samples, with video files or streams that are represented by the video signal's data frames, with physiology files or streams that are represented by the physiology signal's data samples, and with many others time-based data streams. The upper part of FIG. 12B shows File 1 1230 and File 2 1232 that are conceptually aligned at their corresponding beginning of file positions BOF1 1234 and BOF2 1236. "Start 1" element 1238 indicates a position in File 1 that corresponds to SDIRCS "Start" event. "Start 2" element 1240 indicates a position in File 2 that also corresponds to SDIRCS system "Start" event. Because the files' File 1 and File 2 data were sampled by different parts of SDIRCS system that were driven by different clocks, "Start 1" 1238 and "Start 2" 1240 positions are not necessarily aligned as shown by this FIG. 12B.

"End 1" element 1242 indicates a position in File 1 that corresponds to SDIRCS system "End" event. "End 2" element 1244 indicates a position in File 2 that also corresponds to SDIRCS system "End" event. Because the files' File 1 and File 2 data were sampled by different parts of SDIRCS system that were driven by different clocks, "End 1" 1242 and "End 2" 1244 positions are not necessarily aligned as shown by this FIG. 12B. The end of File 1 is indicated as EOF1 1246 and the end of File 2 is indicated as EOF2 1248. The lower part of FIG. 12B shows the same files File 1 1230 and File 2 1232 that are time-aligned at their corresponding "Start 1" 1239 and "Start 2" 1241 positions that correspond to SDIRCS "Start" event. In this view of the data, BOF1 1235 is not necessarily aligned with BOF2 1237, and the other corresponding elements such as EOF1 1247 and EOF2 1249 are not necessarily aligned either. It is important to note that despite of "Start 1" 1239 and "Start 2" 1241 being aligned, "End 1" 1243 and "End2" 1245 are not necessarily aligned because the data samples of files File 1 and File 2 were sampled by different clocks yielding different number of samples during the identical data sampling time period.

Let us describe a high level view of a process of creating an audio output stream from two audio input streams. The high level view of a process of creating a video output stream from two video input streams is similar. The difference between these two processes is in handling of audio data samples versus video data frames.

Let Clock_1_ID be the CLOCK ID of the clock that is associated with File 1 and Clock_2_ID be the CLOCK_ID of the clock that is associated with File 2. Then a high level view of a process of creating an audio output stream from two audio input streams or a process of creating a video output stream from two video input streams is as follows:
Find Start record in ISETT Table such that Start record.EVENT_ID=START_TIME_EVENT_ID
Start_Time=Startrecord.EVENT_TIME
Start_Clock=Start record.CLOCK_ID
Translate Start_Time into File1_Start_Time using ITCT Table relationship between Start_Clock, Clock_1_ID, and Start_Time.
Translate Start_Time into File2_Start_Time using ITCT Table relationship between Start_Clock, Clock_2_ID, and Start_Time.
Find End_record in ISETT Table such that End_record.EVENT_ID=END_TIME_EVENT_ID
End_Time=End record.EVENT_TIME
End_Clock=End_record.CLOCK_ID
Translate End_Time into File1_End_Time using ITCT Table relationship between End_Clock, Clock_1_ID, and End_Time.
Translate End_Time into File2_End_Time using ITCT Table relationship between End_Clock, Clock_2_ID, and End_Time.
Create the file OUTPUT_FILE from two files: File 1 and File 2 where File 1 starts at File1_Start_Time and ends at File1_End_Time, and File 2 starts at File2_Start_Time and ends at File2_End_Time.

Time translations between multiple clock using ITCT table have been presented in "The time translations using ITCT" section above.

"Translate Start Time into File1_Start_Time using ITCT Table relationship between Start_Clock, Clock_1_ID, and Start_Time" step in the process above can be done by SDIRCS by translating INPUT_TIME=Start_Time relative to INPUT_CLOCK=Start Clock into OUTPUT_TIME= File1_Start_Time relative to OUTPUT_CLOCK= Clock_1_ID using ITCT Table as described in "The time translations using ITCT" section above.

Let us present one implementation of the "Create the file OUTPUT_FILE from two files: File 1 and File 2 where File 1 starts at File1_Start_Time and ends at File1_End_Time, and File 2 starts at File2_Start_Time and ends at File2_End_Time" step in the process above.

There are many readily available technologies to mix the audio and video streams from multiple audio and video components. One solution of audio mixing and video mixing is presented here. The audio part of SSV2P1 can be built from "Audio 1 Captured" and "Audio 2 Received" files and from the recorded timing information as follows. Many Microsoft Direct Show and Microsoft Kernel Streaming components and their operations have been already described in this patent application. KMixer is the kernel-mode system component that performs mixing of kernel-streaming (KS) audio streams. KMixer can mix playback audio streams from clients such as DirectSound or waveOut application programs. The streams can be in different wave PCM formats with a variety of sample rates, sample sizes, and channel counts. Samples can be expressed as integer or floating-point values. KMixer generates a mixed stream in a format that the downstream filter, which is typically an audio rendering device, can handle. KMixer can also perform format conversion of a capture stream. KMixer inputs the capture stream from an audio capture device and converts it to a format that a client such as a DirectSoundCapture or waveIn application program can handle. As part of Microsoft Kernel Streaming framework, KMixer and related components utilize mechanisms of master and slave clocks, precise streams synchronization, and precise rendering at a predetermined time that have already been presented in this patent application.

The video part of SSV2P1 can be built from "Video 1 Received" and "Video 2 Received" files and from the recorded timing information as follows. The Enhanced Video Renderer (EVR) is a component of Microsoft Media Foundation framework that displays video on the user's monitor. The EVR can mix up to 16 video streams. The first input stream is called the reference stream. The reference stream always appears first in the z-order. Z-order is an ordering of overlapping two-dimensional objects, such as windows in a stacking window manager, shapes in a vector graphics editor, or objects in a 3D application. One of the features of a typical graphical user interface is that windows may overlap, so that one window hides part or all of another. When two windows overlap, their Z-order determines which one appears on top of the other. Any additional streams are called substreams, and are mixed on top of the reference stream. The application can change the z-order of the substreams, but no substream can be first in the z-order. Internally, the EVR uses an object called the mixer to composite the frames from the input streams onto one surface for rendering. The mixer also performs deinterlacing and color correction. The output from the mixer is the final composited video frame. A second object called the presenter renders the video frame to the display. The presenter schedules when the frames are rendered and manages the Direct3D device. An application can provide a custom implementation of either the mixer or the presenter. The output frame rate is locked to the reference stream. Whenever the substreams receive new frames, the mixer holds onto them. When the reference stream receives a new frame, the mixer composites that frame with the substream frames. It is possible for a substream to receive more than one frame while the mixer is waiting for a reference frame. In that case, the mixer simply discards the previous substream frame.

FIG. 12C shows the internal components of the Microsoft Enhanced Video Renderer EVR that can be utilized by Relationship Counseling Application. Because the presenter creates the Direct3D device, it is also responsible for sharing the device with other pipeline objects that need to access DirectX Video Acceleration (DXVA) services. In particular, the EVR mixer uses the DXVA video processing services to deinterlace and mix the video. External to the EVR, software decoders may use DXVA for accelerated video decoding. The presenter shares the Direct3D device using the Direct3D Device Manager. As part of Microsoft Media Foundation framework, EVR and related components utilize mechanisms of master and slave clocks, precise streams synchronization, and precise rendering at a predetermined time that have already been presented in this patent application.

Note that the process of creating an output file from two input files is easily extended to the process of creating the output file from many (more than two) input files by, for example, performing the process of creating an output file from two input files many times, each time adding one more input file to the resulting output file.

Transcoding and Modifying the Streams

Transcoding is the conversion of a digital media file from one format to another. There are many readily available technologies that perform transcoding. One of them is Microsoft Transcode API that is designed to be used with the Media Session objects. The FIG. 12D shows how the Relationship Counseling Application can utilize the Transcode API. It shows the Media Foundation encoding pipeline containing the following data-processing objects: Media source, Decoder, Video resizer or audio resampler, Encoder, Media sink.

The video resizer can be used if the size of the output video differs from the source. The audio resampler can be used if the audio needs to be resampled before encoding. The decoder/encoder pair is used for transcoding.

The encoding topology is the set of pipeline objects (source, decoder, resizer, resampler, encoder, and media sink) and the connection points between them. Different components are responsible for creating the various pipeline objects: (1) The Relationship Counseling Application typically uses the Source Resolver to create the media source; (2) The Media Session loads and configures the decoder, video resizer, and audio resampler. Internally, it uses the topology loader IMFTopoLoader to do this; (3) The transcode API loads and configures the encoder and the media sink.

The Second-Phase Annotation Sub-Session

FIGS. 13A-D illustrate the input and output signals generated by a video-enabled electronic device during a second-phase annotation sub-session. FIGS. 13A-D use the same illustration conventions as used for FIGS. 5A-D. As shown in FIG. 13A, during the second-phase annotation sub-session, the video-enabled electronic device 1302 receives a video signal 1304, audio signal 1306, and timing information 1308 from the synchronization subsystem of the relationship-counseling-processing system 1303. The video-enabled electronic device outputs a signal including slider-position information for the rating feature 1310, a signal including pulse-oximeter data 1312, and a signal timing information 1314 for the two output signals and for the presentation times of video signal 1304 and audio signal 1306 on device 1302.

Similar signal generation and transmission occur for the second participant's video-enabled electronic device shown in FIG. 13B. To illustrate that there are many options of managing the audio and video output streams by Synchronization and Analytics Subsystem 1303, a split-screen audio/video source file 1305 is shown on FIG. 13A as the source of Video Out 1 stream 1307 and Audio Out 1 stream 1309. In FIG. 13B, the Video Out 2 stream 1311 and Audio Out 2 stream 1313 are shown as separate data streams.

FIG. 13C summarizes the signals input to, and output from, the synchronization subsystem of the relationship-counseling-processing system. Note that the audio and video signals for the split-screen discussion playback 1320-1321 produced from stored audio and video data 1322 are re-input to the synchronization subsystem along with the signals output from the video-enabled electronic device. The synchronization subsystem produces a complete data set 1324, stored in one or more mass-storage devices connected to the relationship-counseling-processing system, that can be subsequently processed to align all of the data with respect to a single, common clock and to encode and store the data in a way that the analysis subsystem within the relationship-counseling-processing system is able to carry out complex processing of the data to produce the reports, advice, and other relationship-counseling-system outputs to the participants. There are many readily available technologies that can be utilized to produce the complete data set 1324 from multiple audio, video, physiology, and other data streams. These technologies include generic digital container file formats. One example is a Resource Interchange File Format (RIFF)—a generic file container format for storing data in tagged chunks.

FIG. 13D illustrates again, as in FIG. 5D, that the various signals generated during the second-phase annotation sub-session are also unsynchronized, in time, with respect to one another. Thus, scaling of these various different signals is needed in order to produce globally scaled, with respect to time, data output by the synchronization subsystem of the relationship-counseling system, discussed above with reference to FIG. 13C.

Media Player Program Example

FIG. 13E illustrates one implementation of Relationship Counseling Application 1340 that utilizes Microsoft Media Foundation components to play a media file using the Media Session interfaces 1342.

A media source 1354 is an object that parses a media file 1356 or other source of media data. The media source creates stream objects 1358 for each audio or video stream in the file. Decoders 1360 convert encoded media data into uncompressed video and audio.

The Source Resolver 1344 creates a media source from a URL.

The Enhanced Video Renderer (EVR) 1346 renders video to the screen 1348.

The Streaming Audio Renderer (SAR) 1350 renders audio to a speaker 1352 or other audio output device.

A topology 1354 defines the flow of data from the media source to the EVR 1346 and SAR 1350.

The Media Session 1342 controls the data flow and sends status events to the Relationship Counseling Application 1340.

The following is a general outline of the steps that can be taken by the Relationship Counseling Application 1340 to play a media file using the Media Session:

MFStartup function is called to initialize the Media Foundation platform.
    MFCreateMediaSession is called to create a new instance of the Media Session.
    Source Resolver is used to create a media source.
    A topology that connects the media source to the EVR and SAR is created. In this step, the Relationship Counseling Application creates a partial topology that does not include the decoders.

IMFMediaSession::SetTopology is called to set the topology on the Media Session.

IMFMediaEventGenerator interface is used to get events from the Media Session.

IMFMediaSession::Start is called to start playback. After playback starts, it can be paused by calling IMFMediaSession::Pause, or stopped by calling IMFMediaSession::Stop.

The software interfaces and methods that can be utilized by one implementation of SDIRCS to play back audio and video with a high level of the presentation time synchronization between audio and video streams have been presented above. Some of the essential functions are:

(1) Create presentation clock—this was shown in the "Code Fragment 1" above;
(2) Slave video to audio presentation clock—this was shown in the "Code Fragment 1" above;
(3) Audio/video playback—this was shown in the "Media Player Program example" above.

Postprocessing after the Second-Phase Annotation Sub-Session

FIGS. 14A-C illustrate the timescale problem. As shown in FIG. 14A, the times at which frames are issued within each of the outputs signals, where the times at which frames are issued are represented by short vertical bolded line segments, such as short vertical bolded line segment 1402, are not synchronized, in time, relative to other output signals. In FIG. 14A, each of six output signals is represented by a horizontal line, such as horizontal line 1404 representing a first output audio signal. A final horizontal line 1406 represents a reference clock, or absolute timescale. This reference clock, or absolute timescale, is arbitrary, in general. In certain implementations, the reference clock may correspond to a master timing signal generated within one of the various electronic components of the relationship-counseling distributed system, while, in other implementations, the reference clock is a synthesized signal or timescale based on analysis of the output signals from the various electronic components. It is desired that a common partitioning of data into frames, with the frames occurring periodically along the reference timescale, is logically carried out so that the data in all of the output signals can be re-partitioned, as necessary, and adjusted, as necessary, to produce data frames in correspondence to a set of ideal data frames periodically positioned along the reference timescale 1406. FIG. 14B illustrates the results of the re-partitioning and readjustment of the output-signal data to produce a uniformly scaled set of frames for each of the outputs signals. FIG. 14C again shows, using illustration conventions similar to those used in FIG. 5D, the lack of common timescale and for the data frames in each of the 6 example output signals.

One implementation of a system that postprocesses the SDIRCS signals' data after the second-phase annotation sub-session is presented here.

Let us present one pseudocode example of time-aligning one data stream based on the integrated-time-correlation table, the integrated-system-events-timing table, and the data streams' data samples.

START
Find Start_record in ISETT Table such that
  Start_record.EVENT_ID=START_TIME_EVENT_ID
Start_Time=Start record.EVENT_TIME
Start_Clock=Start_record.CLOCK_ID
Translate Start_Time into Datastream_Start_Time using ITCT Table relationship between Reference_Clock, Clock_Datastream_ID, and Start_Time.
Find End_record in ISETT Table such that
  End_record.EVENT_ID=END_TIME_EVENT_ID
End_Time=End_record.EVENT_TIME
End_Clock=End_record.CLOCK_ID
Translate End_Time into Datastream_End_Time using ITCT Table relationship between Reference_Clock, Clock_Datastream_ID, and End_Time.
FOR EACH Data_Sample in Datastream such that
  (Data_Sample.Timestamp>=Datastream_Start_Time
  AND
  Data_Sample.Timestamp<=Datastream_End_Time) DO
{
  Replace Data_Sample.Timestamp by the new Data_Sample.Timestamp using ITCT Table relationship between Reference_Clock, Clock_Datastream_ID, and Data_Sample.Timestamp
}
EXIT Here is an example of how the procedure above can work. Let the data stream be the pulse oximeter data stream that consists of the time series of the following elements: SAMPLE_TIME, HEART_RATE, OXYGEN_SATURATION. Let us explain a few steps from the pseudocoele above:

"Translate Start_Time into Datastream Start Time using ITCT Table relationship between Reference_Clock, Clock_Datastream_ID, and Start_Time."

Reference_Clock is the SDIRCS Reference clock, Clock_Datastream_ID is the ID of the clock that is used to time stamp the pulse oximeter data (the time stamp is the value of the SAMPLE_TIME element in the pulse oximeter data stream). This step translates Start_Time into Datastream_Start_Time based on the timing relationship between SDIRCS Reference clock and the clock that is used to time stamp the pulse oximeter data. This time translation is done according to the "The time translations using ITCT" section above.

"Replace Data_Sample.Timestamp by the new Data_Sample.Timestamp using ITCT Table relationship between Reference_Clock, Clock_Datastream_ID, and Data_Sample.Timestamp"

Reference_Clock is the SDIRCS Reference clock, Clock_Datastream_ID is the ID of the clock that is used to time stamp the pulse oximeter data. This step translates Data_Sample.Timestamp into a new Data_Sample.Timestamp value based on the timing relationship between SDIRCS Reference clock and the clock that is used to time stamp the pulse oximeter data. This time translation is done according to the "The time translations using ITCT" section above. After this time translation is done, the Data_Sample.Timestamp is replaced by its translated time value.

Time-aligning of other types of data streams, such as audio streams and video streams, can be based on the procedure above.

In some scenarios, such as the time-alignment of audio streams, an audio resampling procedure can be utilized. This audio resampling procedure is also known as a sample-rate conversion. It is the process of changing the sampling rate of a discrete signal to obtain a new discrete representation of the underlying continuous signal.

The time-alignment of a single data stream has been presented here. The time-alignment of multiple data streams in a set of data streams can be achieved by applying the disclosed procedure of time-alignment of a single data stream to each data stream in a set.

Analysis and Processing Subsystems

Figure 15A:
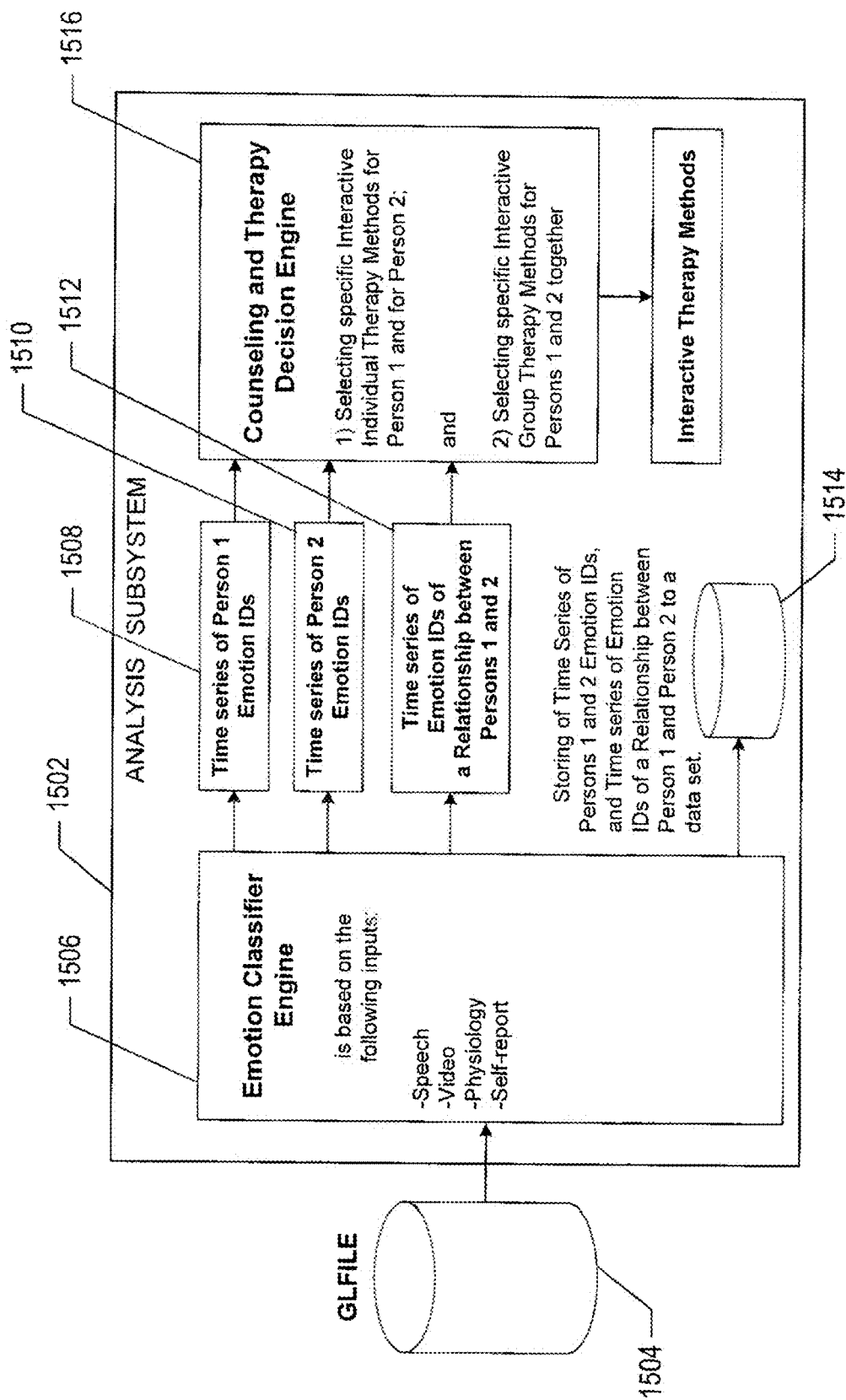

FIGS. 15A-D illustrate analysis of the data collected during a relationship-counseling session by the relationship-counseling-processing system of the relationship-counseling-processing system or servers. As shown in FIG. 15A, the relationship-counseling-processing system 1502 accesses the collected and commonly timescaled data 1504 generated during the first and second phases of the relationship-counseling session by the synchronization an analysis subsystem of the relationship-counseling system. The data is input to an emotion-classifier engine 1506 which generates a time series of emotion IDs 1508 for the first participant, a time series of emotion IDs 1510 for the second participant, and a time series of emotion IDs that represent the interrelationship between the participants 1512. These time series of emotion IDs are stored in one or more mass-storage devices 1514 and input directly, as they are produced by the emotion classifier engine, or indirectly, from the data store 1514, to a counseling and therapy decision engine 1516. The counseling-and-therapy-decision engine analyzes the time series of emotion IDs to diagnose each individual and the relationship, to determine specific therapeutic actions from which to generate reports, advice, and a plan for a subsequent interactive therapy session, when needed.

Figure 15B:
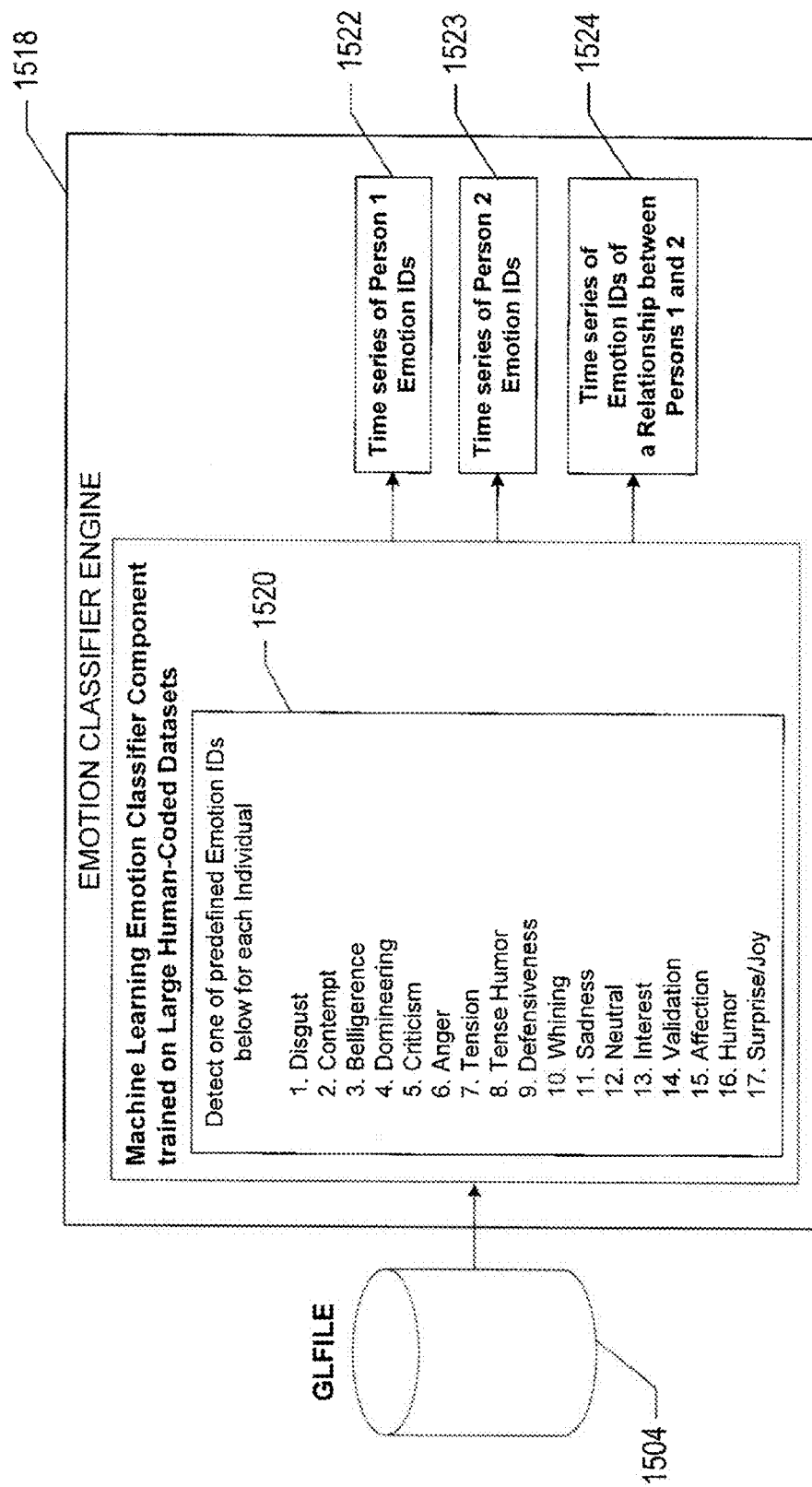

FIG. 15B illustrates the emotion-classifier engine introduced in FIG. 15A. The emotion-classifier engine 1518 applies a series of emotion classifiers 1520 to the commonly timescaled session data 1504 to produce the above-discussed time series of emotion IDs 1522-1524. The emotion classifiers employ machine-learning tools to recognize emotions from facial expressions, voice tones, gestures, body posture, and other such participant features and characteristics extracted from the audio and video signals as well as from physiological data and the slider positions in the slidable rating feature. The time scaled sequence of raw data is thus transformed, by the relationship-counseling-processing system, into the three time series of emotion IDs 1522-1524.

Figure 15C:
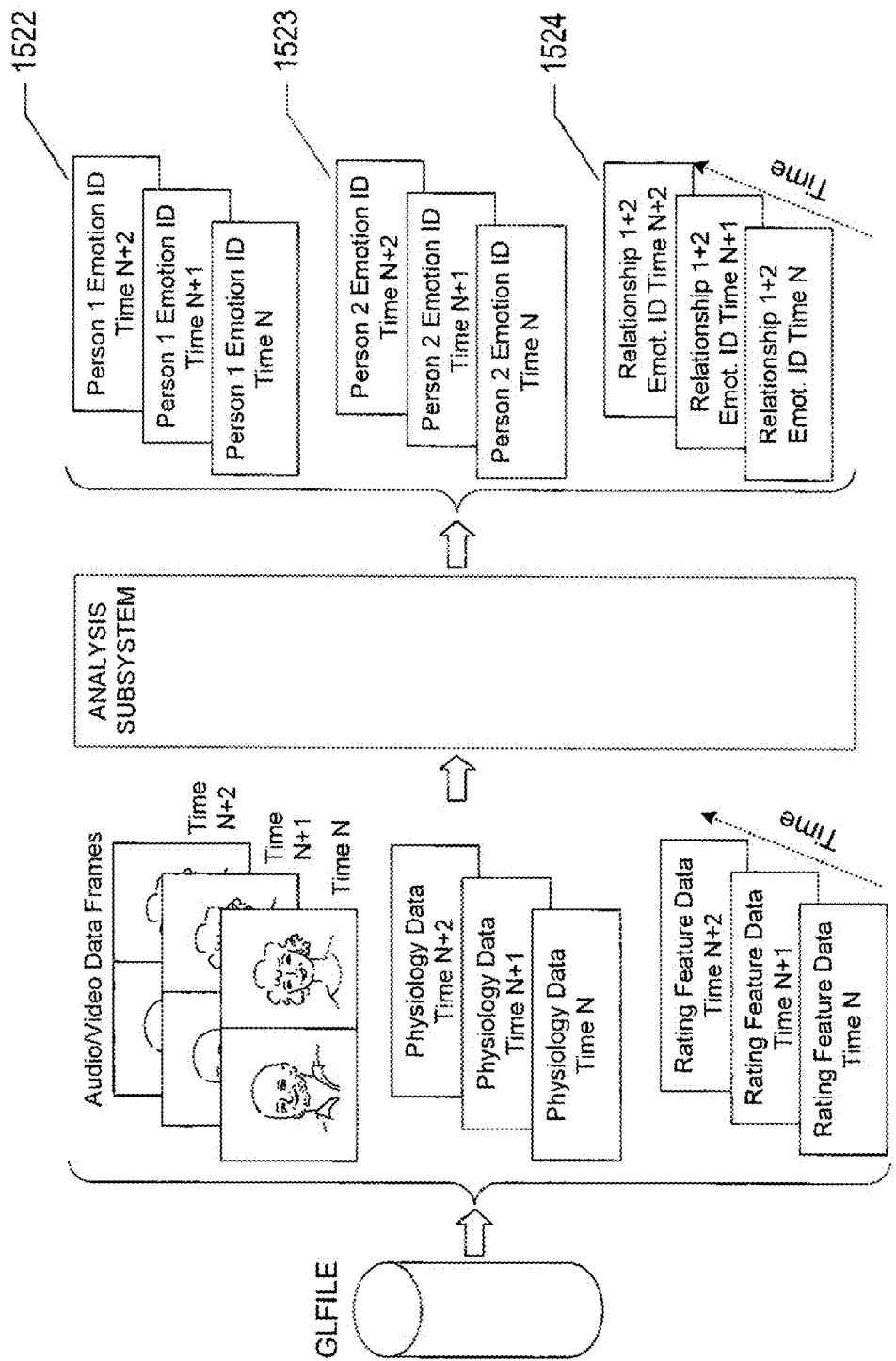
Figure 15D:
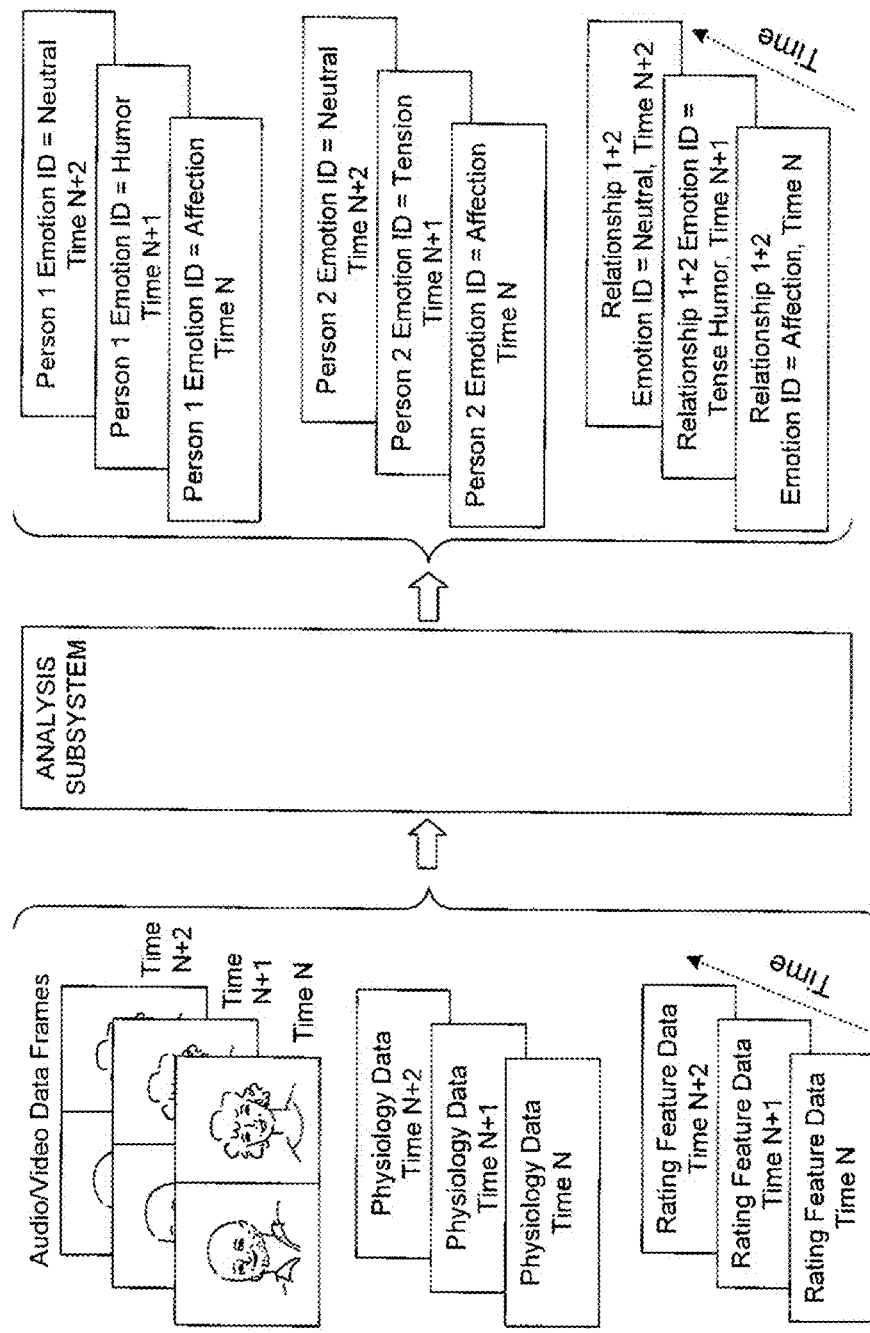

FIGS. 15C-D illustrate the emotion-classification process in an alternative fashion. In FIG. 15C, the three emotion-ID time series 1522-1524 are each seen to be a sequence of time-stamped emotion IDs. As shown in FIG. 15D, particular emotions are shown in the three emotion-ID time series.

FIGS. 16A-C illustrate the analysis steps taken following generation of the emotion-ID time series. FIG. 16A shows the processing steps 1602-1606 of relationship-counseling system. FIG. 16B illustrates data flow through processing steps. The initial data is unsynchronized data collected during the relationship-counseling session 1610. After time scaling, a set of commonly timescaled and processed data from the initial-phase discussion is obtained 1612. A similar set of commonly timescaled and processed data is obtained from each of the two second-phase annotation sub-sessions 1614. Processing by the emotion-classifier engine produces commonly timescaled emotion-ID time series 1616. Next, as shown in FIG. 16C, the time scaled session data and emotion-ID time series are input to an relationship-counseling-processing system 1620 that generates reports and results provided to the participants 1622, individual therapy methods for the first participant 1624, individual therapy methods for the second participant 1626, and group-therapy methods for the participant pair 1628.

FIG. 17 shows a phase-space diagram that correlates dynamic emotion trends for the two participants. Analysis of such phase-space diagram may reveal critical points 1702, such as attractors, that reveal significant features of the relationship between the relationship-counseling participants. Many such phase diagram and analytical methods are applied to generate the reports and therapy methods discussed above with reference to FIG. 16C.

Although the present invention has been described in terms of particular embodiments, it is not intended that the invention be limited to these embodiments. Modifications within the spirit of the invention will be apparent to those skilled in the art.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A semi-automated, distributed interactive relationship-counseling system comprising:
   a pair of processor-controlled, video-enabled user devices, each employed by one of a pair of participants and each running a relationship-counseling application; and
   a server that includes a user-interface subsystem, a client/server communications subsystem, a synchronization-and-analytics subsystem, an analysis subsystem, and a session controller;
   the semi-automated, distributed interactive relationship-counseling system
      providing a first-phase real-time audio/video session during which the participants discuss one or more topics,
      generating a high-quality recording of synchronized audio, video, and physiology signals collected from both participants;
      synchronizing and mapping the collected audio, video, and physiology signals to a single high precision reference clock,
      outputting the synchronized audio, video, and physiology signals to the user devices that preserve precise timing relationship between the synchronized signals while providing a second-phase real-time audio/video session between the participants, and
      providing relationship-counseling outputs to the participants following the second-phase real-time audio/video session.

2. The semi-automated, distributed interactive relationship-counseling system of claim 1 wherein the one or more topics are proposed to the participants via the pair of processor-controlled, video-enabled user devices.

3. The semi-automated, distributed interactive relationship-counseling system of claim 1 wherein, during the first-phase real-time audio/video session, the two participants are isolated from one another and each participant views himself or herself and view and hears the other participant on a split-screen display provided to the participant via the participant's processor-controlled, video-enabled user device.

4. The semi-automated, distributed interactive relationship-counseling system of claim 1 wherein the first phase terminates as a result of one of:

reaching an elapsed time equal to a fixed time limit; or
determination, by the session controller, that the discussion has reached a termination point.

5. The semi-automated, distributed interactive relationship-counseling system of claim 1 wherein, during the second-phase real-time audio/video session, each participant separately annotates the first-phase discussion previously recorded during the initial phase of the relationship-counseling session.

6. The semi-automated, distributed interactive relationship-counseling system of claim 5 wherein each participant views the first-phase discussion previously recorded during the initial phase of the relationship-counseling session via a split-screen display on the participant's processor-controlled, video-enabled user device and annotates the played-back discussion using a slidable rating feature also displayed on the participant's processor-controlled, video-enabled user device.

7. The semi-automated, distributed interactive relationship-counseling system of claim 1 wherein the relationship-counseling outputs are separately provided to the participants following the second-phase real-time audio/video session.

8. The semi-automated, distributed interactive relationship-counseling system of claim 7 wherein the relationship-counseling outputs include one or more of:
  numerical and textural results provided to the participant via the participant's processor-controlled, video-enabled user device;
  graphically illustrated reports provided to the participant via the participant's processor-controlled, video-enabled user device;
  one or more automated therapy sessions provided to the participant via the participant's processor-controlled, video-enabled user device; and
  one or more human-practitioner-administered therapy sessions.

9. The semi-automated, distributed interactive relationship-counseling system of claim 1 wherein the communications subsystem provides for electronic communications with the two video-enabled participant electronic devices.

10. The semi-automated, distributed interactive relationship-counseling system of claim 1 wherein the analysis subsystem includes an emotion-classifier engine and a counseling-and-therapy-decision engine.

11. The semi-automated, distributed interactive relationship-counseling system of claim 1 wherein the session controller cooperates with the user-interface subsystem and the communications subsystem to control initial-phase discussions and second-phase annotation sub-sessions.

12. The semi-automated, distributed interactive relationship-counseling system of claim 1 wherein each processor-controlled, video-enabled user device includes:
  a user-interface component;
  an audio/video communications component;
  a client/server communications component;
  a peer-to-peer communications component;
  a slidable-rating-feature-management component;
  a client-side synchronization and analytics component; and a client-side timing-and-synchronization-management component.

13. The semi-automated, distributed interactive relationship-counseling system of claim 1 wherein each processor-controlled, video-enabled user device additionally includes a pulse oximeter management component.

* * * * *